United States Patent Office 3,700,526
Patented Oct. 24, 1972

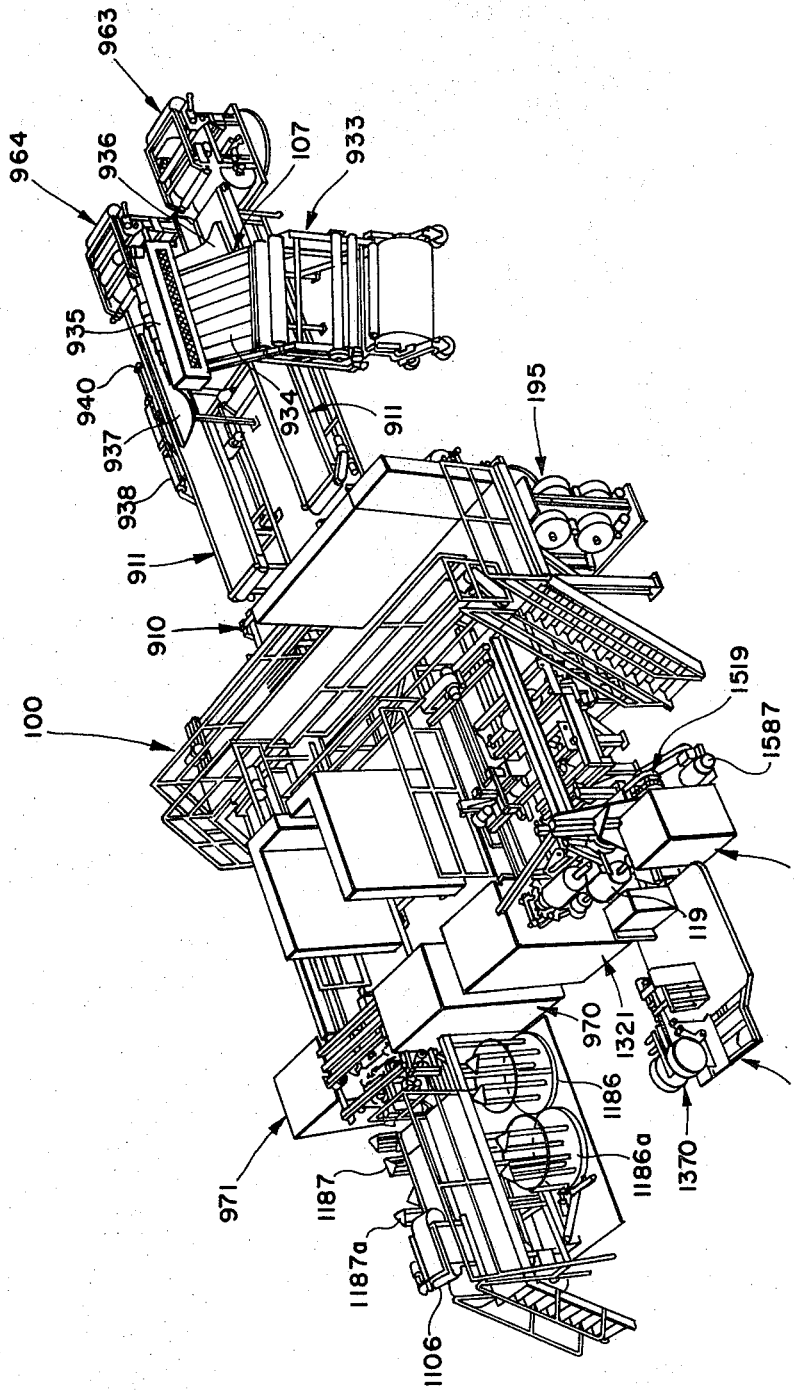

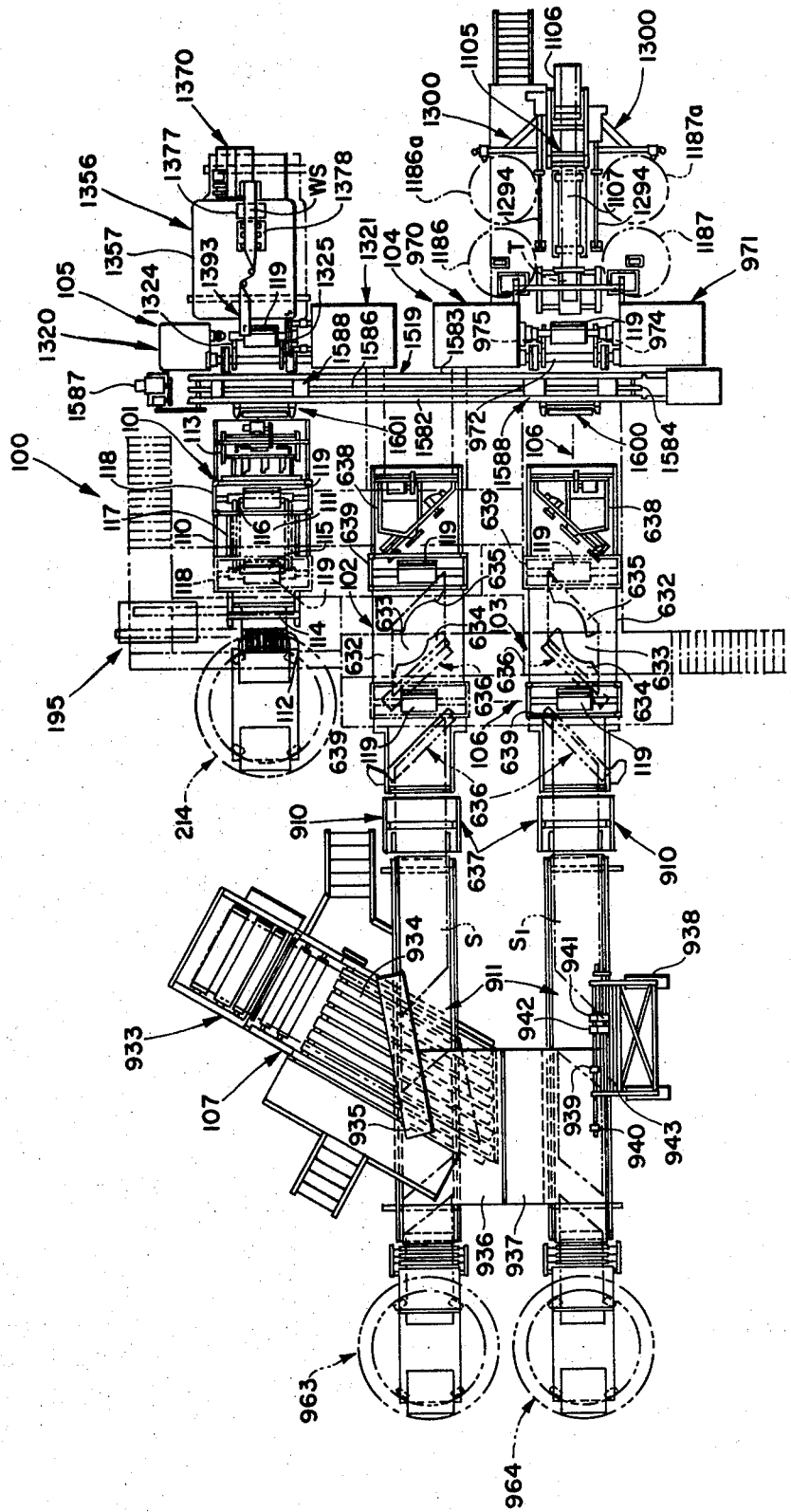

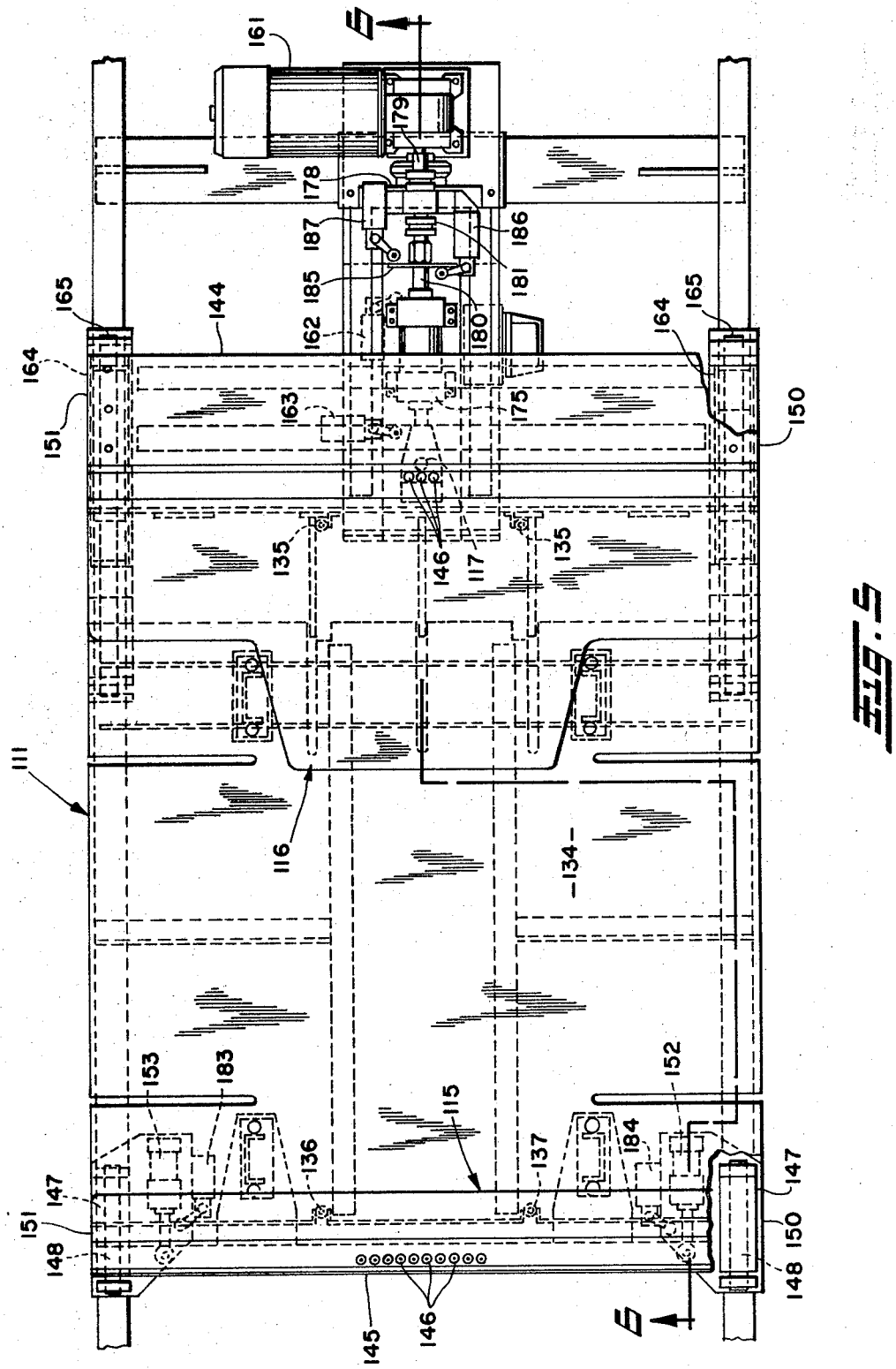

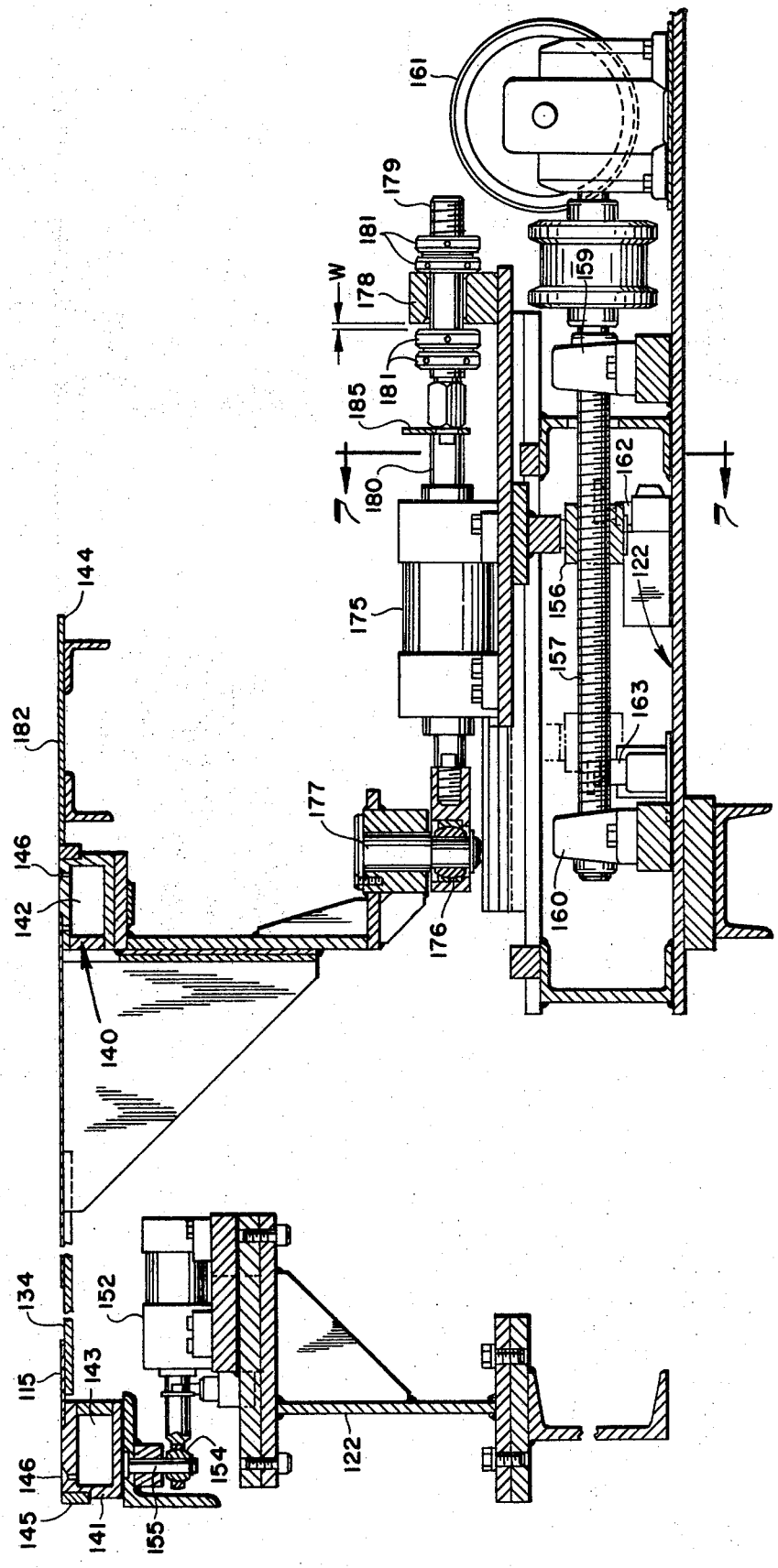

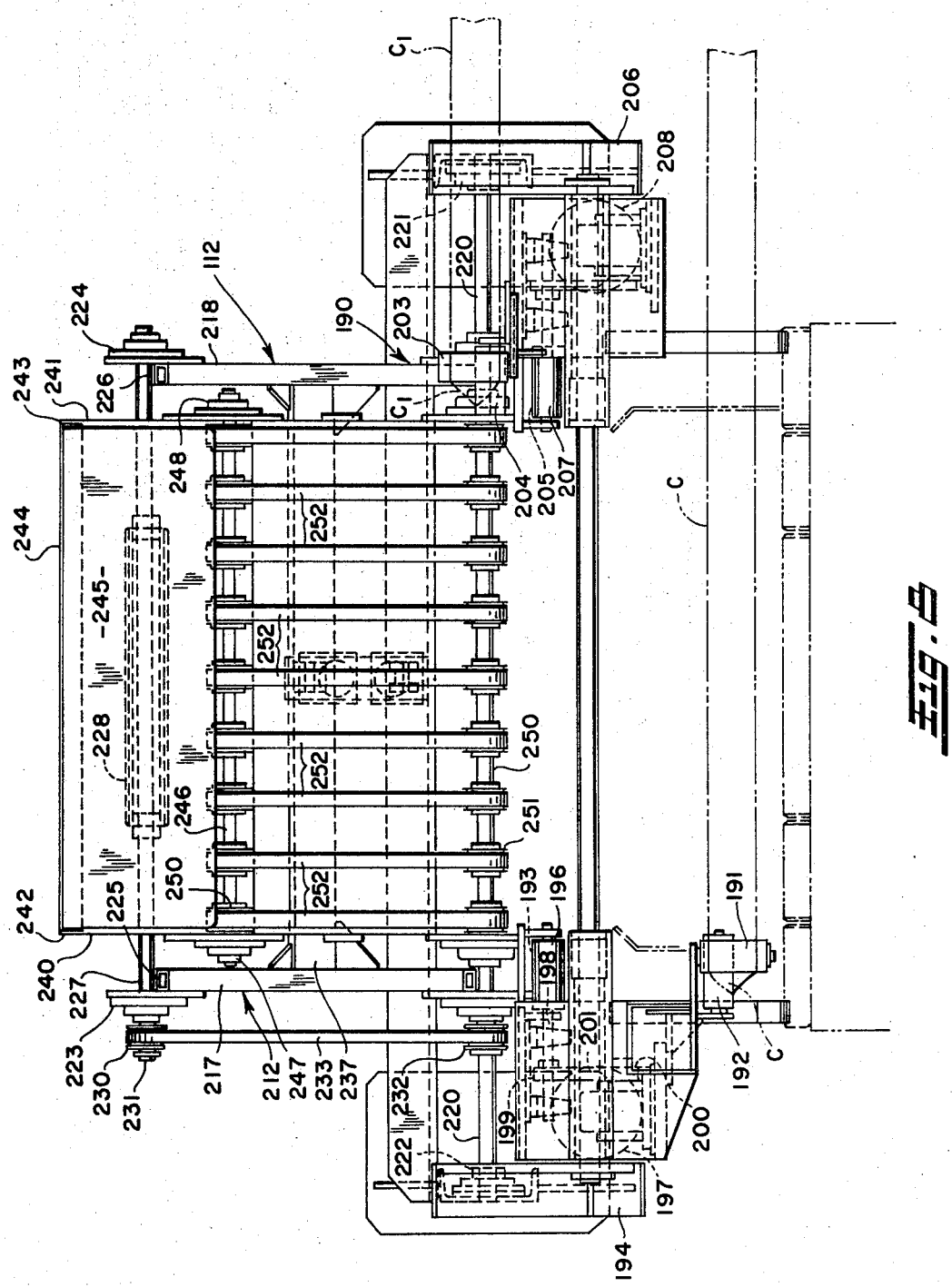

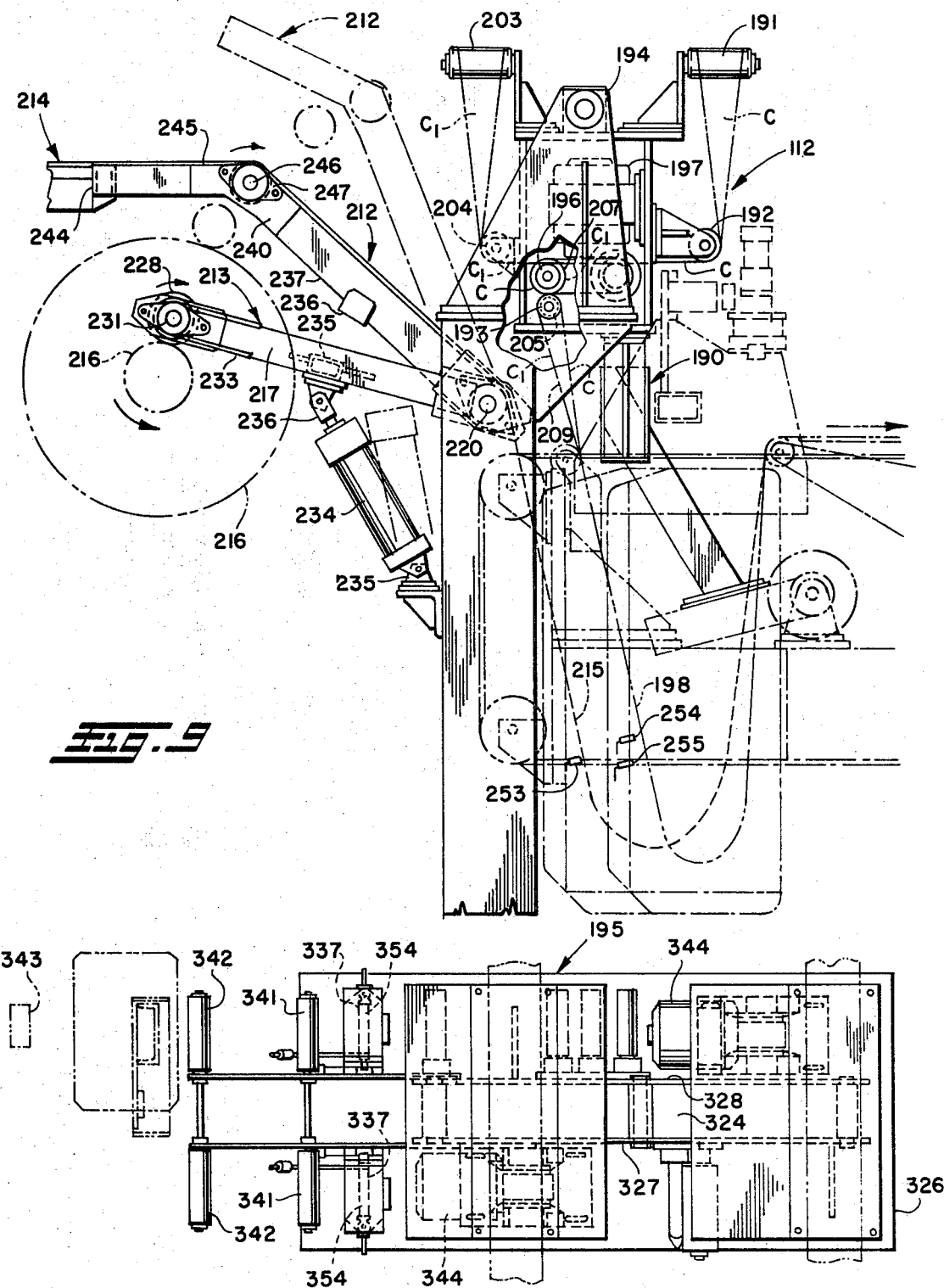

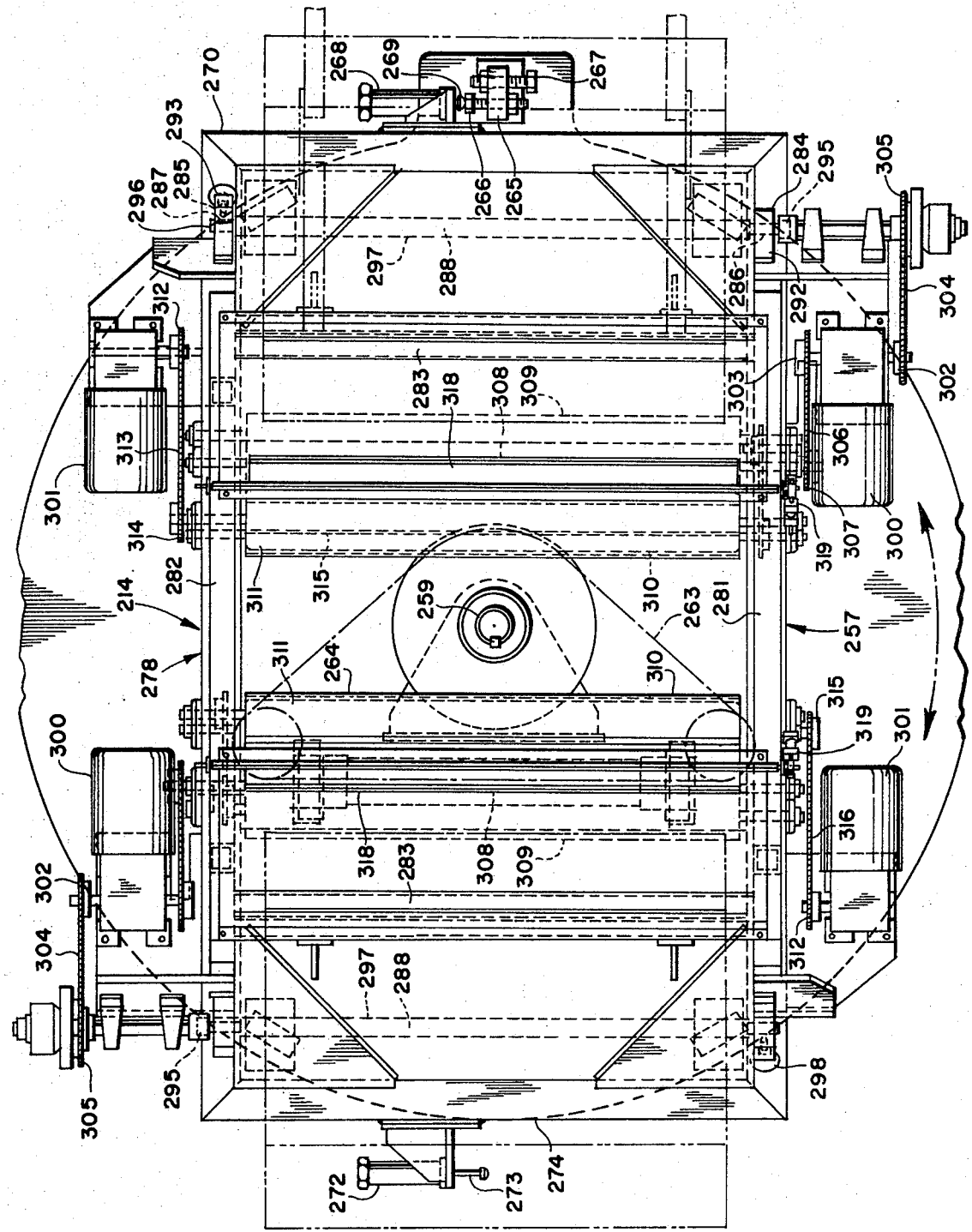

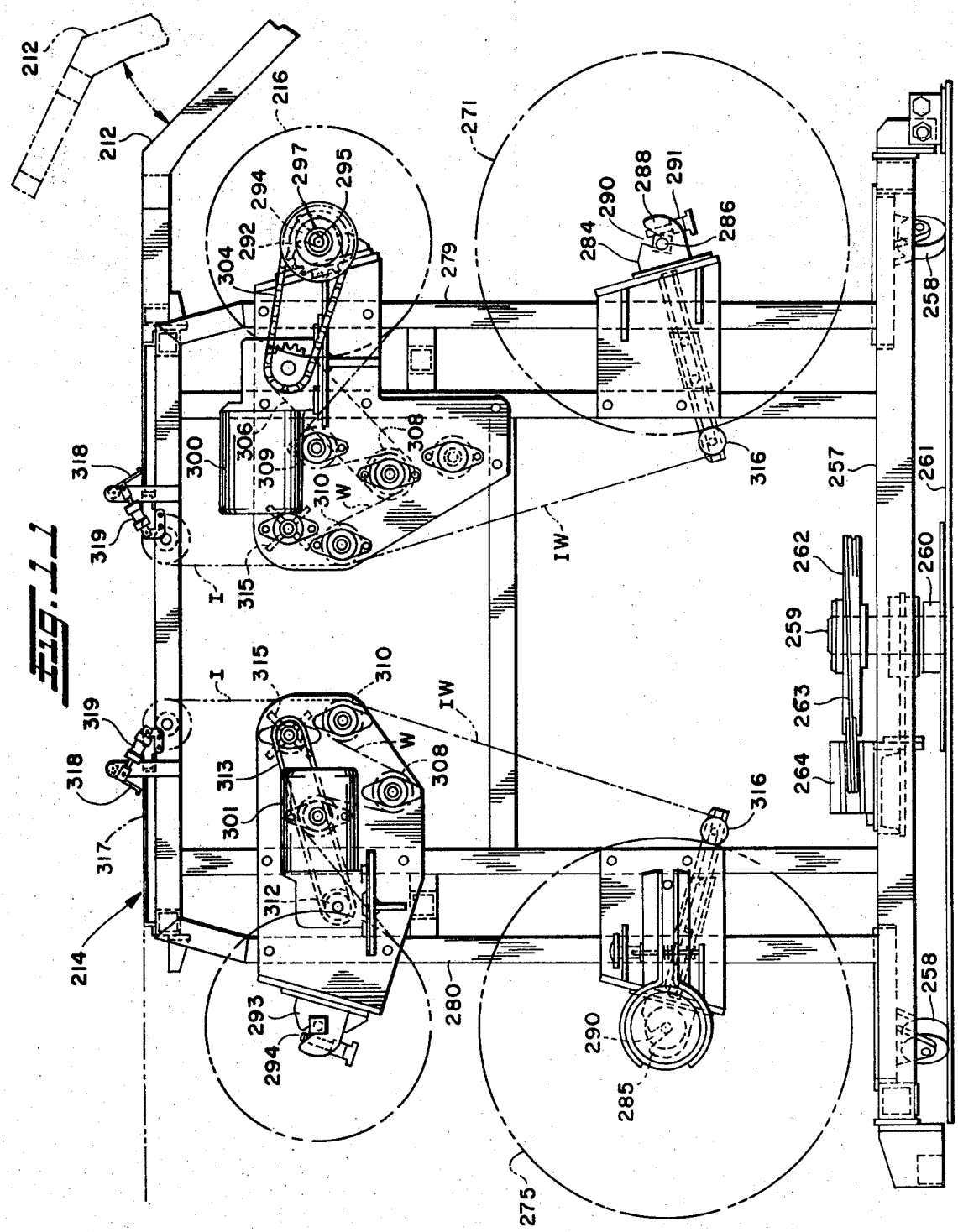

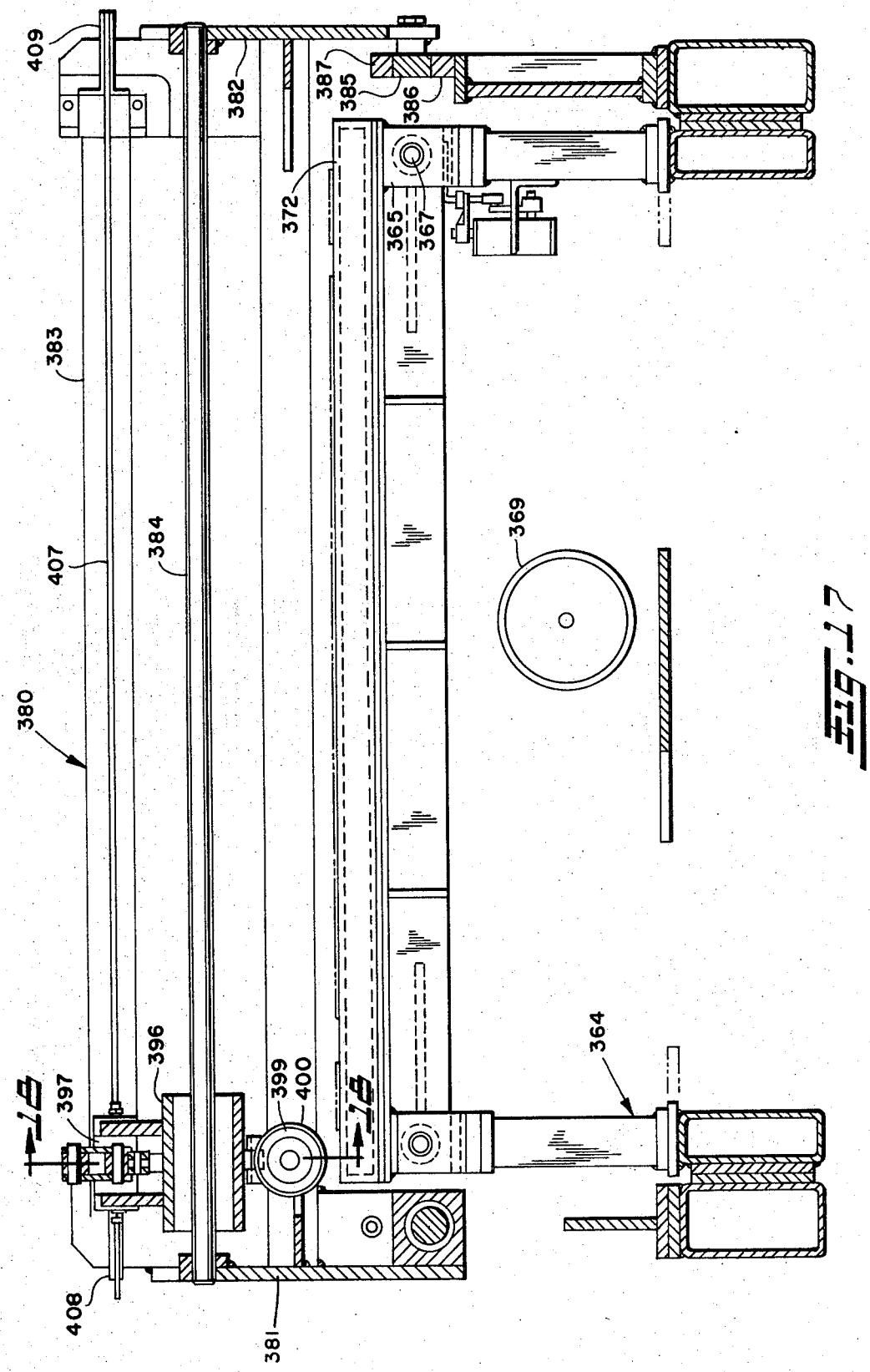

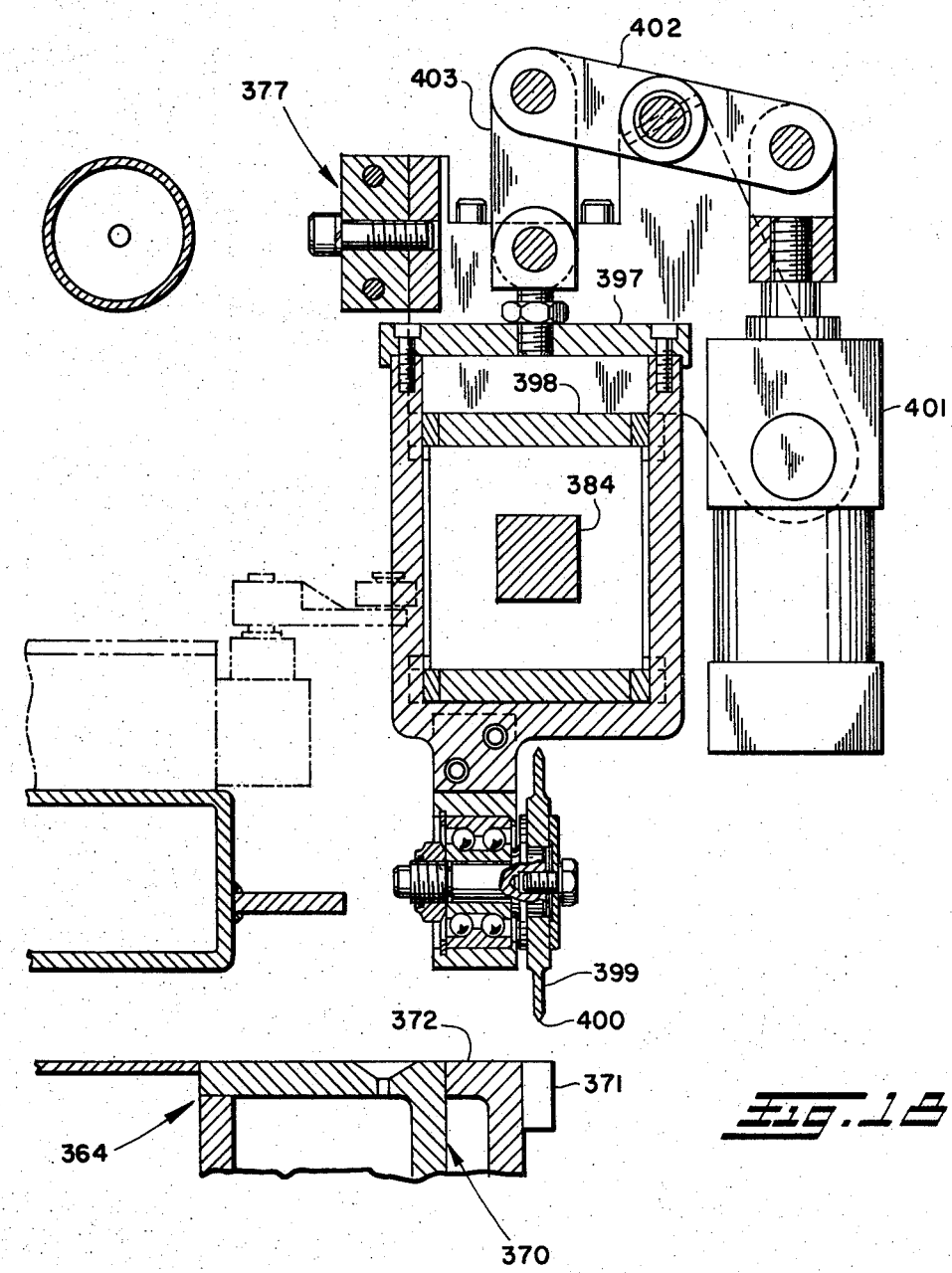

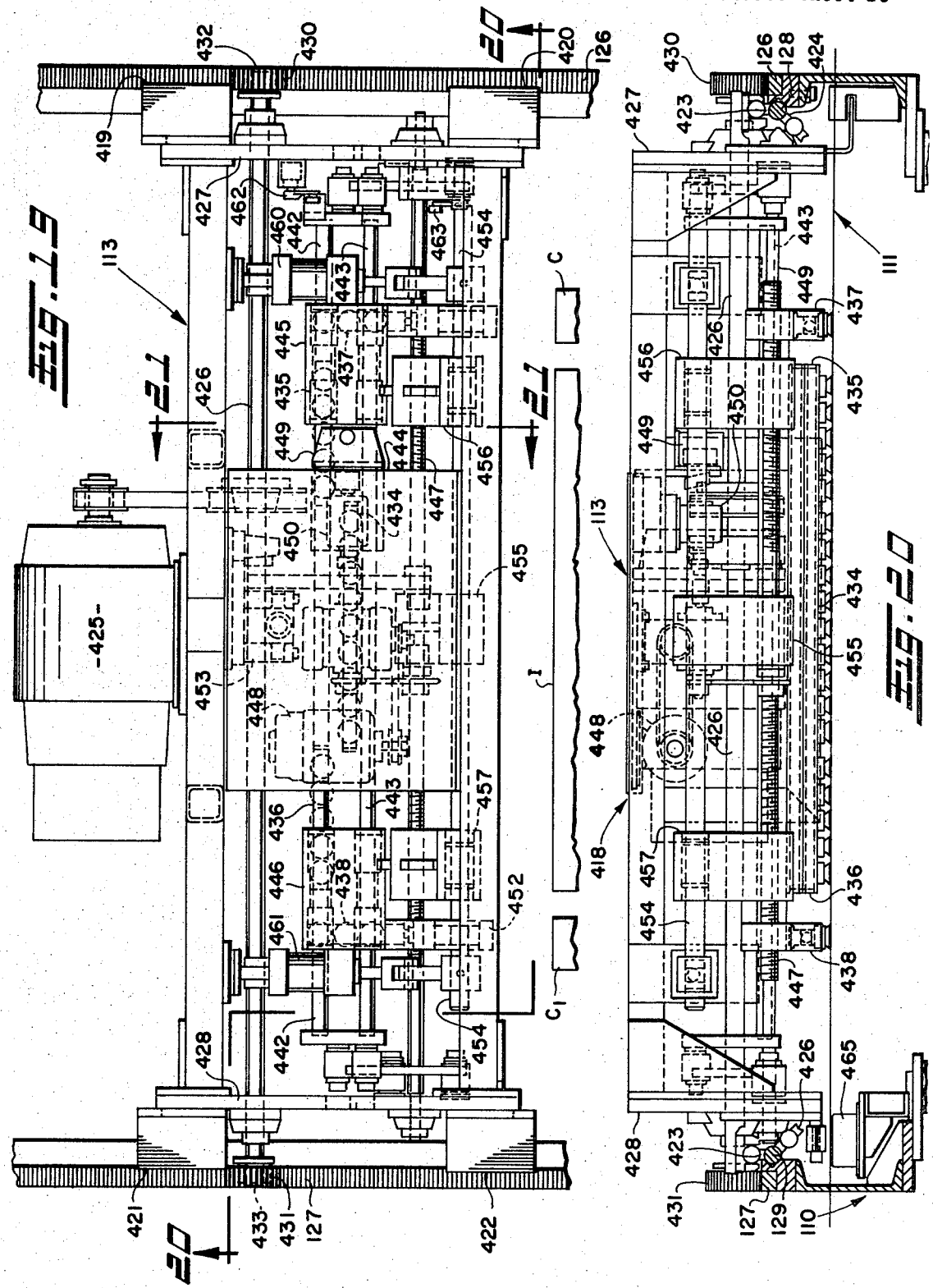

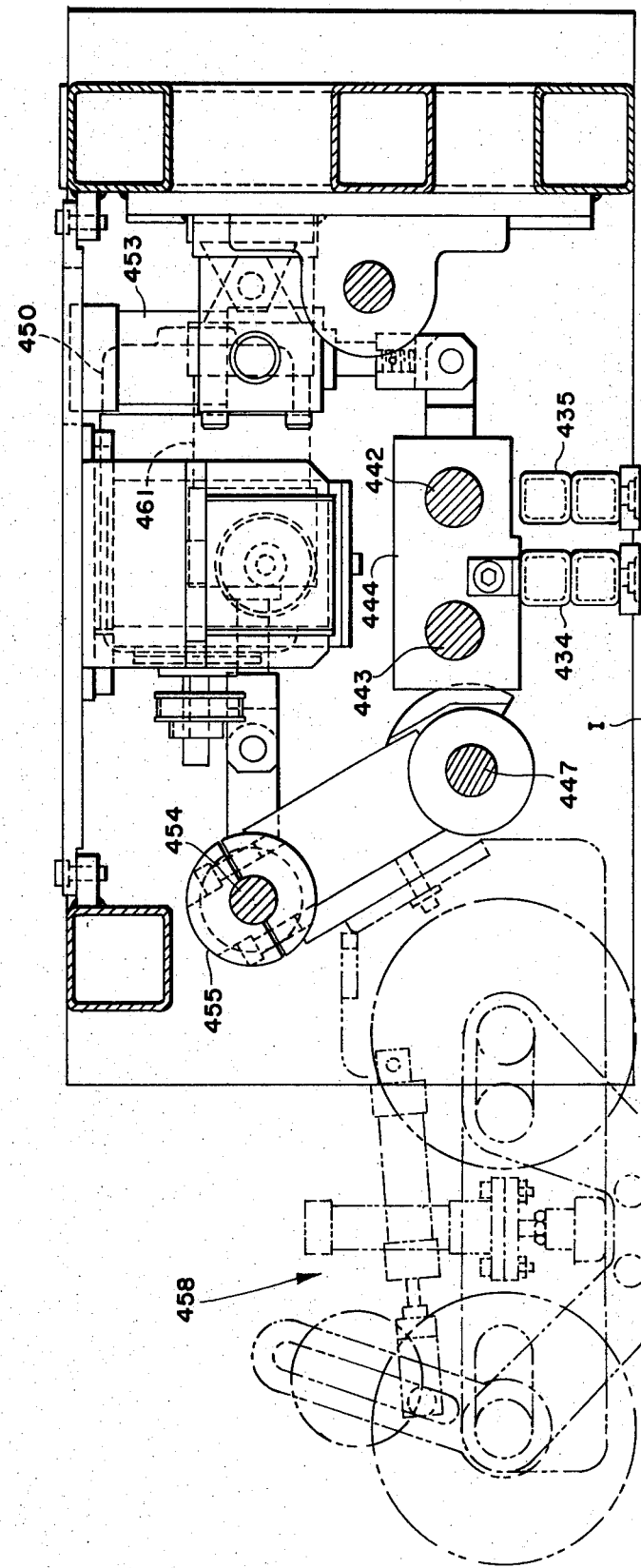

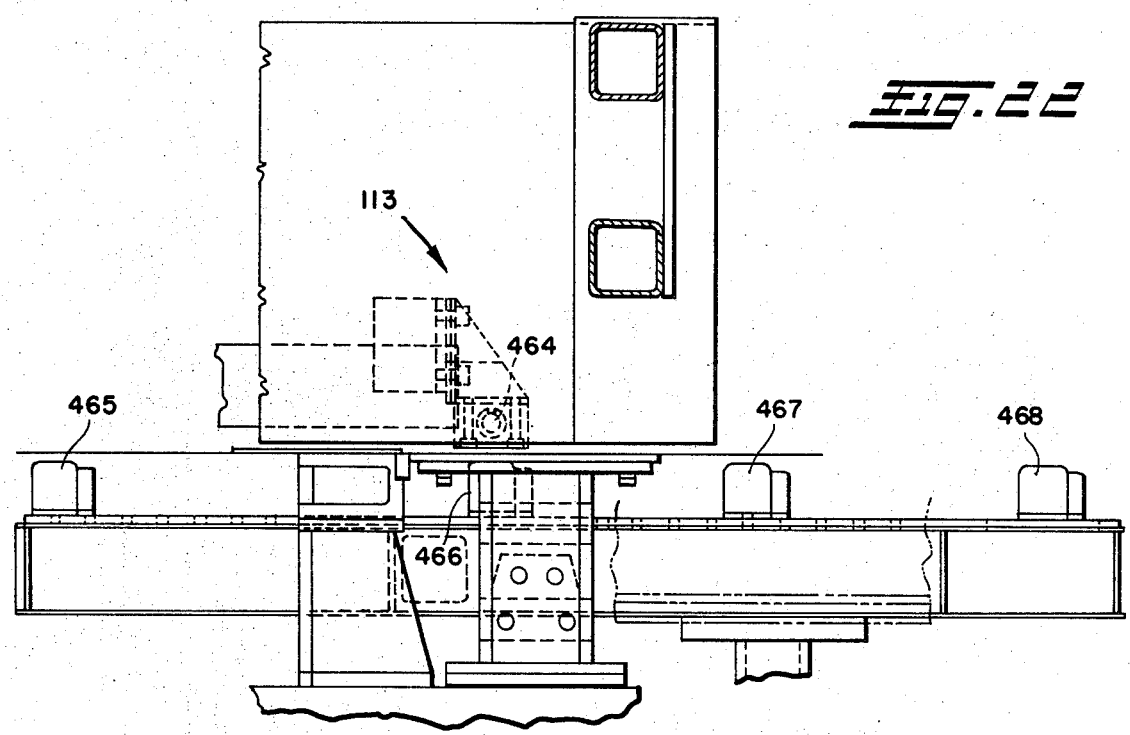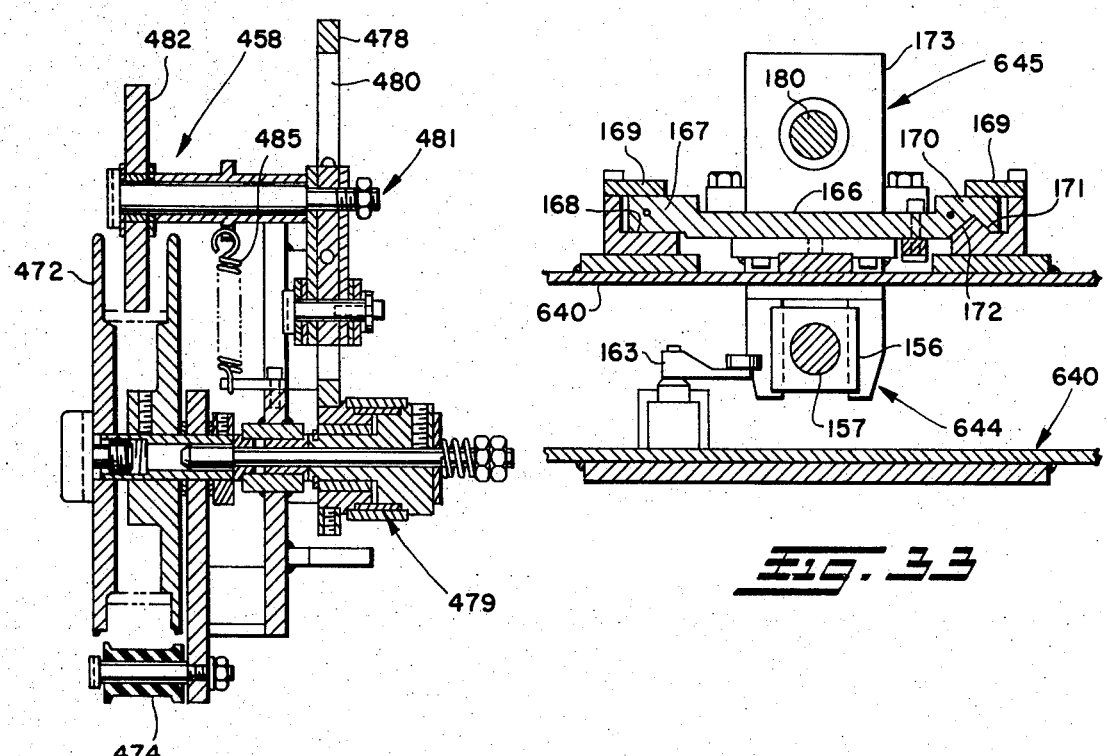

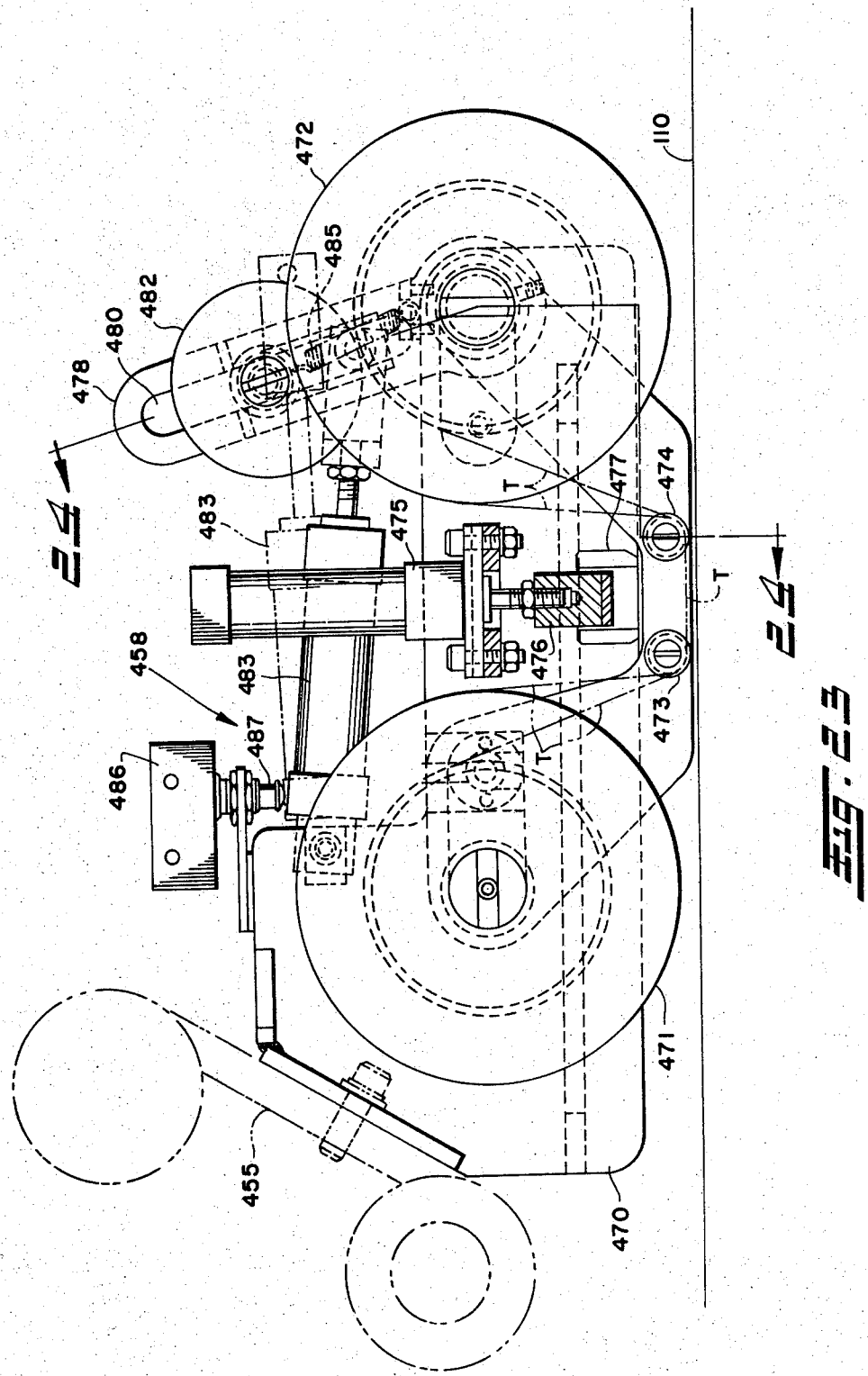

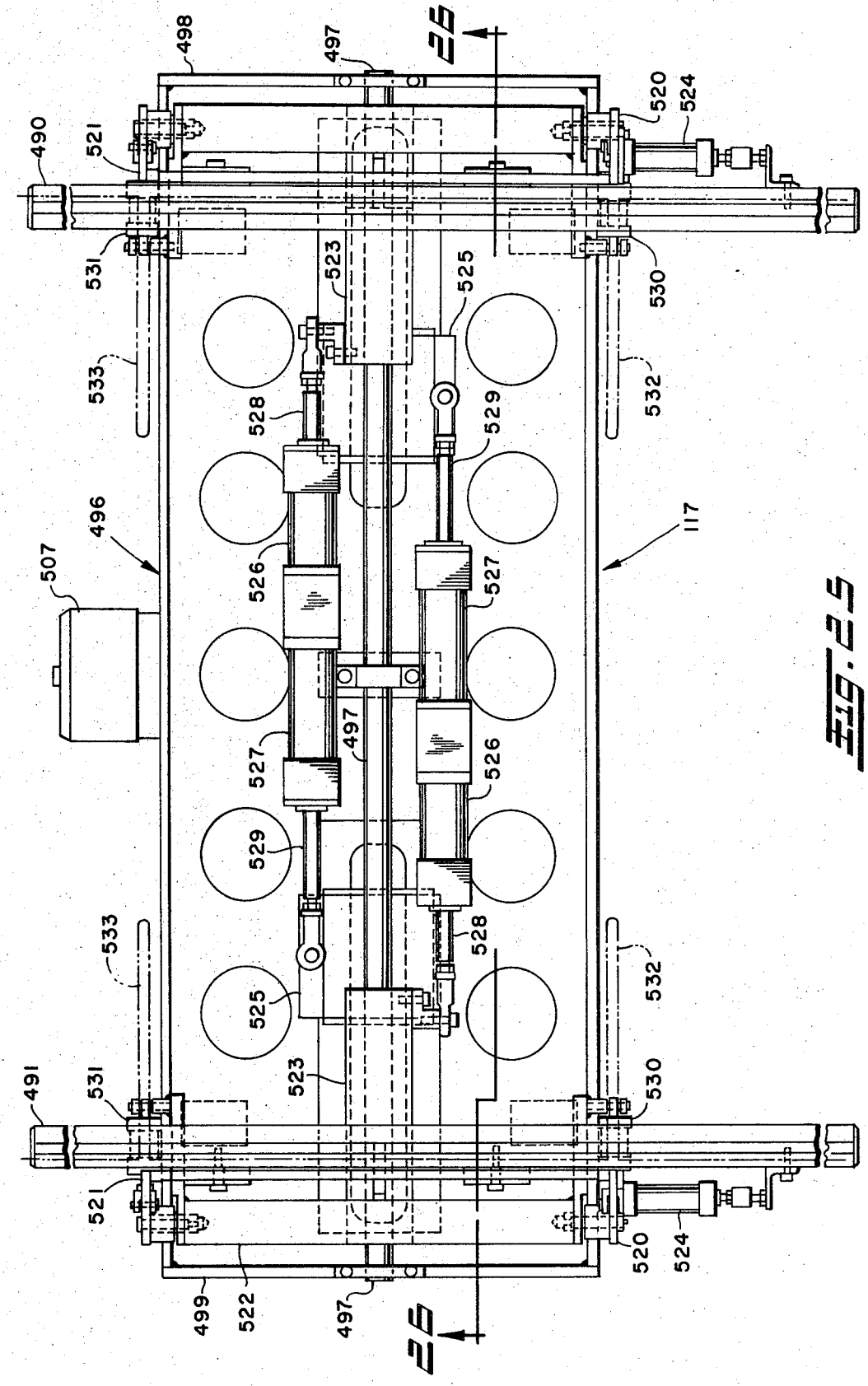

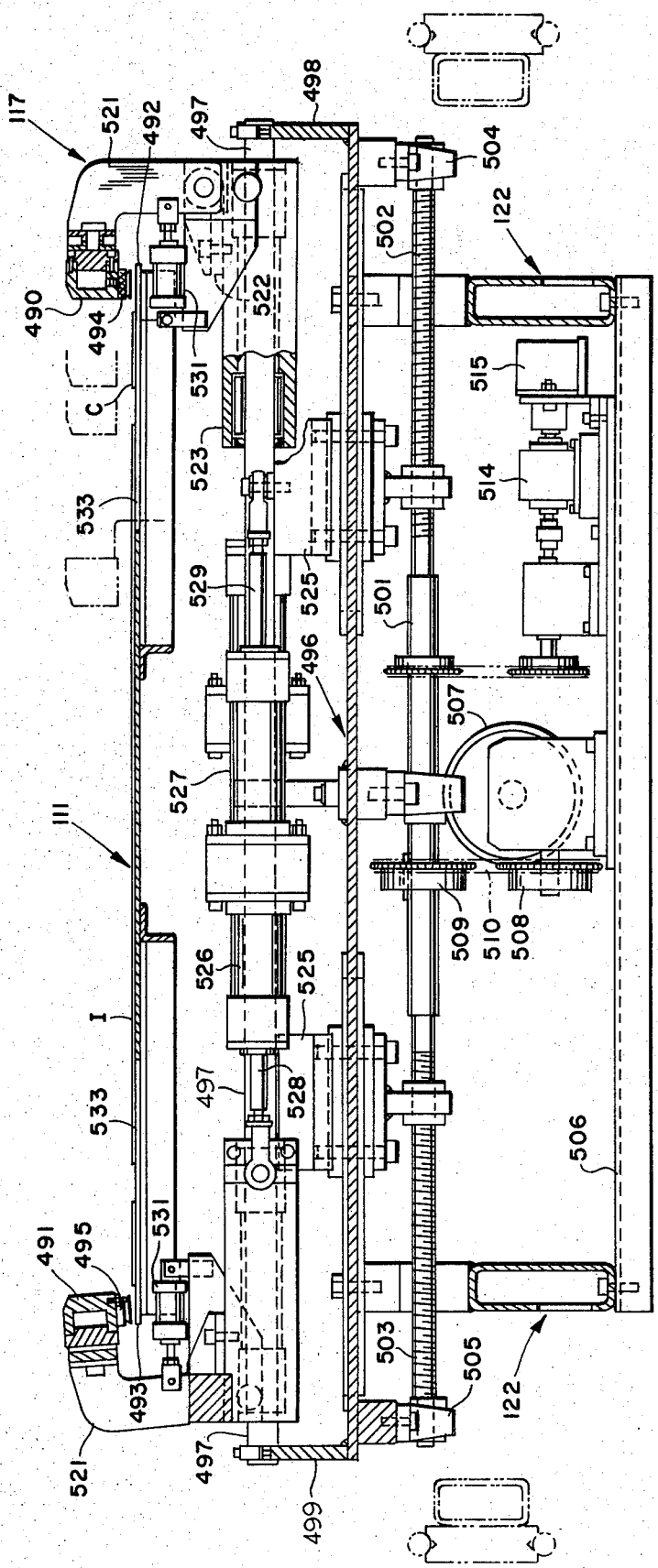

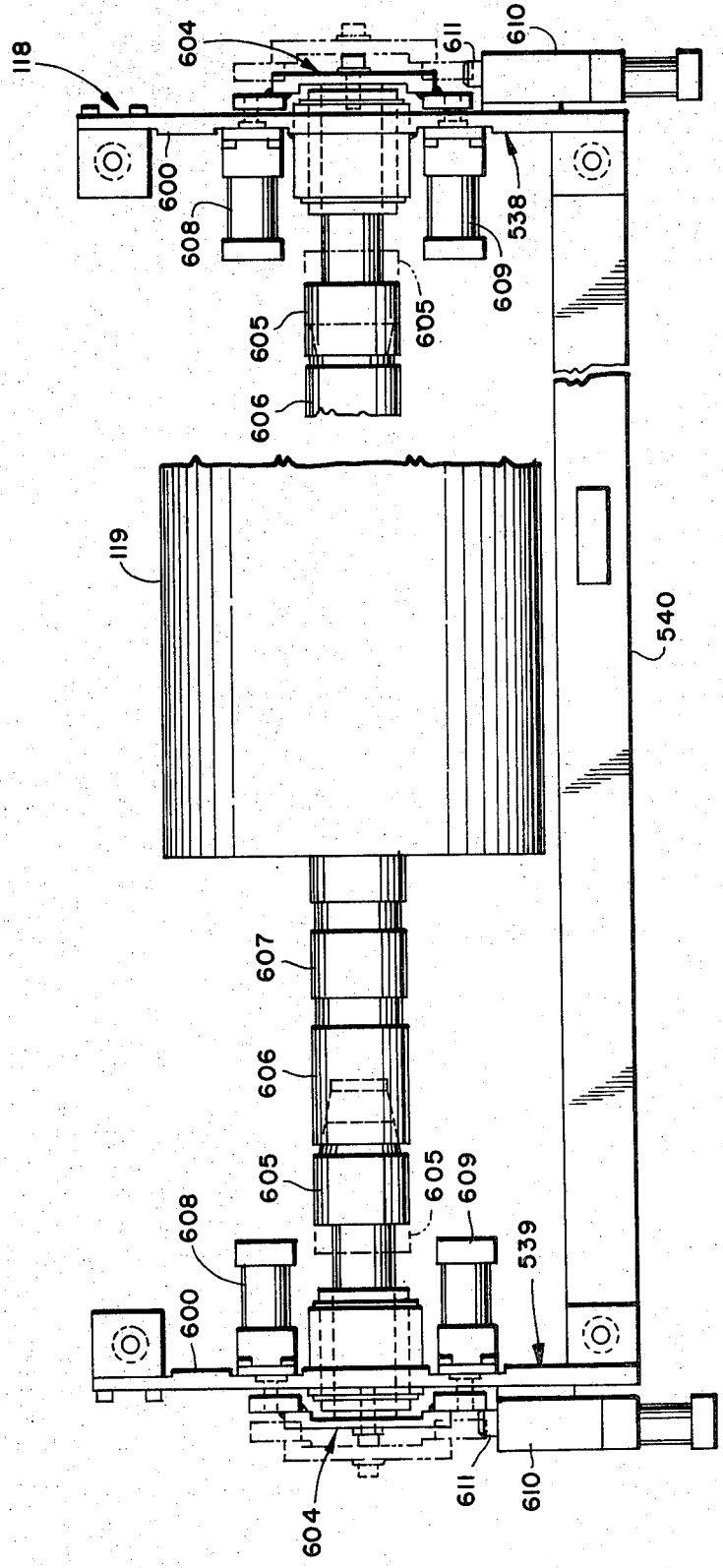

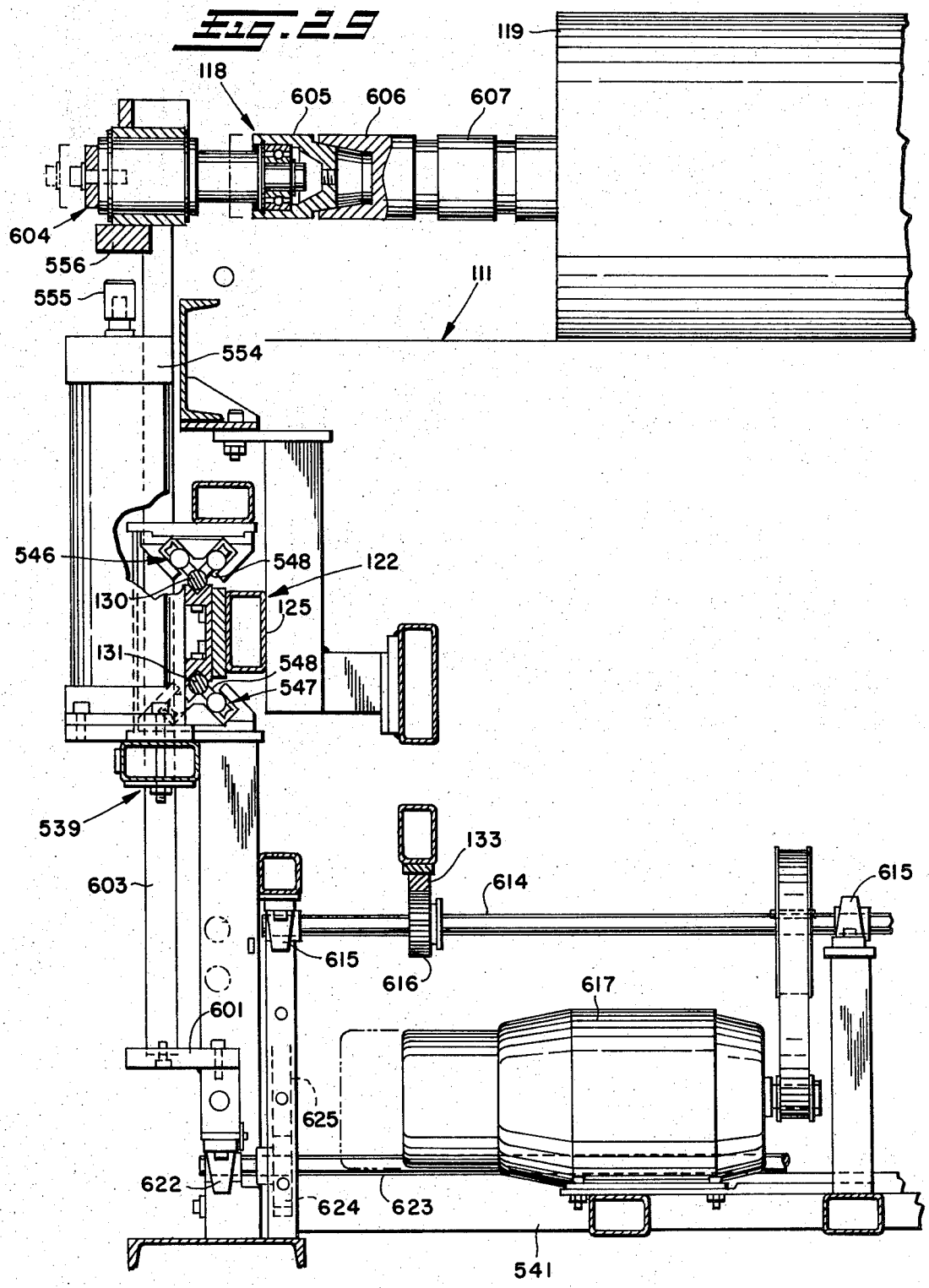

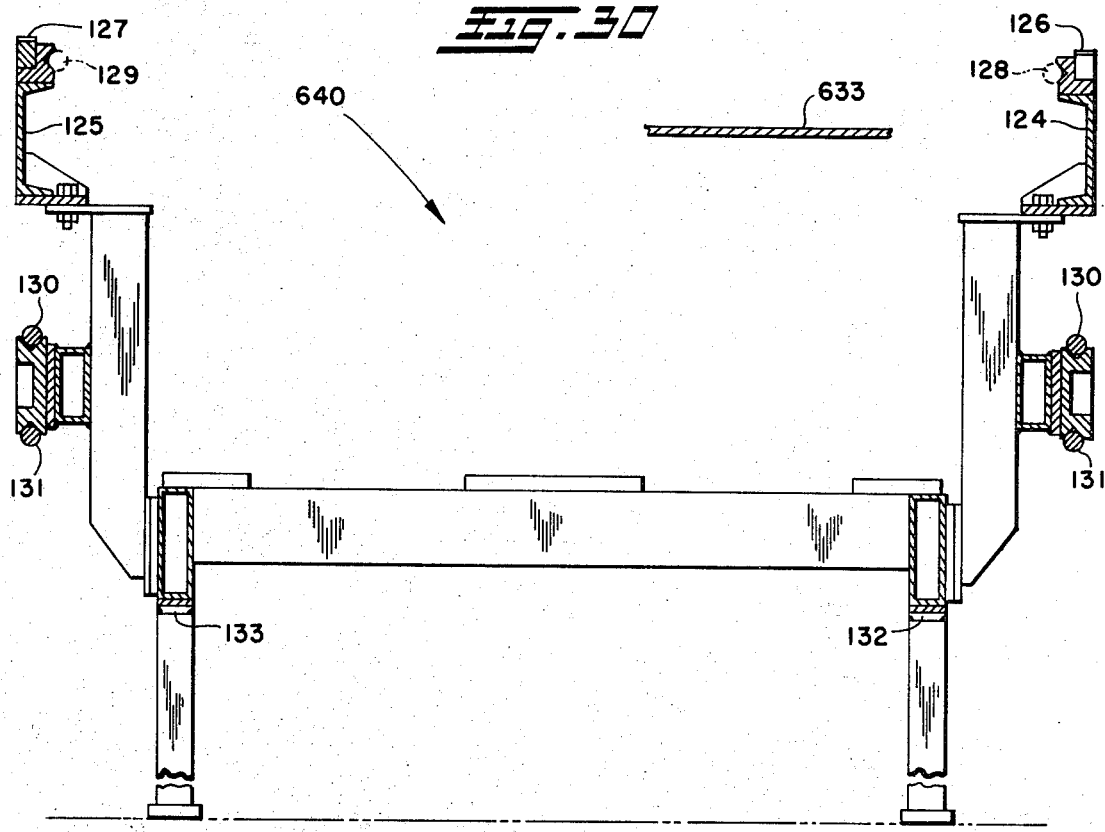
Fig. 30
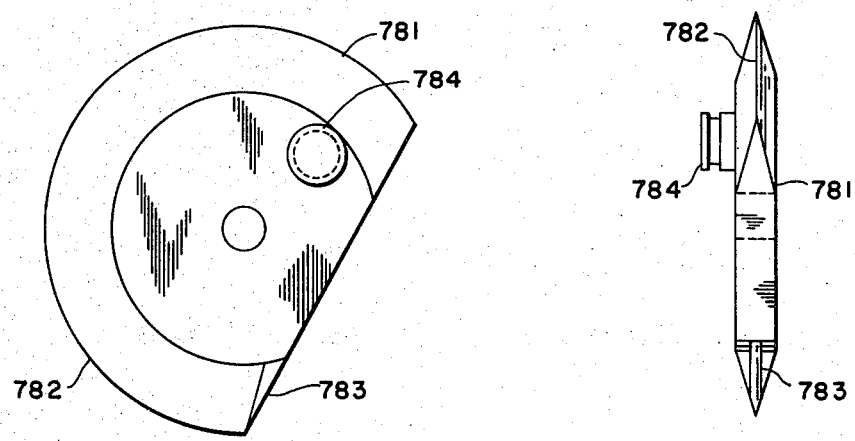
Fig. 42
Fig. 43

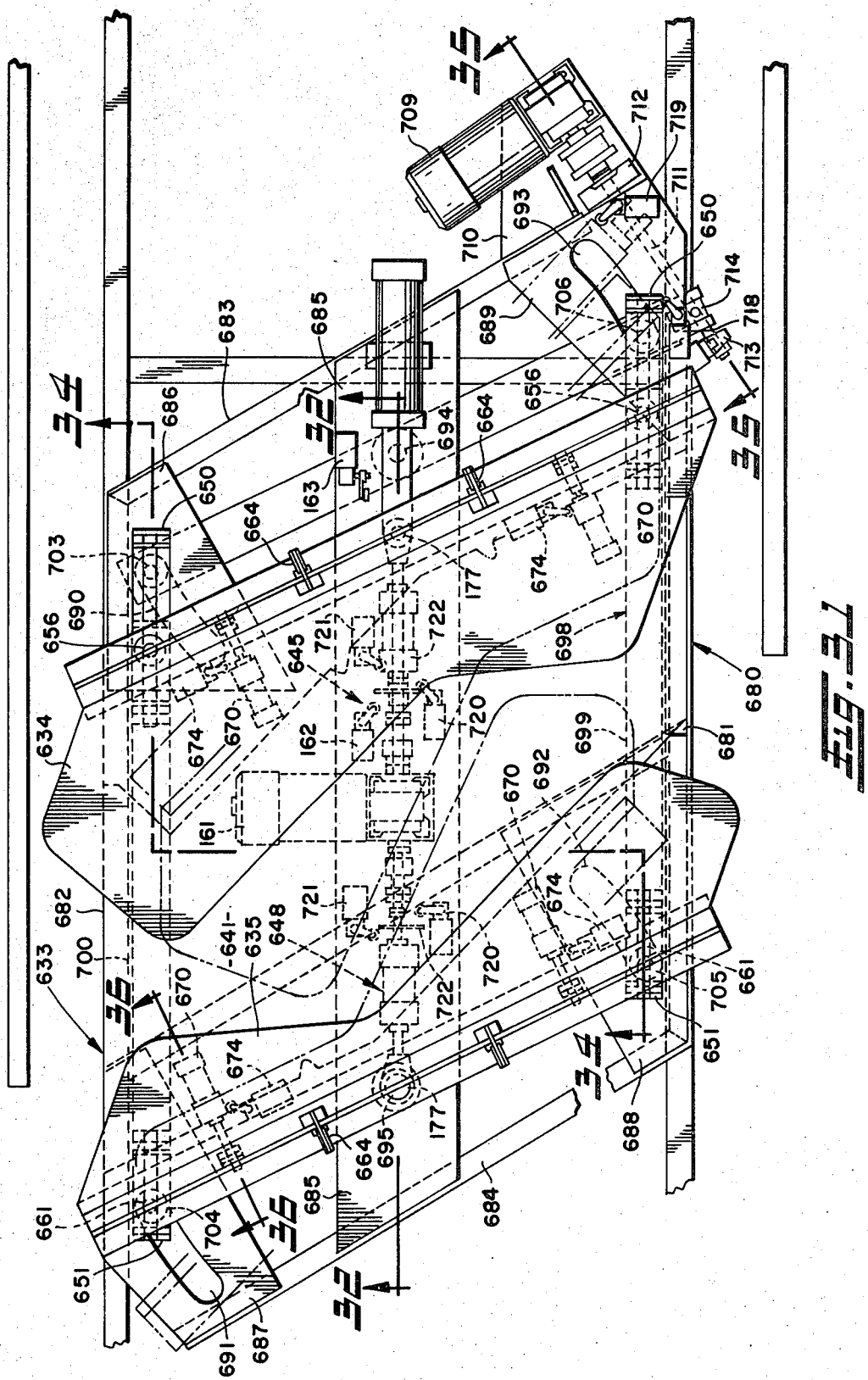

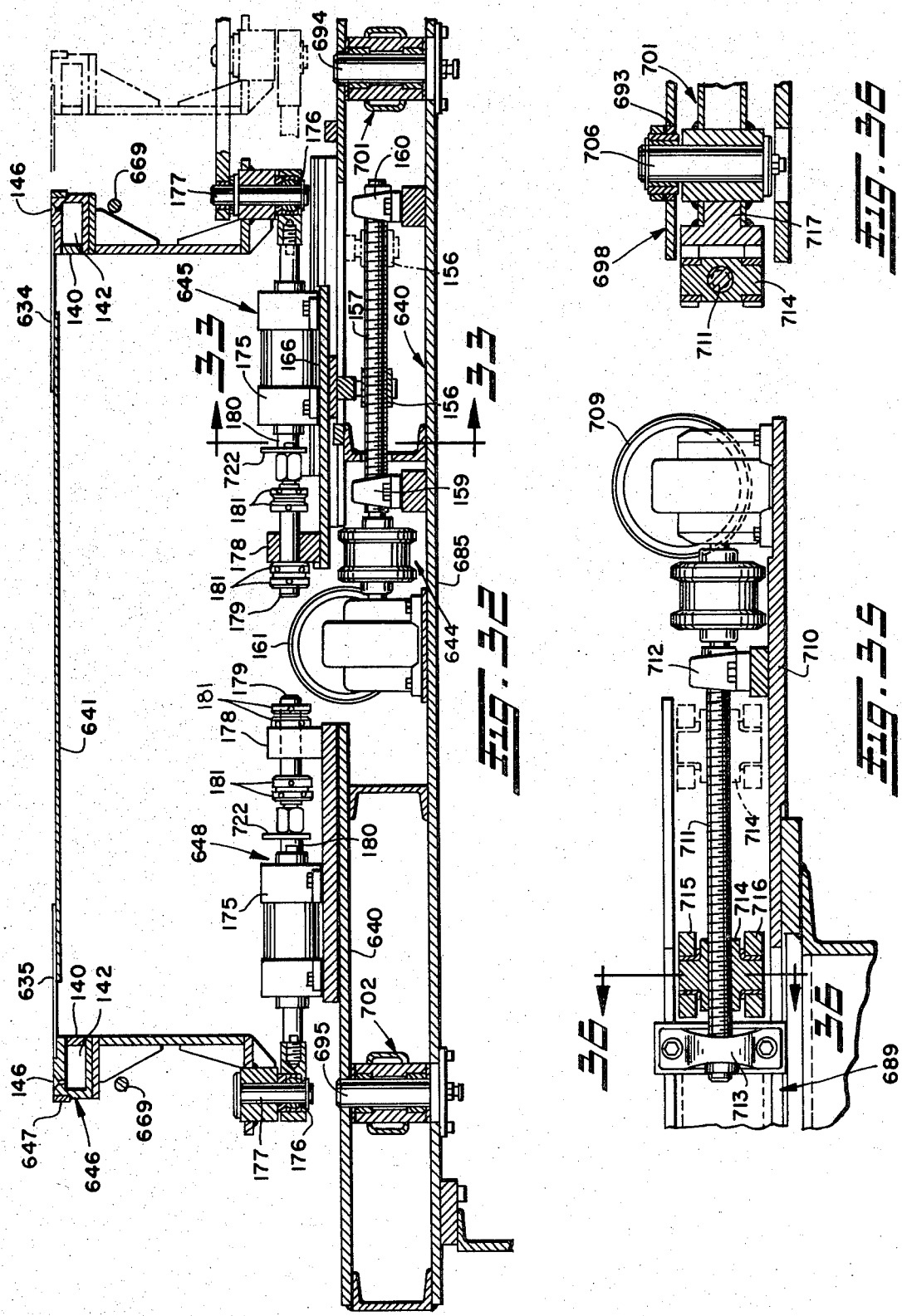

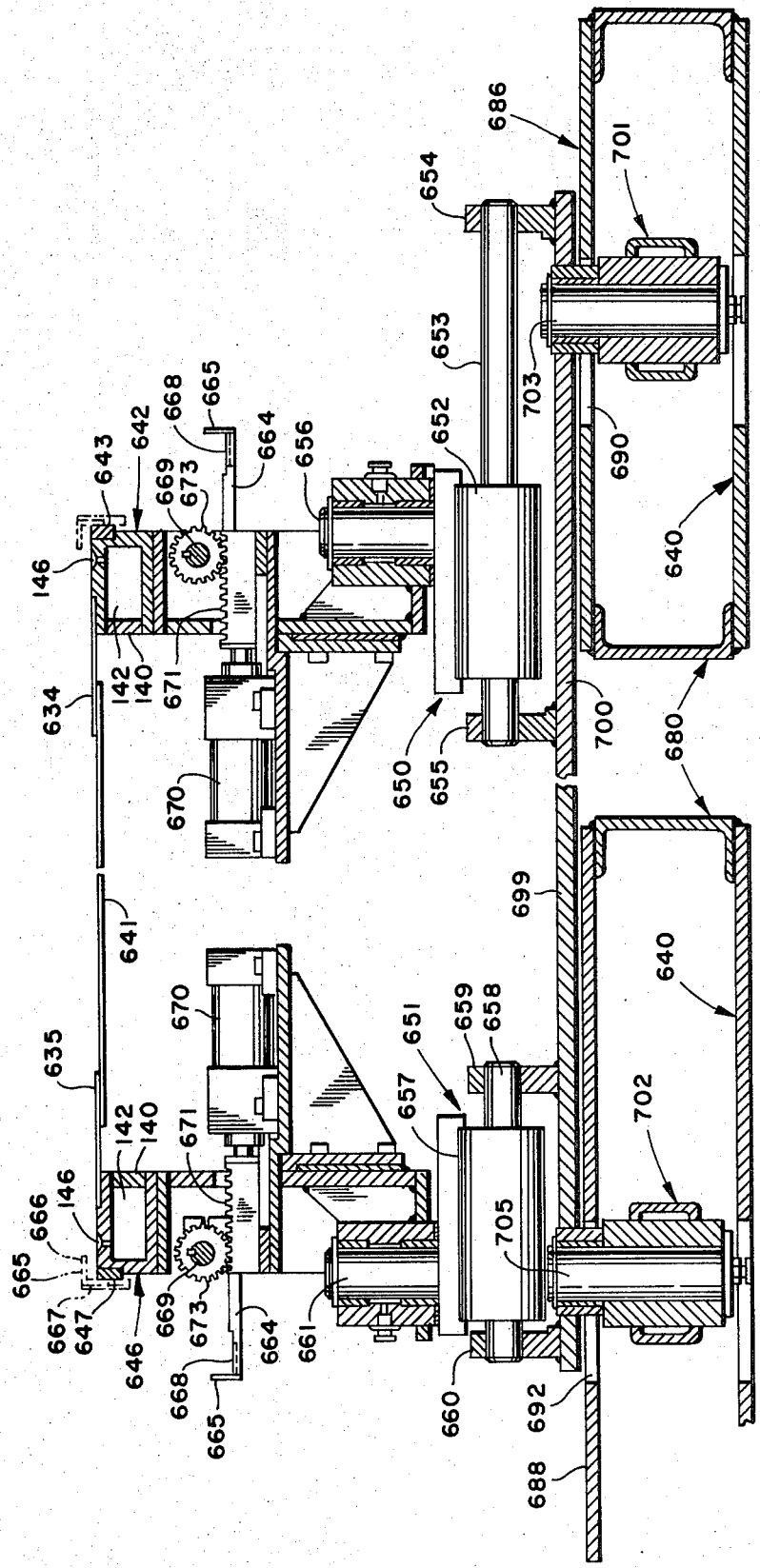

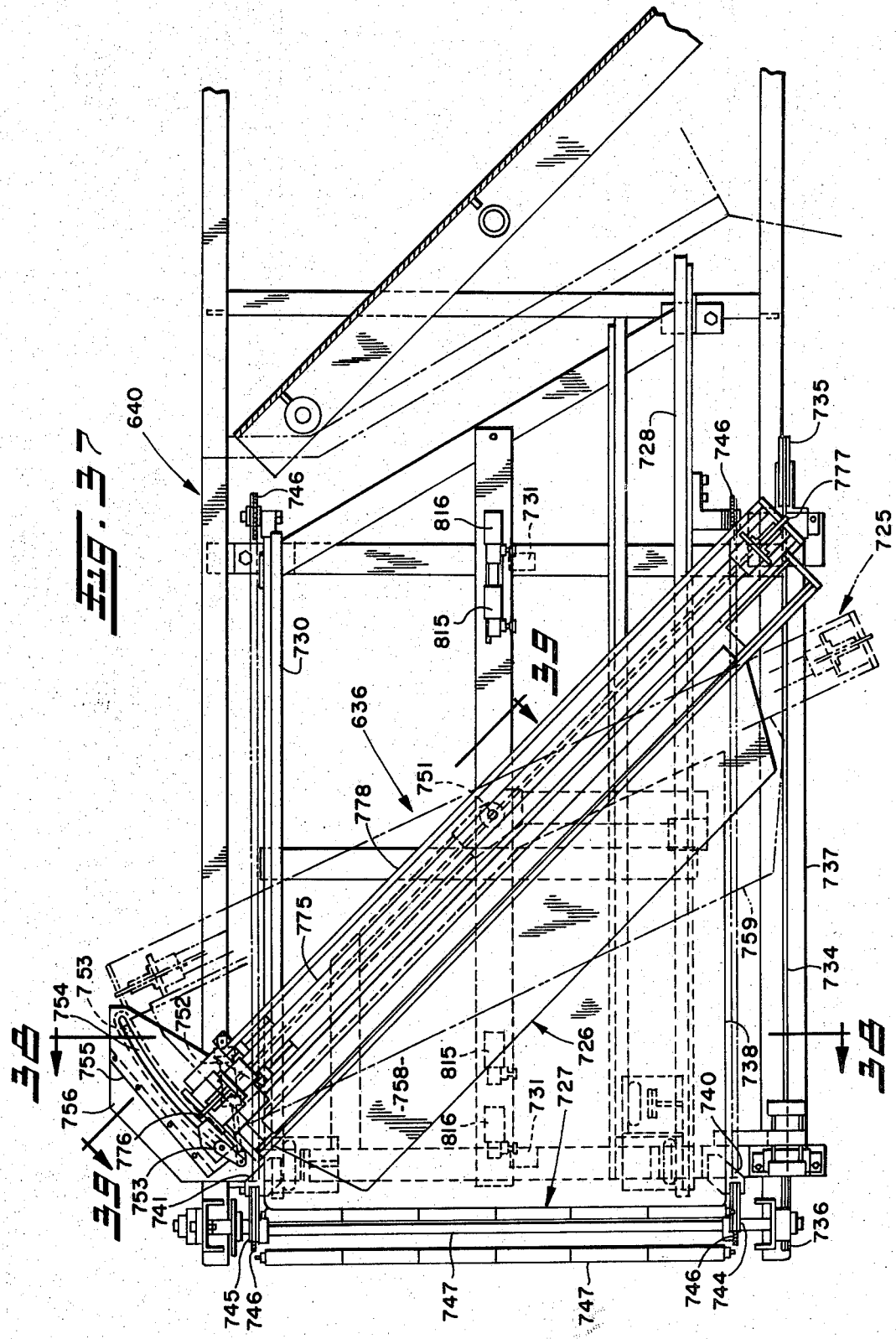

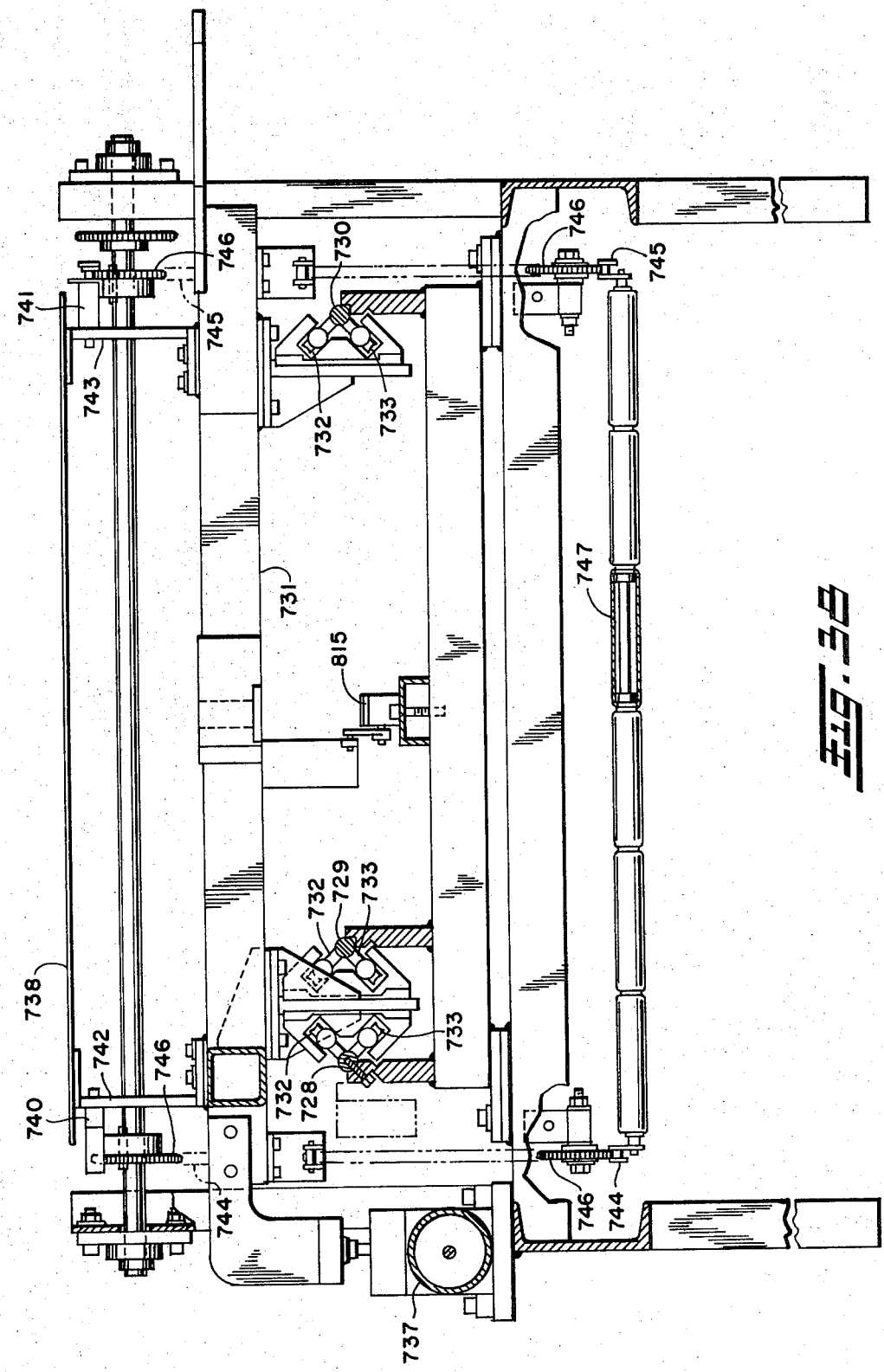

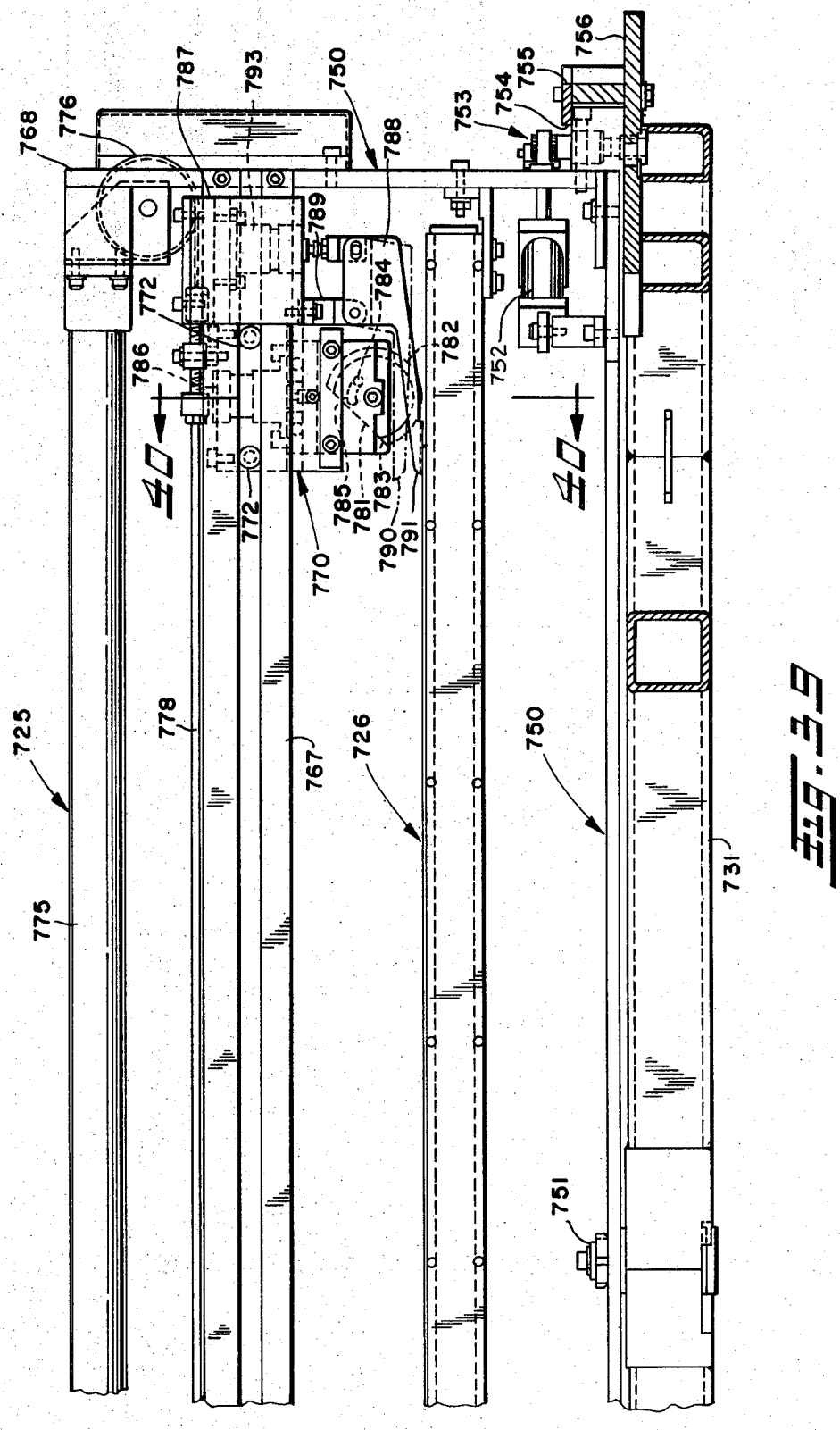

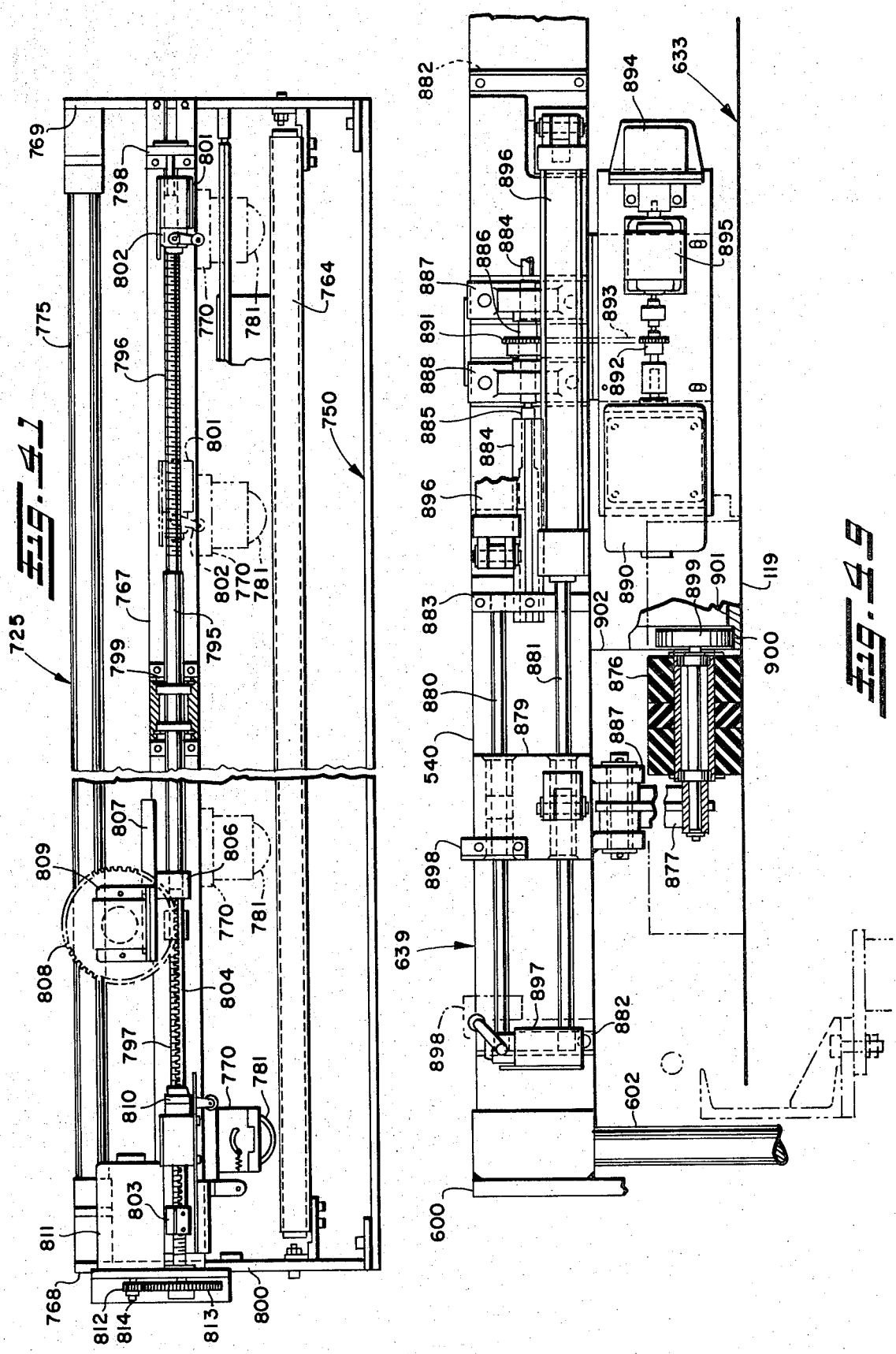

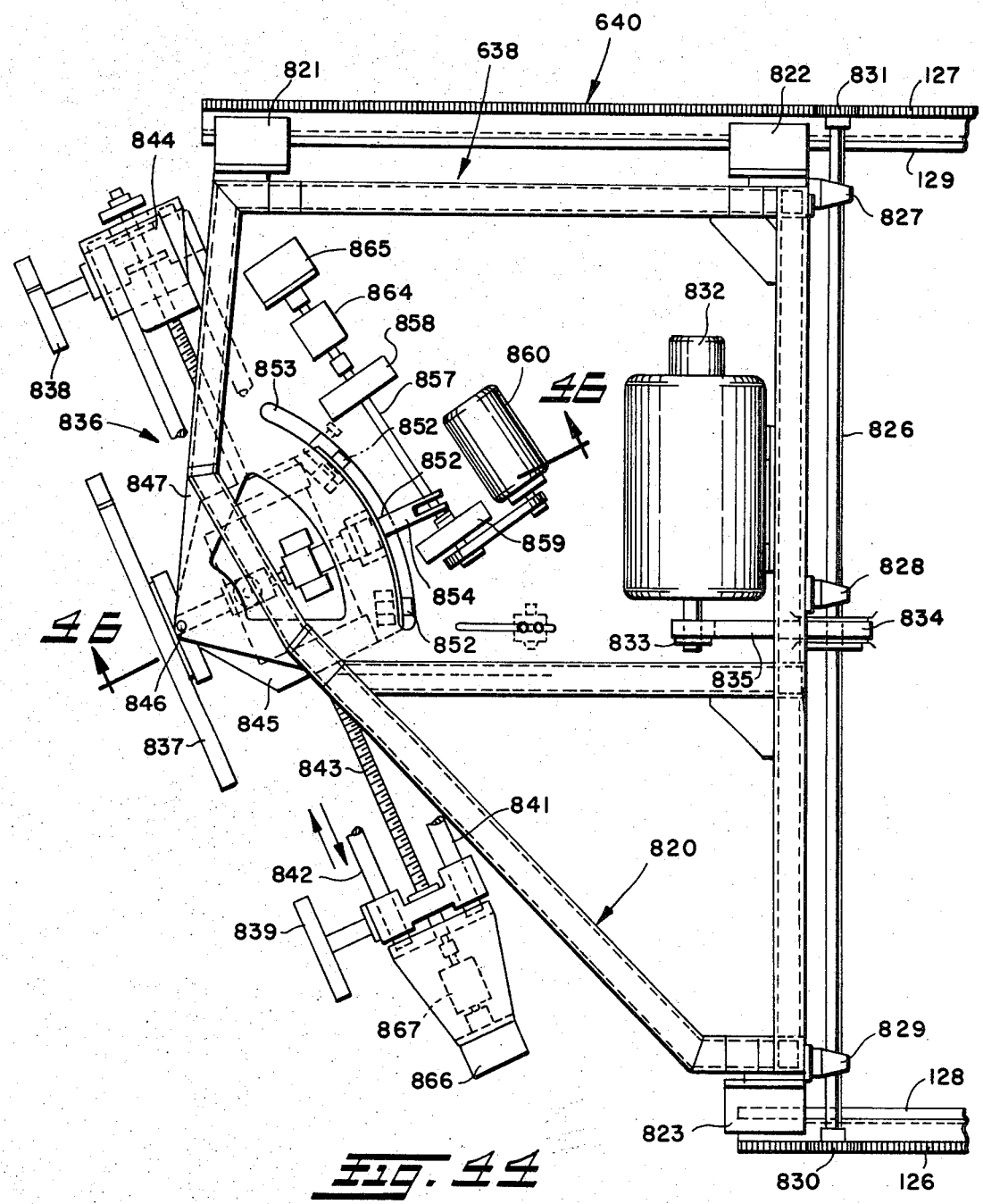

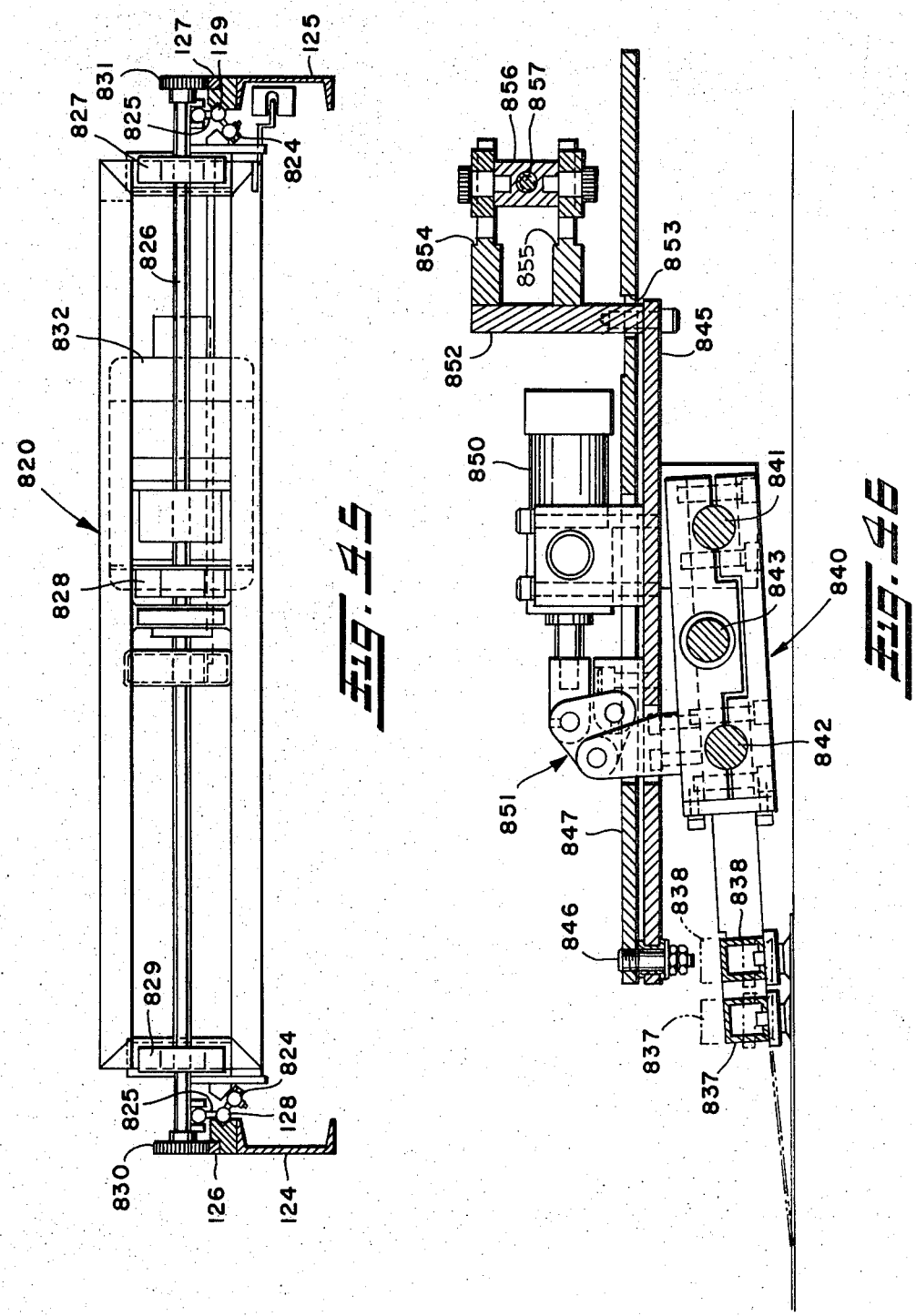

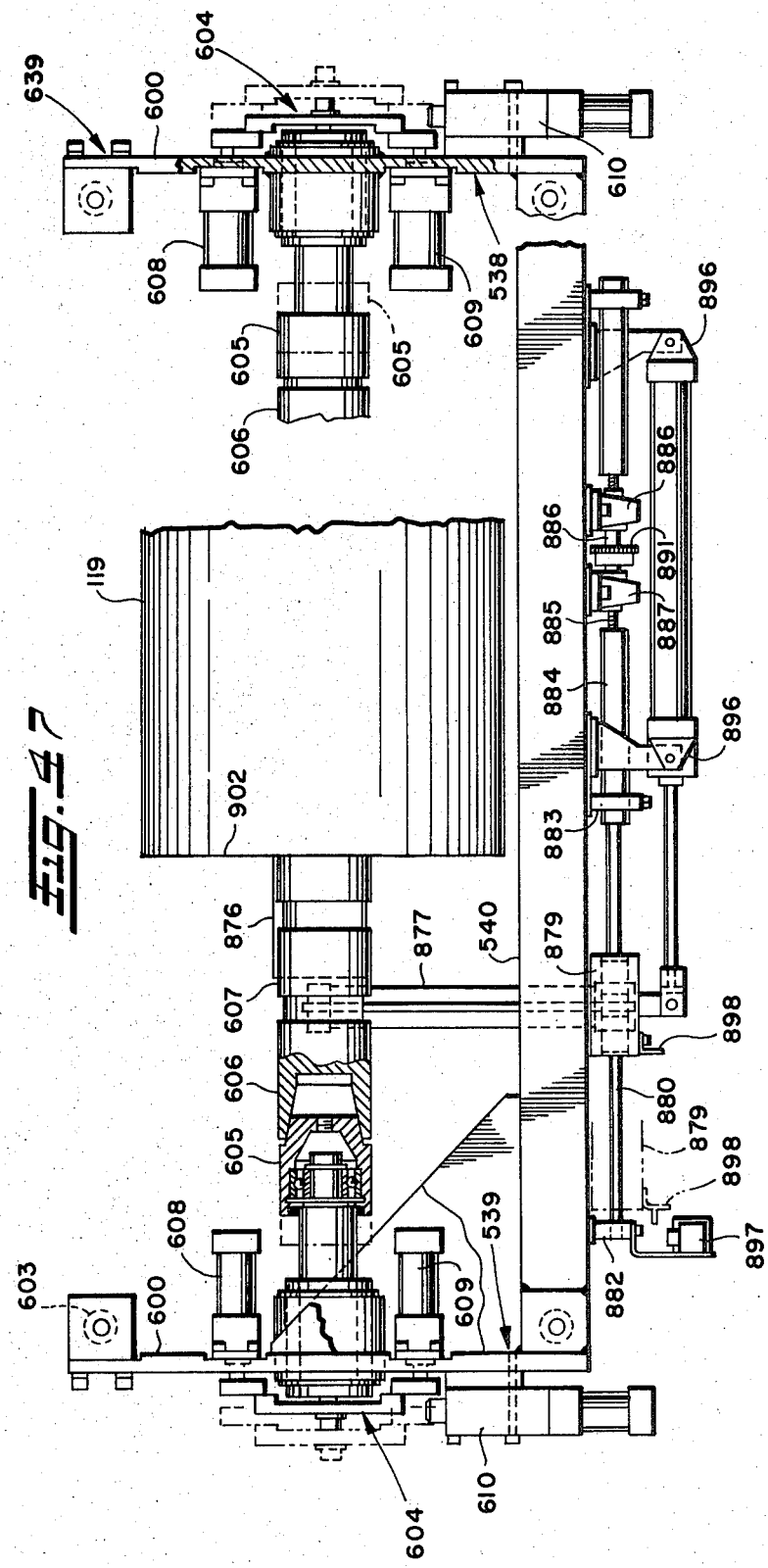

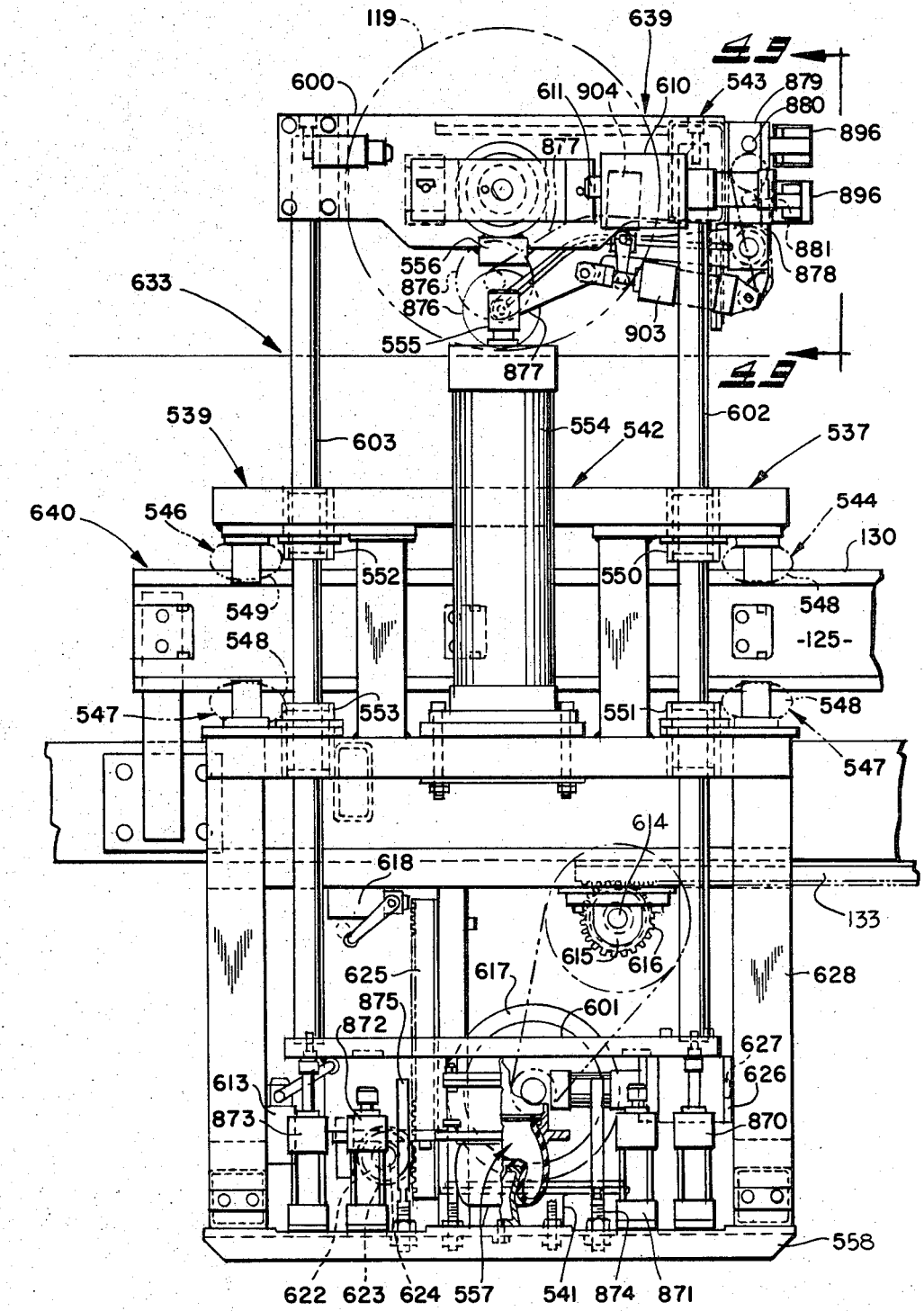

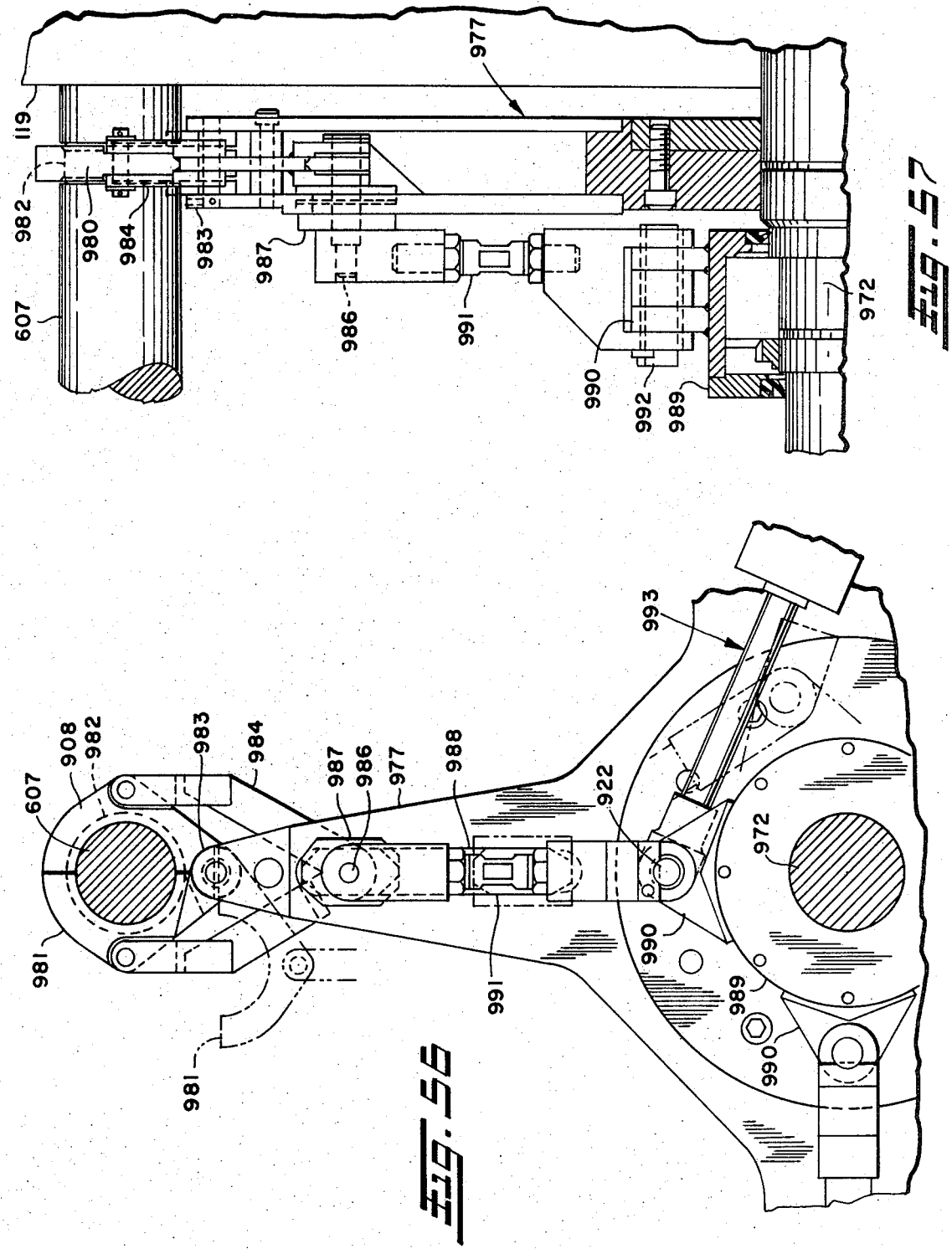

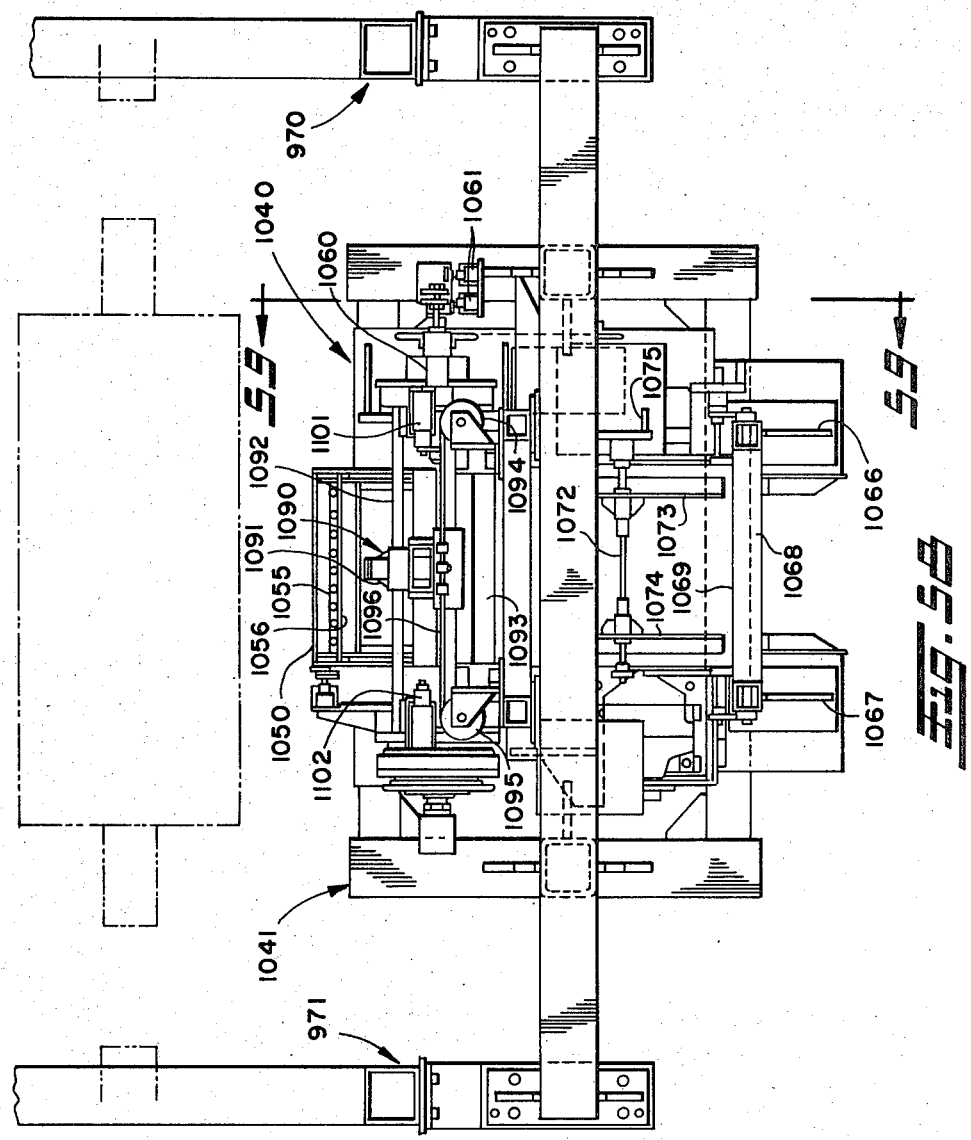

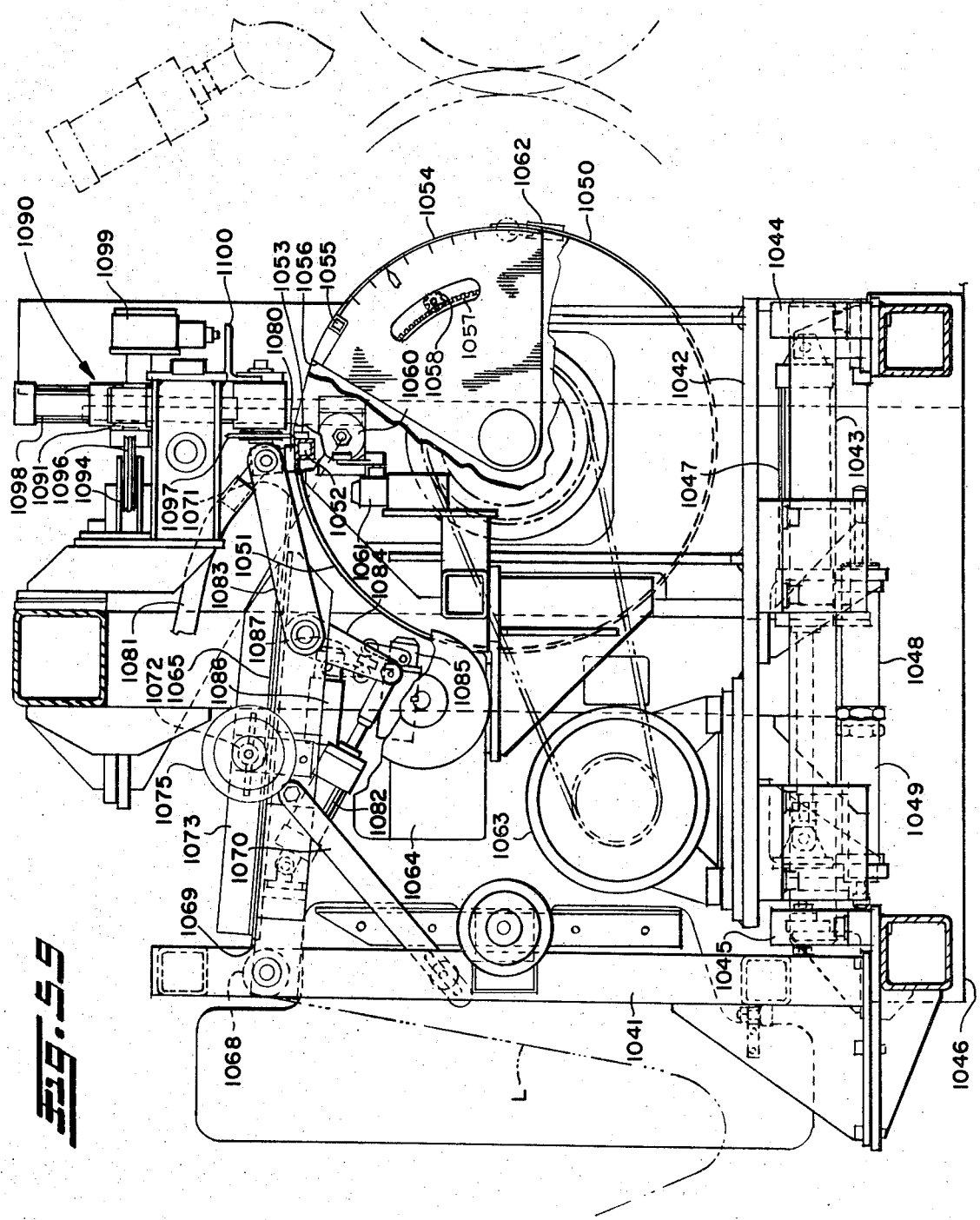

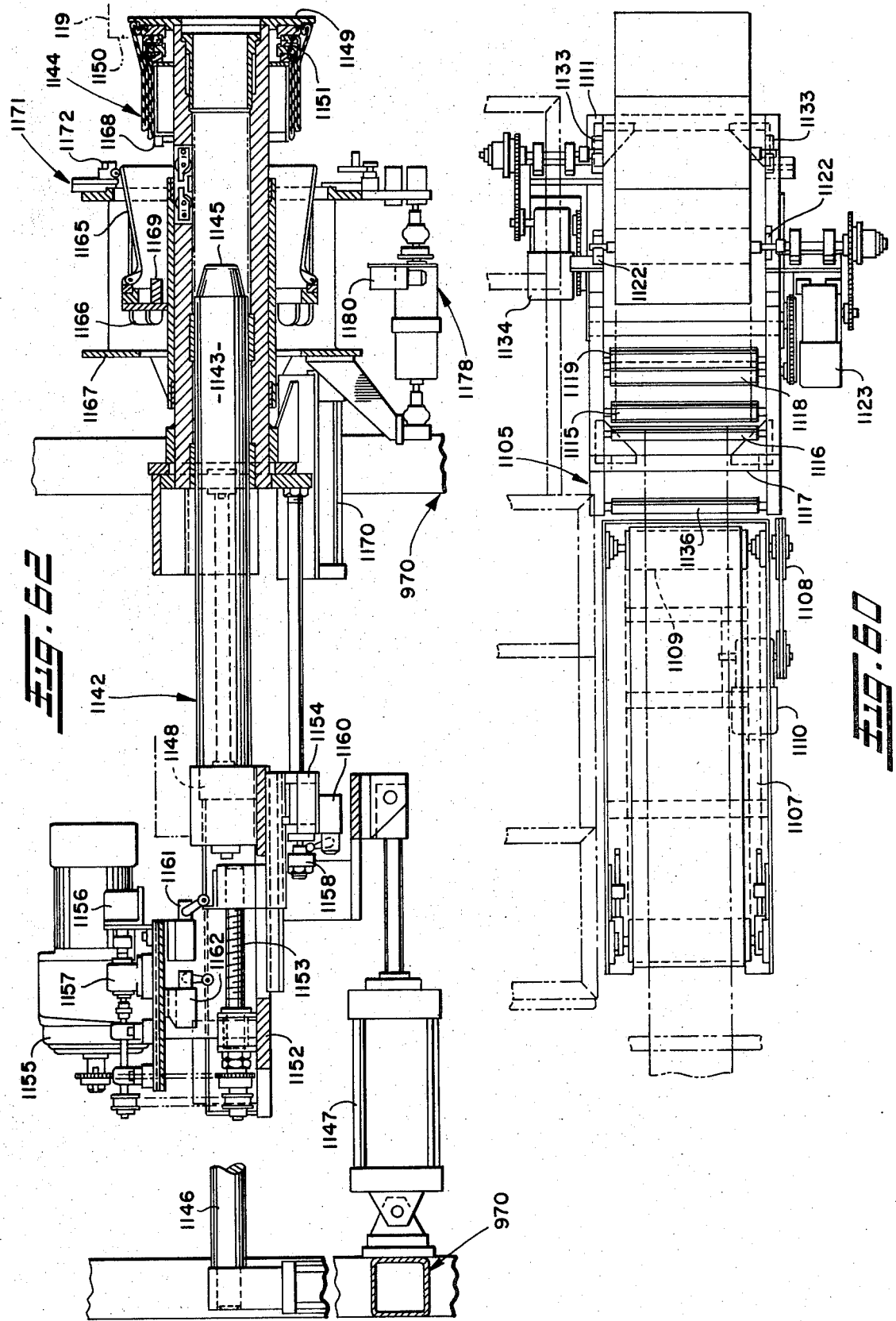

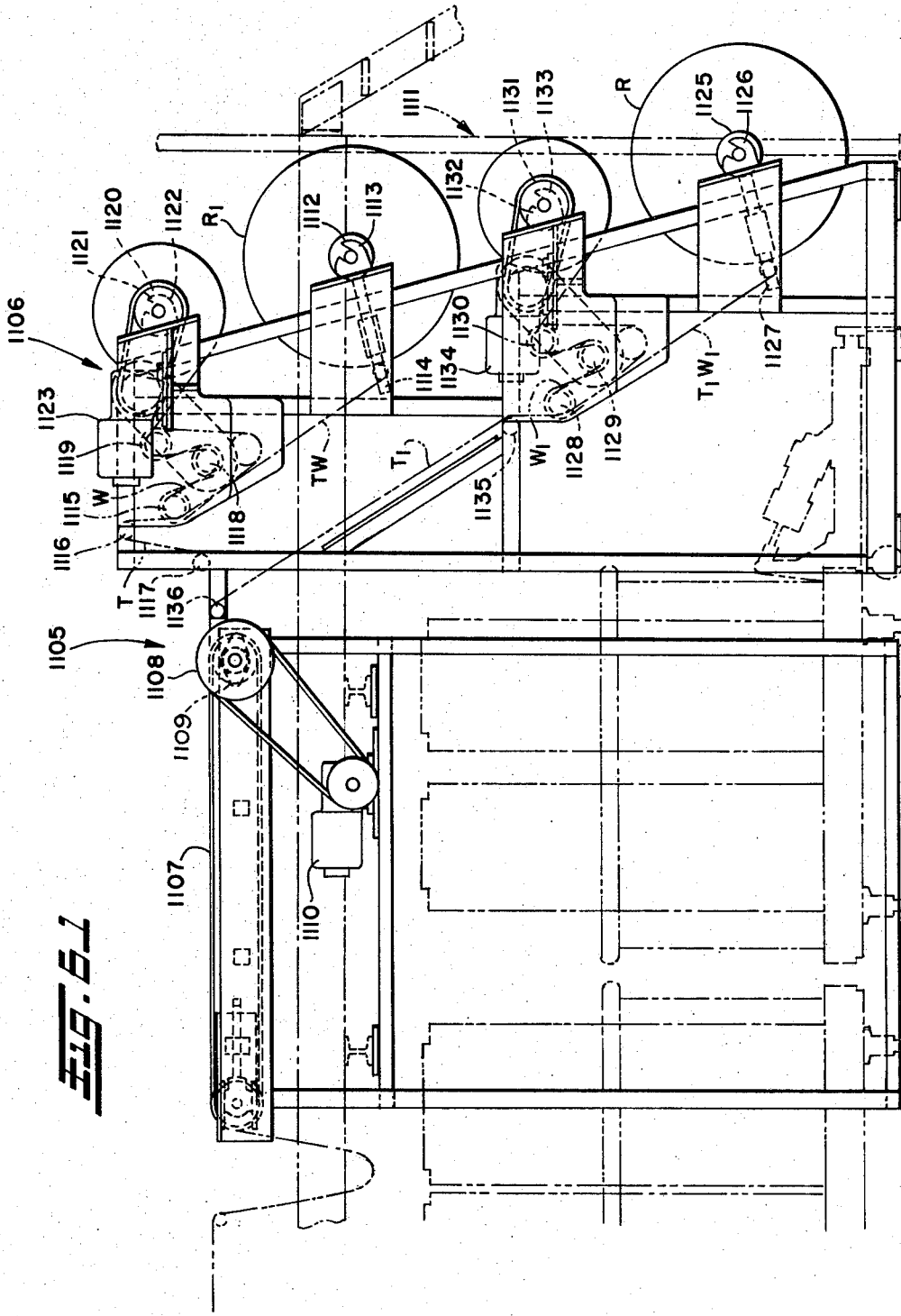

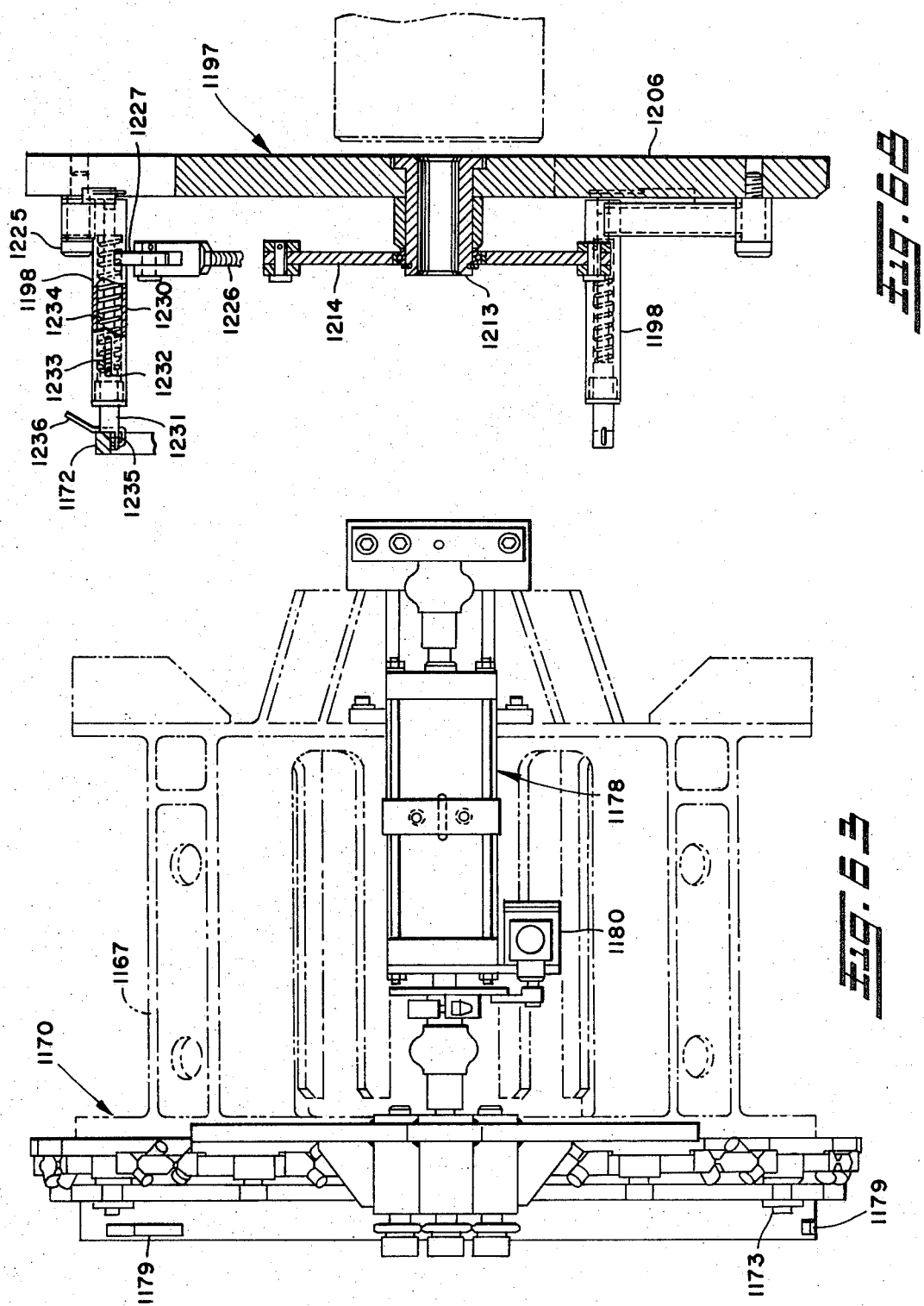

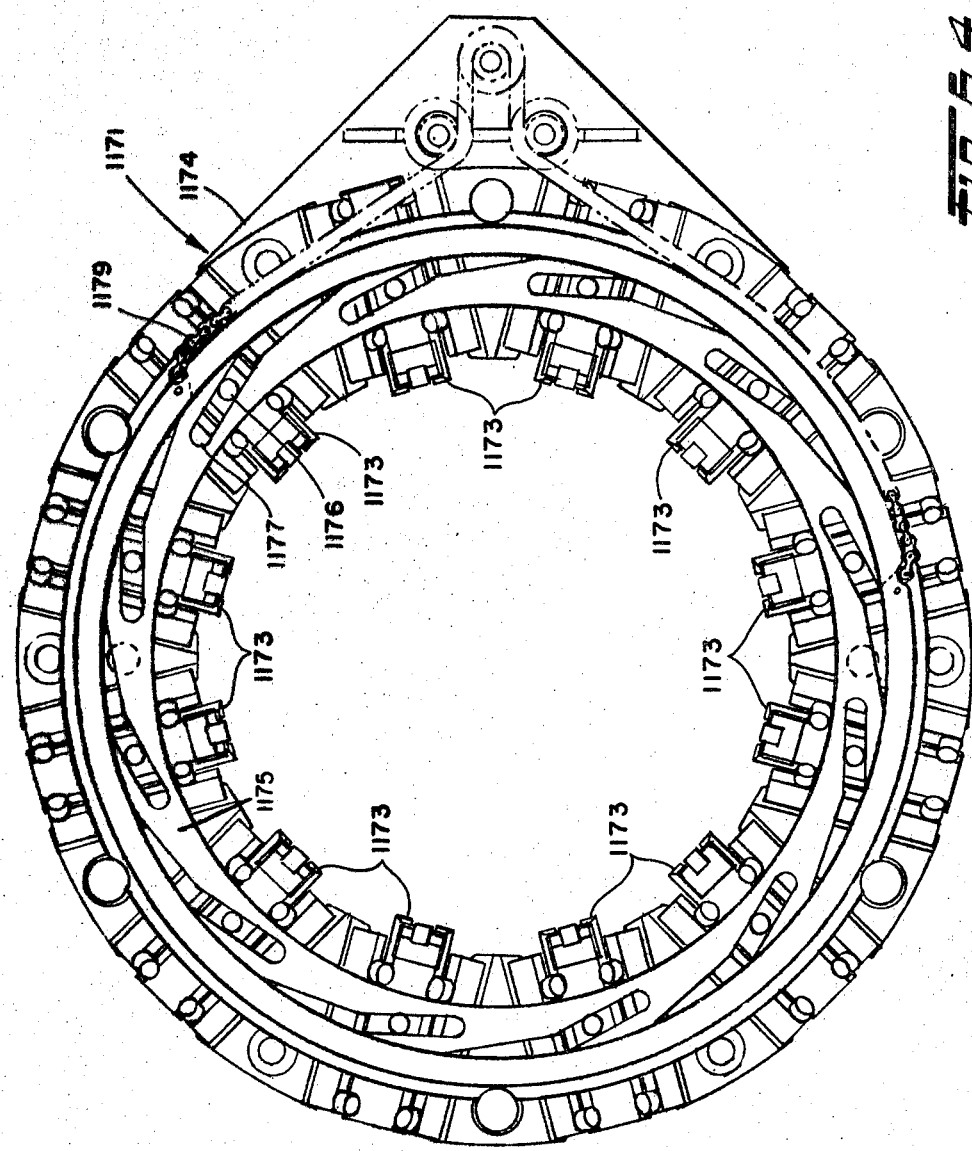

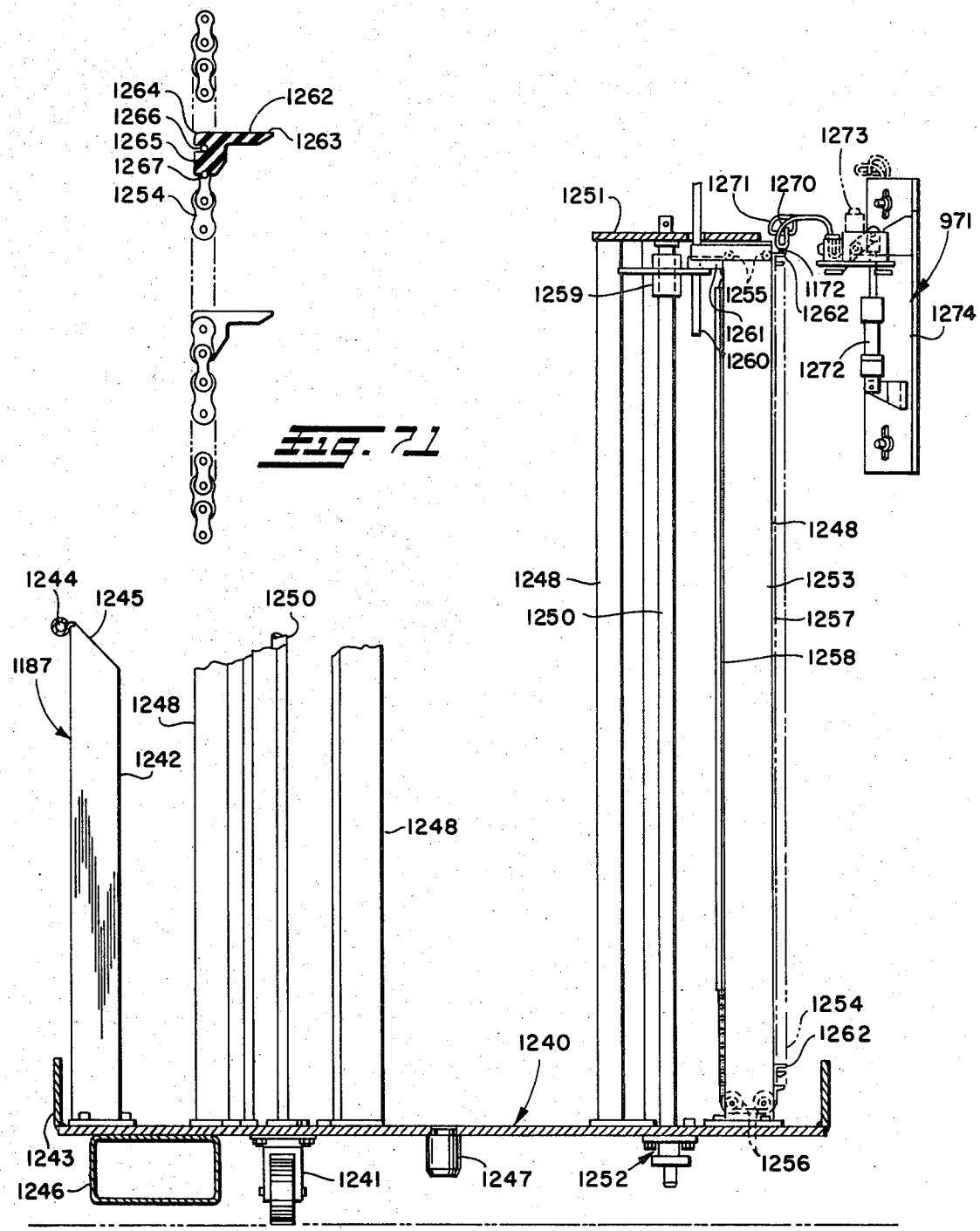

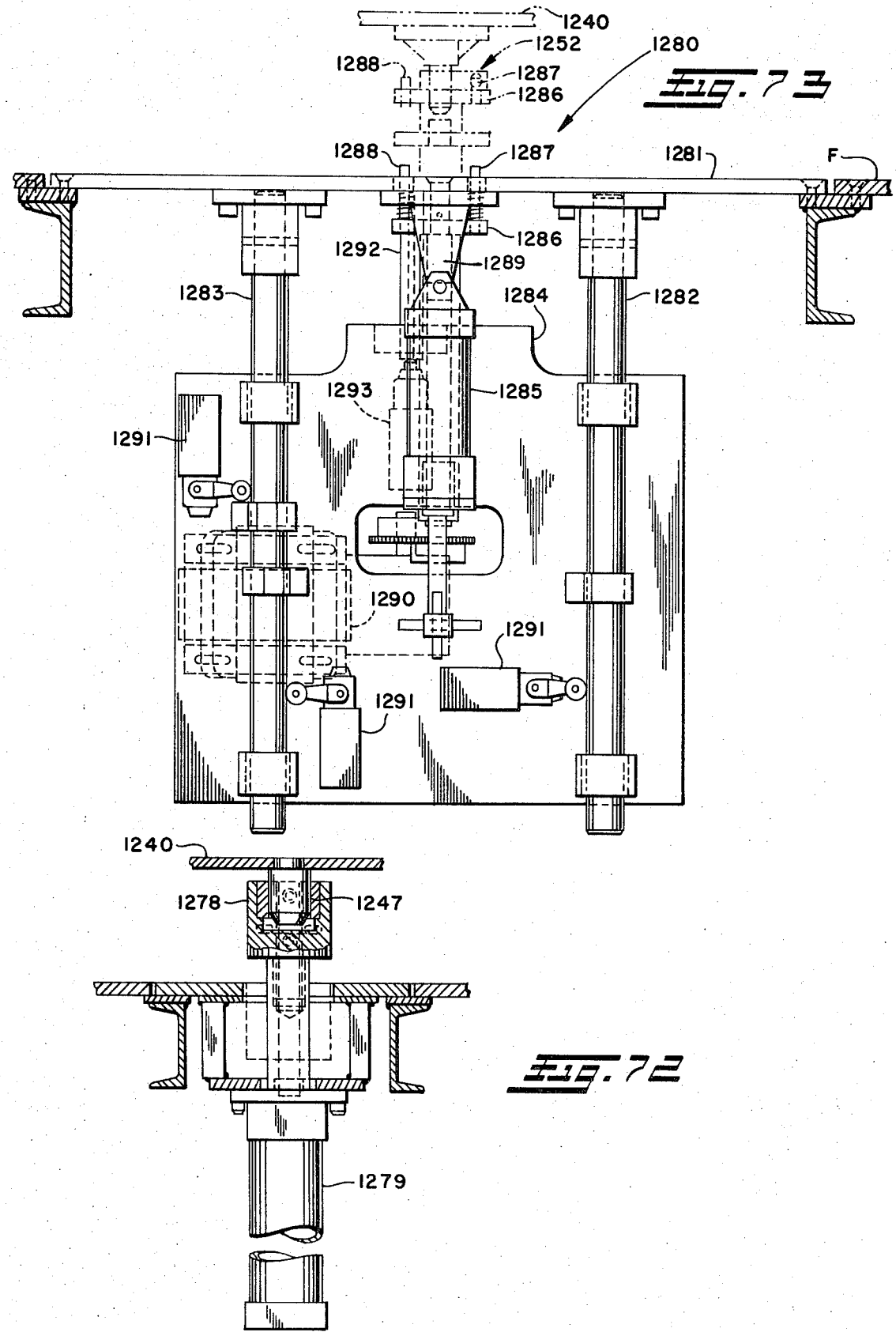

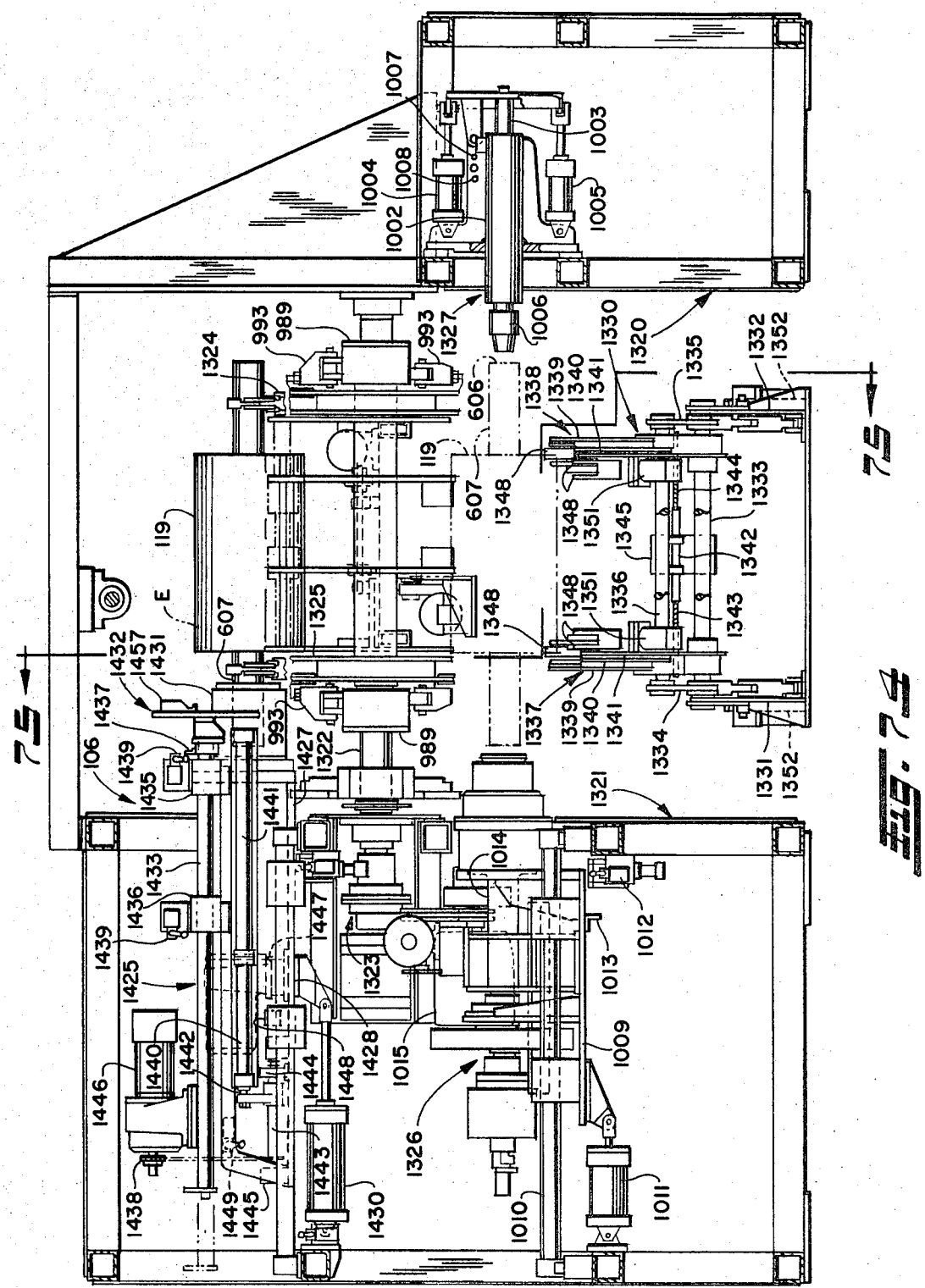

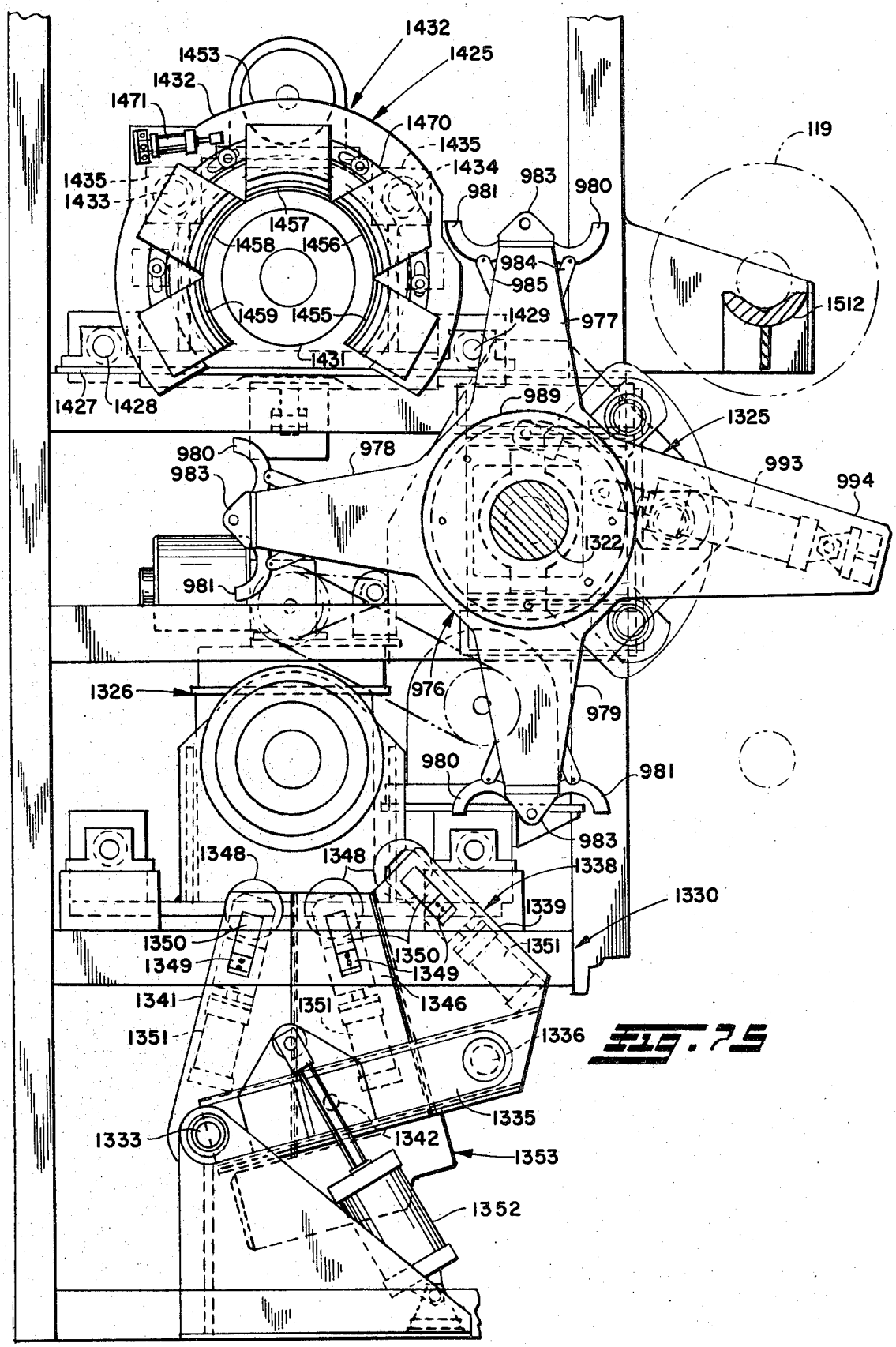

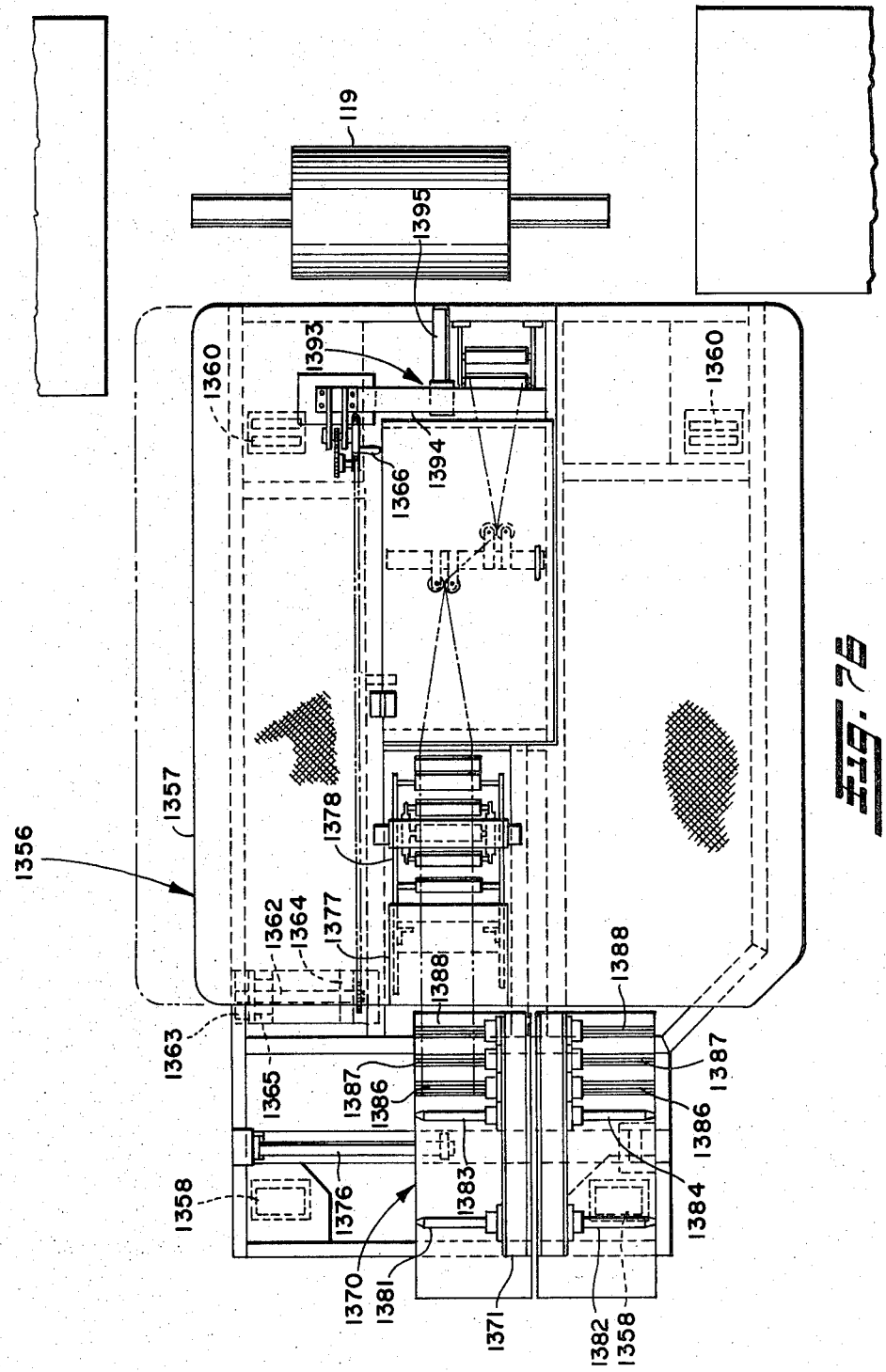

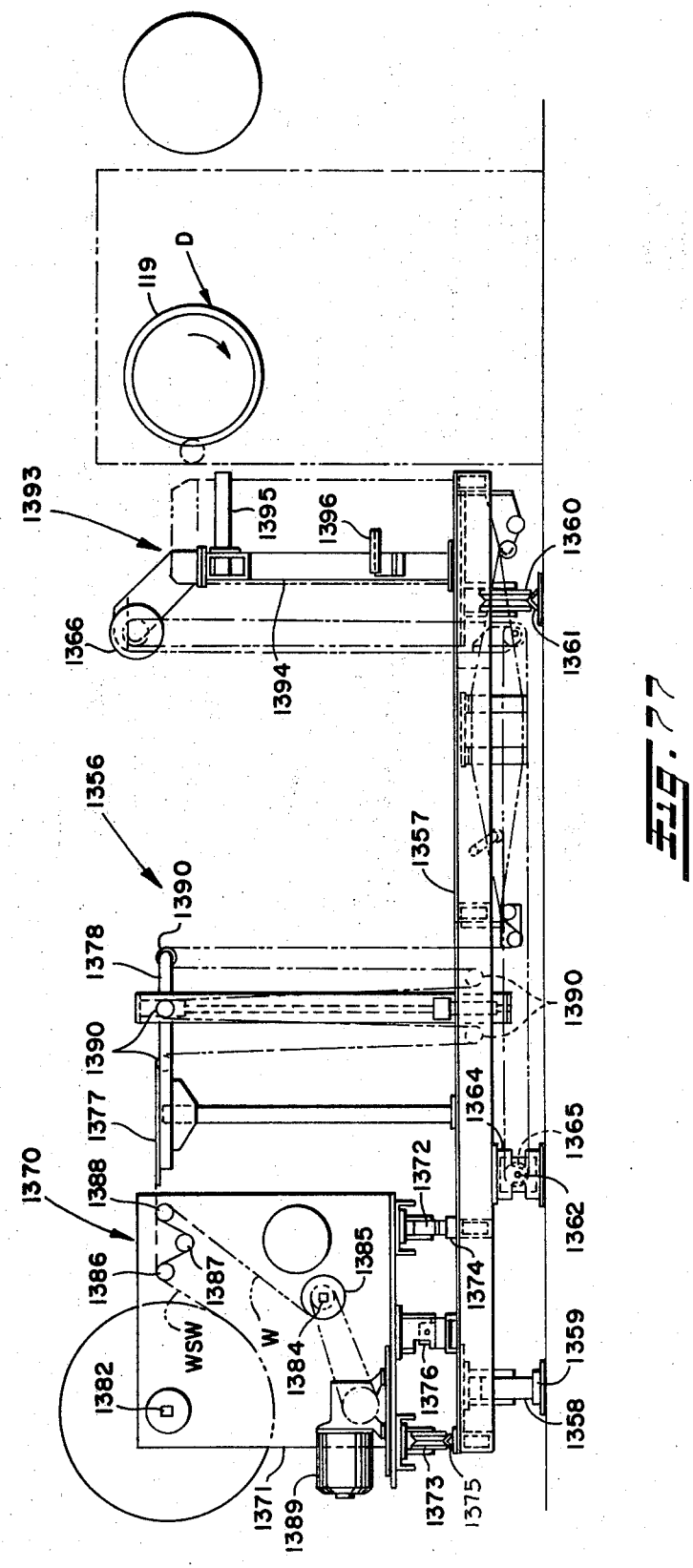

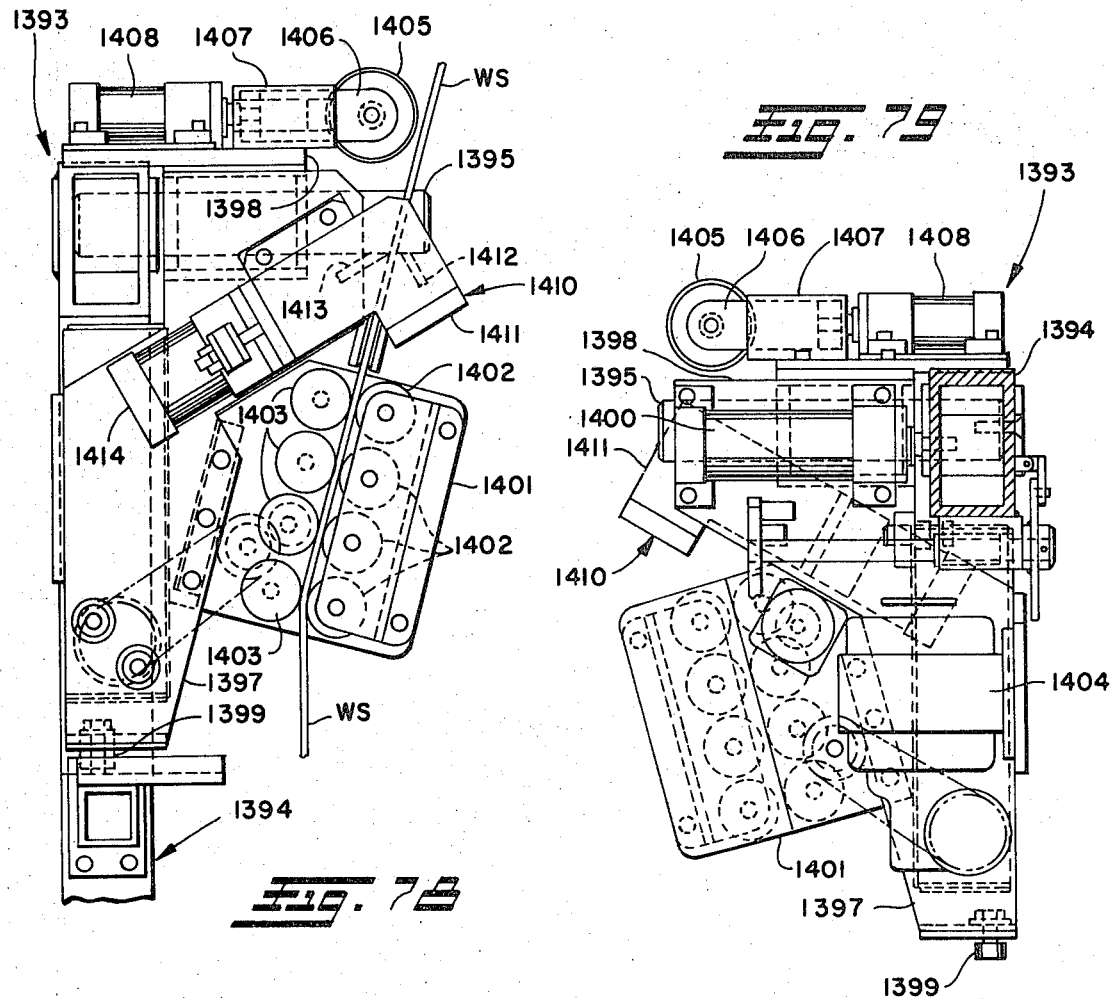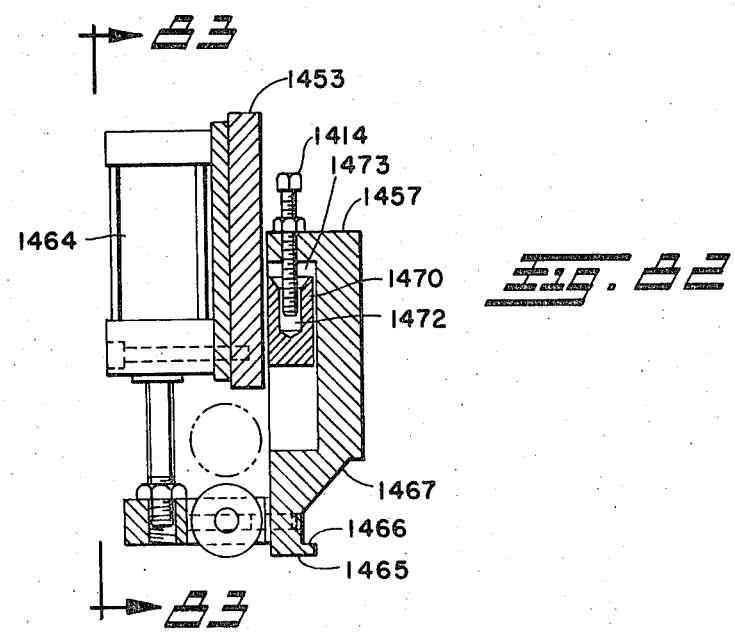

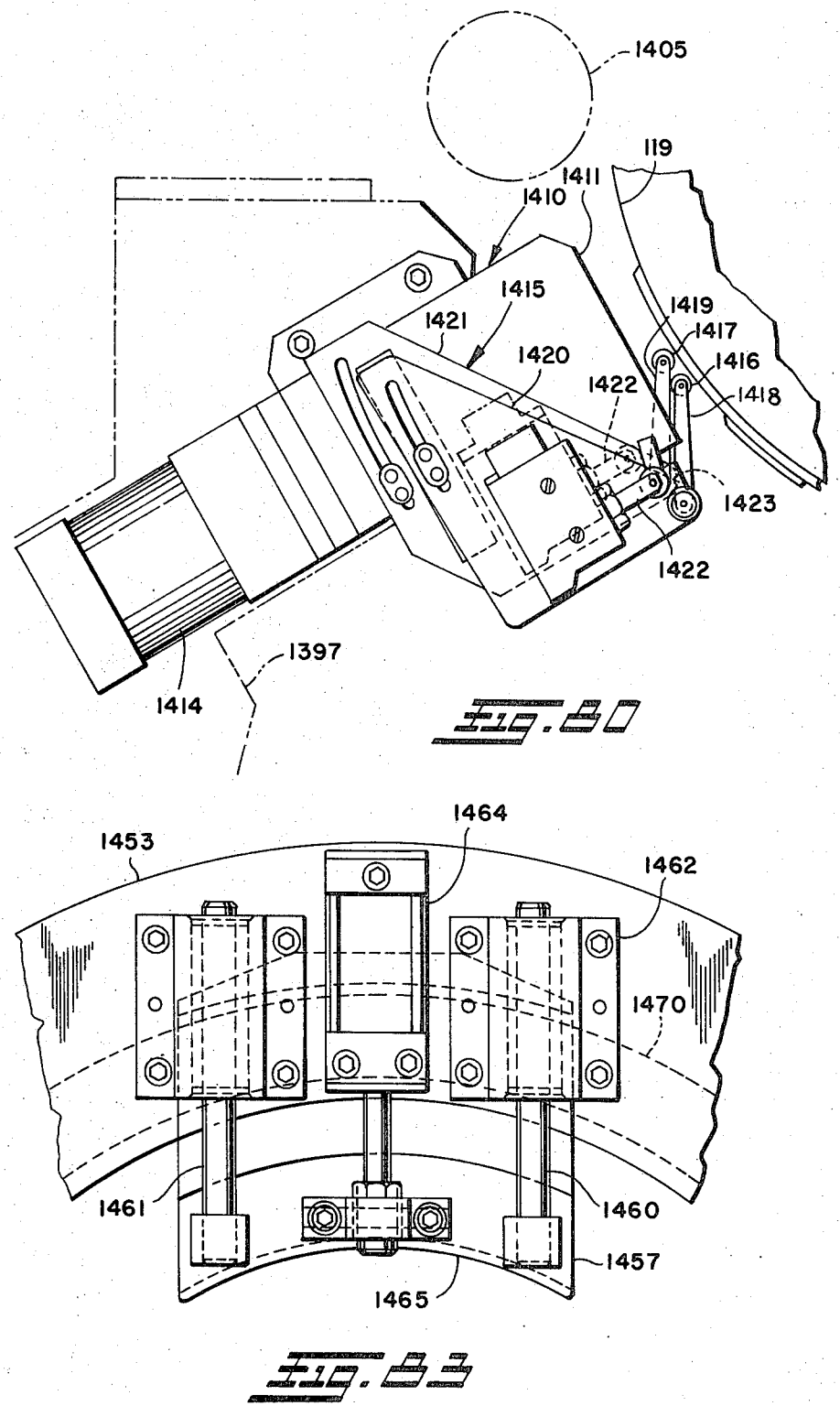

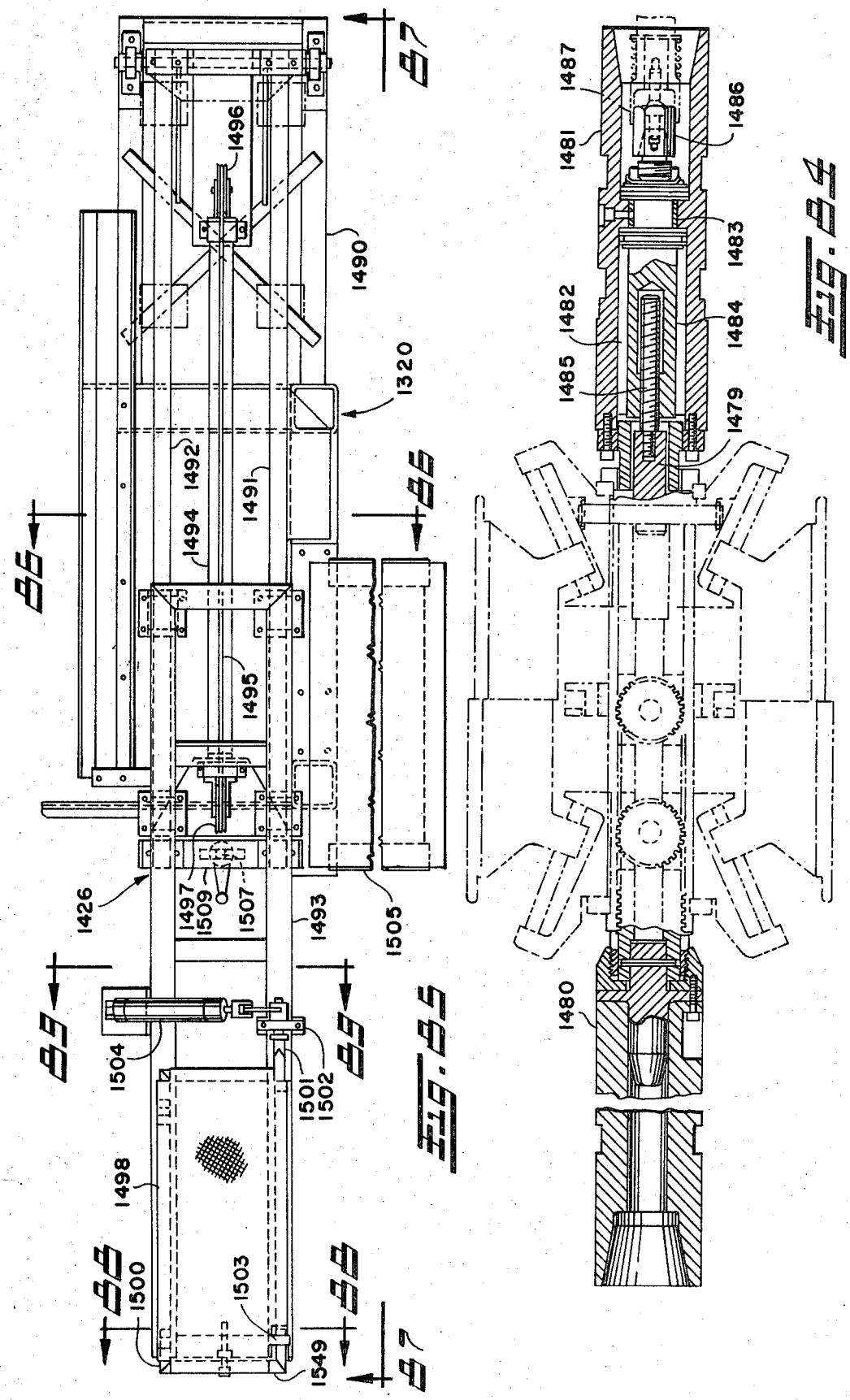

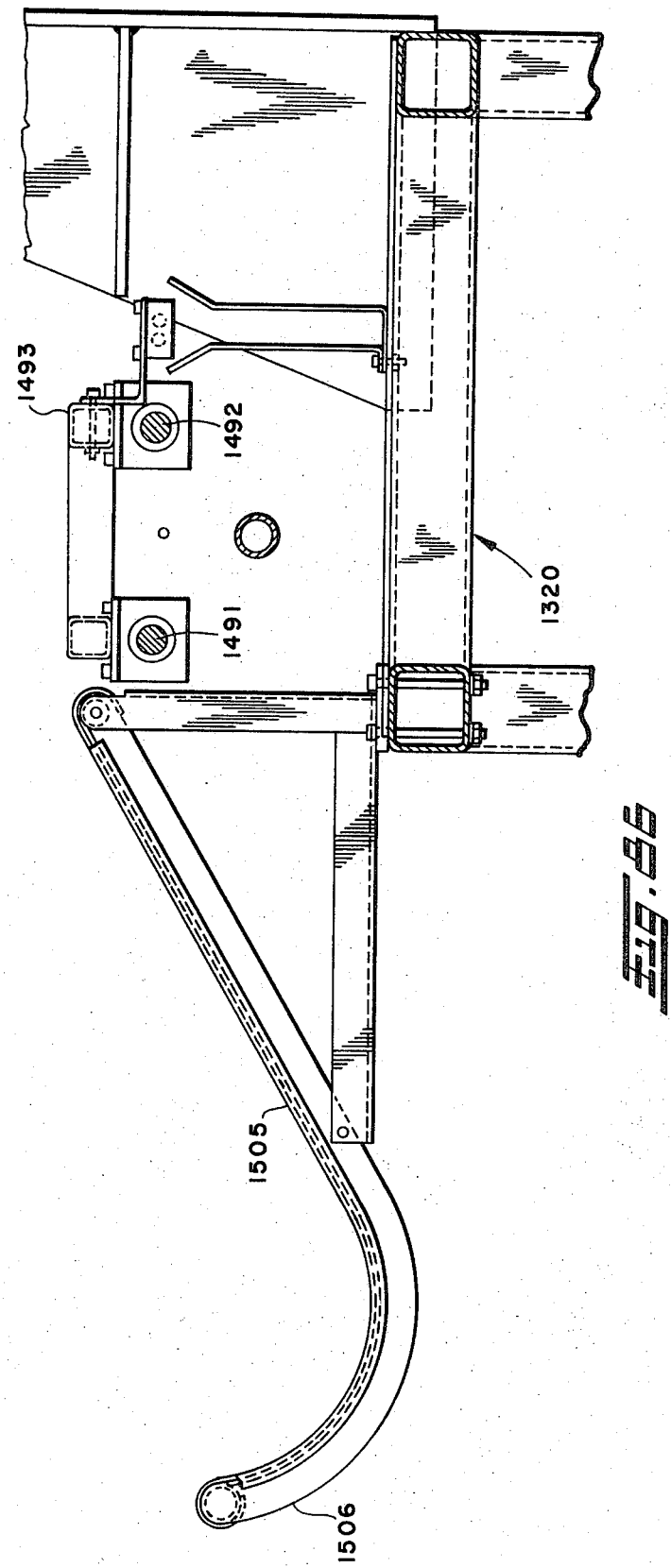

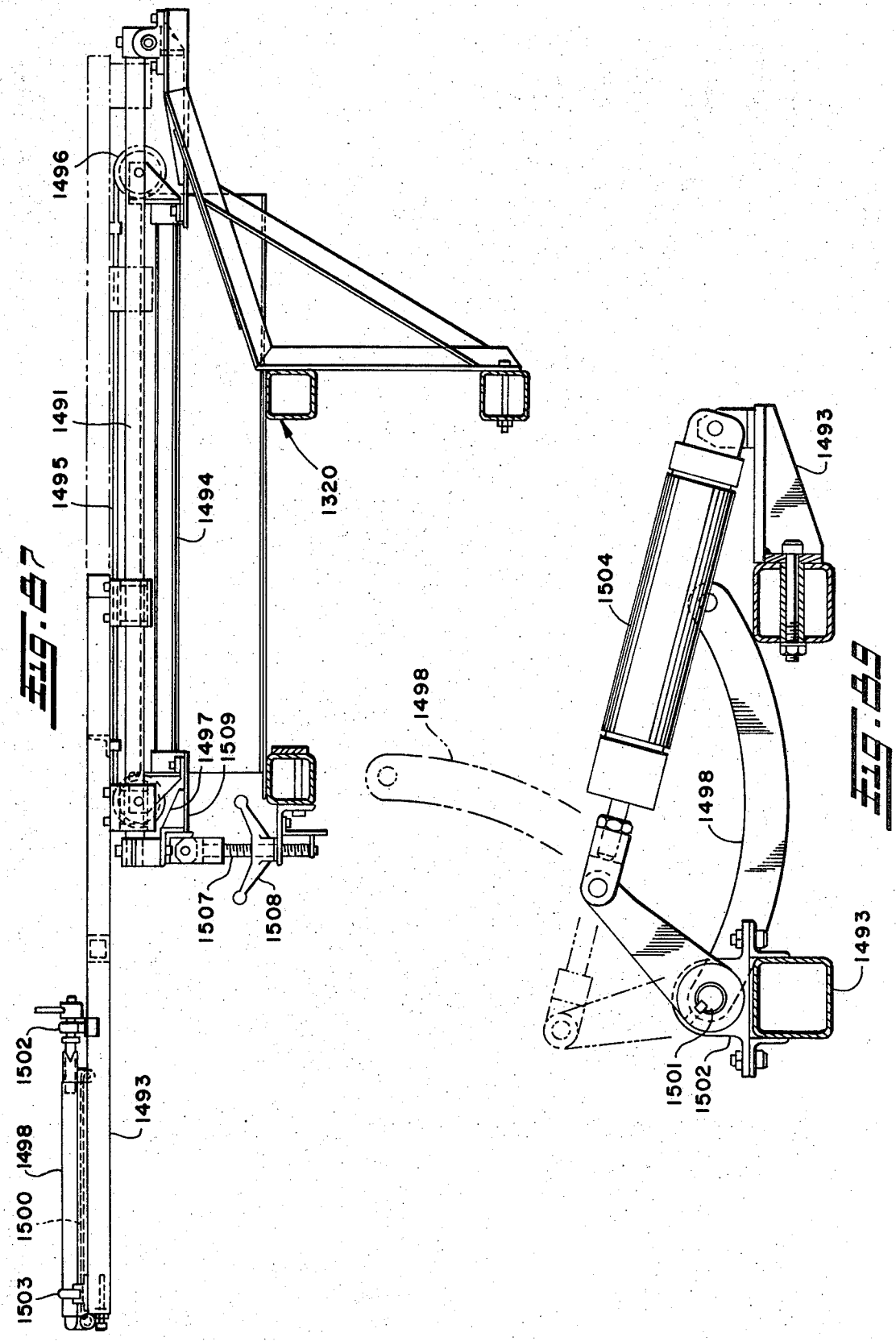

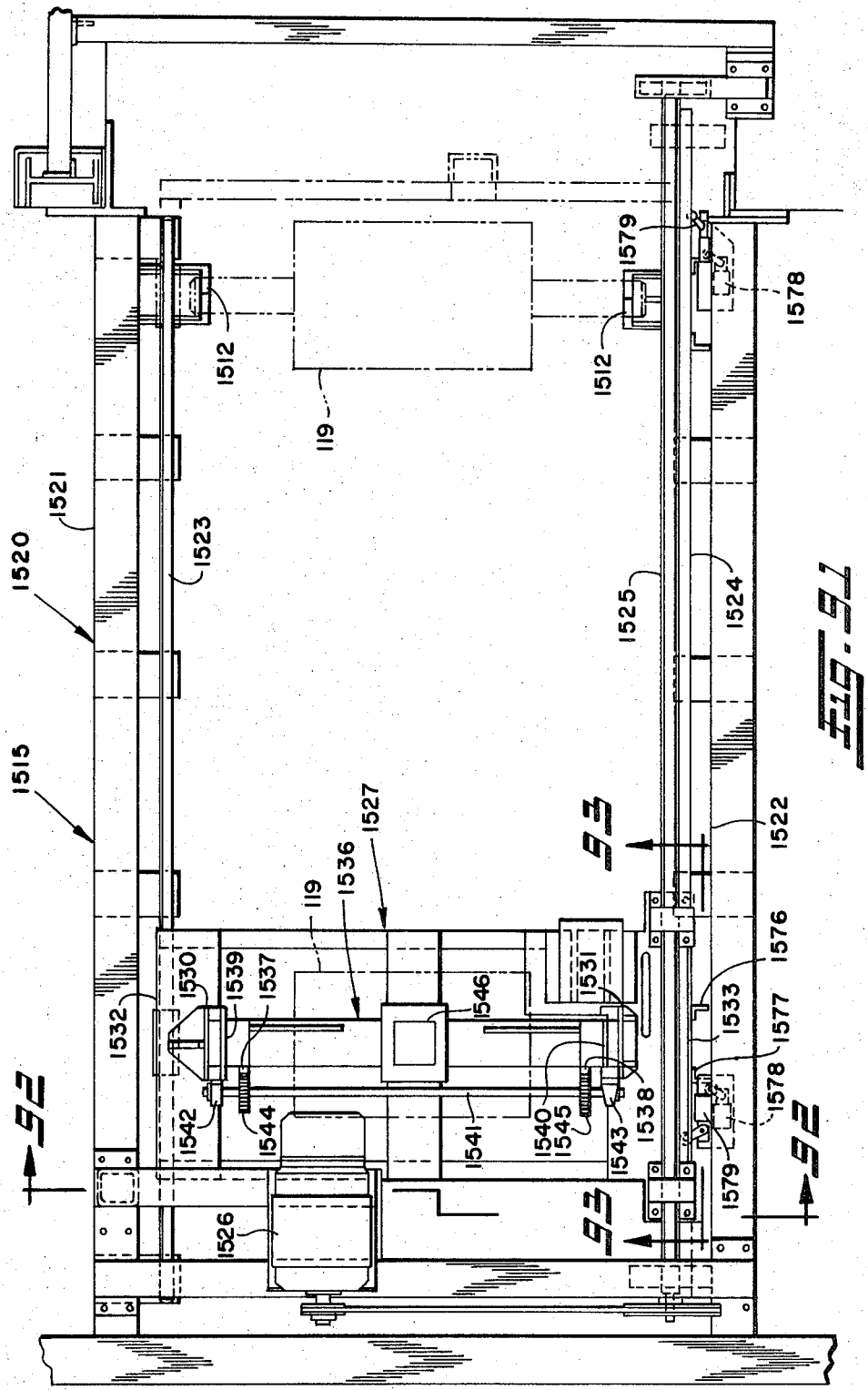

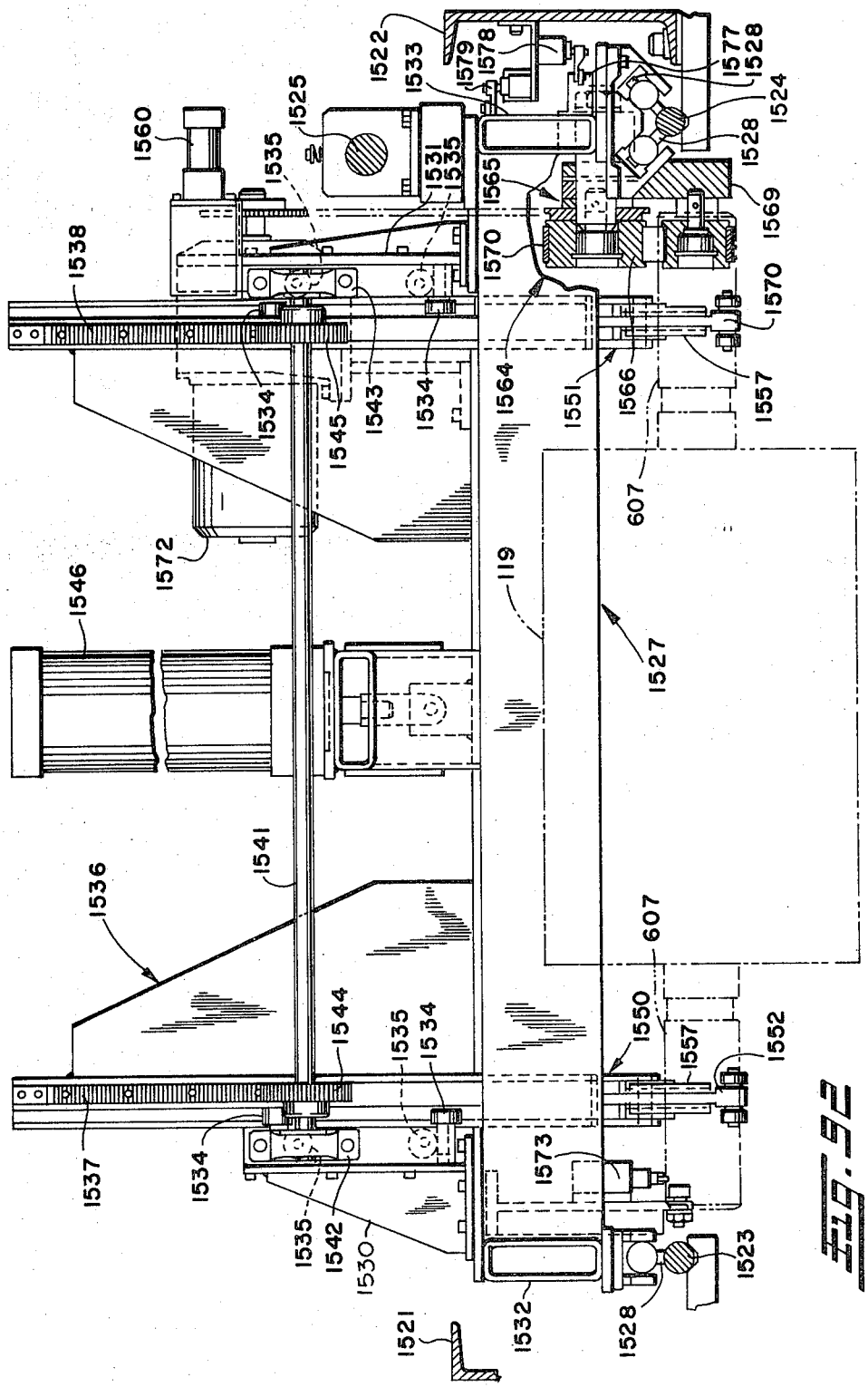

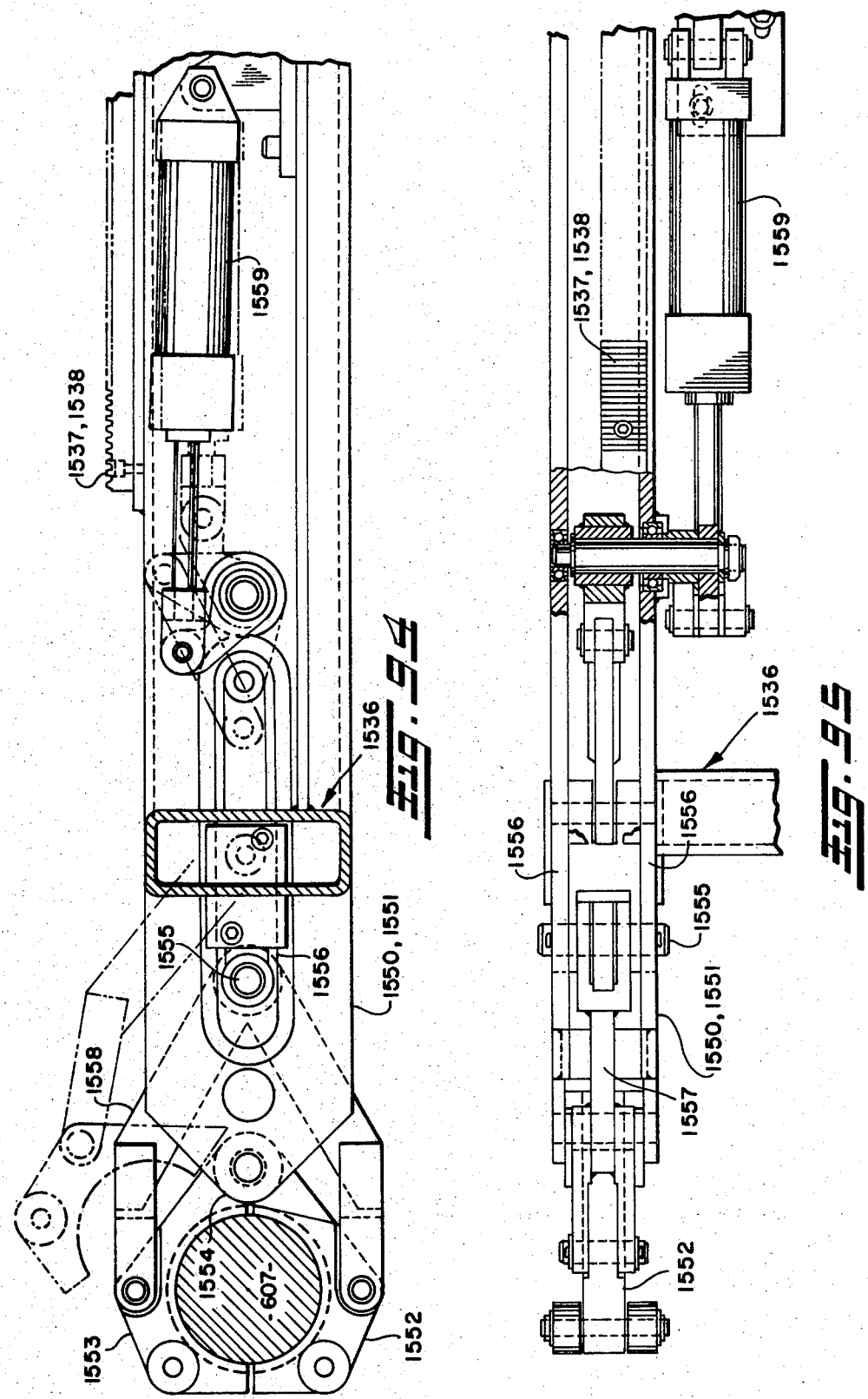

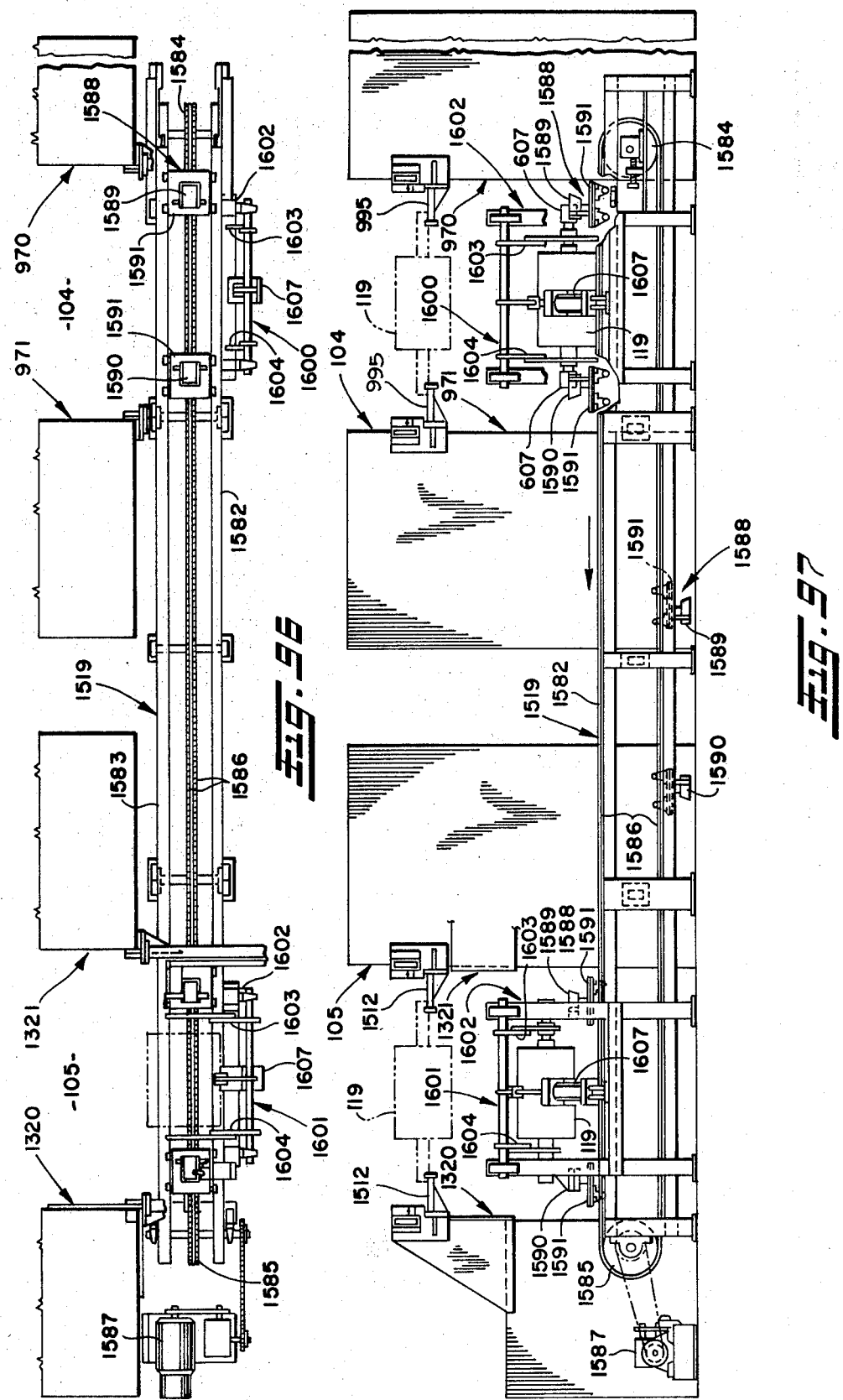

3,700,526
TIRE BUILDING MACHINE HAVING MEANS ADVANCING A PLURALITY OF DRUMS THROUGH A PLURALITY OF ASSEMBLY STATIONS
Wilhelm Brey, Cuyahoga Falls, Ohio, William Hostetler, Santa Ana, Calif., and Earl Ferdinand Loeffler, Akron, Hubert Ernest Kolm, Louisville, and Fred Grove Elder, Atwater, Ohio, assignors to The Firestone Tire & Rubber Company, Akron, Ohio
Filed Feb. 11, 1970, Ser. No. 10,579
Int. Cl. B29h 17/20
U.S. Cl. 156—396
49 Claims

ABSTRACT OF THE DISCLOSURE

A fully automatic machine for producing "green tires" or unvulcanized tire carcasses, especially suitable for making tubeless tires. The machine comprises a plurality of interconnected and dependent assemblies or stations where specialized operations, normally done semi-automatically or by hand, are carried out by mechanical devices acting in sequence. The machine includes a plurality of conventional tire building drums continuously moving between horizontally disposed, stationary table assemblies where innerliner and chafer strips, and first and second ply material are successively wrapped on the drums as they move across the table on which the material is positioned. The wrapped drums from these assemblies, are sent to turret units where they are arcuately positioned for receiving beads, tread cushion, stitching, strips of whitewall, if required, and are discharged from the collapsed drums for removal and storage. The stripped drums, or drums from which tires are removed, are automatically expanded and recycled through the assemblies for building more tire carcasses.

BACKGROUND OF INVENTION

The invention is concerned with automated production of green tires or unvulcanized tire carcasses. Such tires are presently produced by individual, highly skilled tire builders at what might be called a single machine station. That is, one machine is employed by each mechanic for building the entire carcass from pieces of unvulcanized material. Using such assemblies to make, for example, two ply tubeless tires, the tire maker either by hand, or semi-automatically with the use of sub-assemblies, successively applies or wraps on a rotatable drum, strips of innerliner, chafer, and two layers of ply material. A pair of beads for holding the tire to a rim are set and stitched into position at either side of the tire carcass. Strips of tread cushion and whitewall are then positioned by hand on the unvulcanized material wrapped on the drum.

The tire builder cuts most of the material to length as it wraps on the drum. This means that he must continually stop and start the machine to make the necessary splices. Supplies of unvulcanized material are placed within easy reach of the tire builder to make him more efficient in producing the tire carcasses. The tire builder performs, assists or monitors some 37 major steps to build a standard tire. The machine assemblies and sub-assemblies must be arranged so that the builder can complete these operations accurately, safely and quickly to maintain sufficient production of the tires.

Thus, the quality of tires produced is largely dependent on the skill of the individual tire builder, and the consistency which the individual applies this skill. The invention is directed to providing a fully automatic machine for consistently producing tires of uniform quality, since the assemblies carry out their functions in precisely the same way on every tire. Moreover, it has been found that tire production can be substantially increased by using a plurality of machine stations carrying out specific operations in succession, rather than a number of single machine stations presently operated by individual tire builders.

Briefly stated, the invention is a tire building machine, comprising a plurality of interconnected and dependent assemblies for doing specific carcass making operations, and a plurality of tire building drums movable between the assemblies for receiving carcass forming material in wrapped around relation. At least two assemblies include stationary beds for supporting tire ply material with reinforcing cords, in horizontal planes. Means are provided for positioning the ply material on the beds. Other means responsive to ply material positioned on the beds are furnished for moving the drums successively into engagement with the ply material positioned on the beds in predetermined, tensioned relation, and rolling the drums across the material to successively wrap the first and second ply material on the drum in predetermined cord oriented relation. In the case of tubeless tires, a similar bed is provided for supporting strips of innerliner and chafer in predetermined, tensioned and overlapped relation. Means are provided for bringing each drum into rolling engagement with the strips of innerliner and chafer prior to rolling the drum over the first and second plies positioned on the other two beds.

The machine also includes a plurality of rotatable turret assemblies, including means for moving the drums to a plurality of arcuate positions and other separate means associated with the turret assemblies for setting beads, applying tread cushion, stitching, and discharging the tire carcass from each drum.

A cutter assembly is associated with the first and second ply assembly and includes a combination cutter for slicing and tearing engagement with ply material and means for moving the cutter first into slicing engagement with a firmly held adjacent edge of ply material and then into tearing engagement with ply material between angularly oriented cords reinforcing the ply material while the ply material is suspended in air.

At least one pair of bead racks for storing horizontally stacked beads is provided adjacent the turret assembly, including means for setting beads. A bead transfer arm is associated with each rack for moving beads to the turret assembly prior to their setting, and means are supplied for moving the horizontally disposed beads into engaged feeding relation with the transfer arm for movement to the assembly.

The machine is also provided with a cutting mechanism for cutting a predetermined length of material for wrapping around the building drum in predetermined, overlapping or abutting splicing engagement. The cutting mechanism includes a cam follower for rolling engagement on a rotating tire building drum in predetermined spaced relation ahead of material wrapping therearound, and means associated with the cam follower for moving a knife into cutting relation with the material when the cam follower engages the leading edge of the material wrapped on the drum.

A mechanism is provided for increasing the adhesion between a building drum and first edge of innerliner engaged thereby. The mechanism includes means for applying adhesive material on said edge prior to engaging the drum, or in the alternative, means for creating a vacuum of air on the surface of the drum where the drum engages the innerliner. Other aspects of the invention will be more clearly defined in the specifications and claims which follow.

DESCRIPTION OF THE FIGURES OF THE DRAWING

The following description of the invention will be better understood by referring to the annexed drawing, wherein:

FIG. 3 is a plan view of the machine;

FIG. 5 is a plan view of movable and stationary bed sections of the innerliner and chafer table assembly;

FIG. 6 is a section viewed from the line 6—6 of FIG. 5;

FIG. 8 is a plan view of a unit for feeding innerliner and chafer to the innerliner and chafer table assembly;

FIG. 9 is a side view of the innerliner and chafer feed unit;

FIG. 10 is a plan view of a device for storing rolls of innerliner;

FIG. 11 is a side view of the innerliner storage device;

FIG. 12 is a plan view of a device for storing rolls of chafer;

FIG. 17 is a section viewed from the line 17—17 of FIG. 15;

FIG. 18 is a section viewed from the line 18—18 of FIG. 17;

FIG. 19 is a plan view of a unit for transferring innerliner and chafer from the cutter assembly to the table assembly;

FIG. 20 is a section viewed from the line 20—20 of FIG. 19;

FIG. 21 is a section viewed from the line 21—21 of FIG. 19;

FIG. 22 is a section viewed from the line 22—22 of FIG. 20;

FIG. 23 is a side view of a unit for applying adhesive or cement on the innerliner positioned on the table assembly;

FIG. 24 is a section viewed from the line 24—24 of FIG. 23;

FIG. 25 is a plan view of an applicator for taking the strips of chafer and placing them in partially overlapped relation on the sheet of innerliner positioned on the table assembly;

FIG. 26 is a section viewed from the line 26—26 of FIG. 25;

FIG. 27 is a plan view of a unit for transporting a tire building drum in rolling engagement with innerliner and chafer positioned on the table assembly;

FIG. 28 is a side view of the drum transport;

FIG. 29 is an end view of the drum transport;

FIG. 30 is a cross section of a table assembly for supporting first and second ply material;

FIG. 31 is a plan view of the movable and stationary bed sections of the first ply table assembly;

FIG. 32 is a section viewed from the line 32—32 of FIG. 31;

FIG. 33 is a section viewed from the line 33—33 of FIG. 32;

FIG. 34 is a section viewed from the line 34—34 of FIG. 31;

FIG. 35 is a section viewed from the line 35—35 of FIG. 31;

FIG. 36 is a section viewed from the line 36—36 of FIG. 35;

FIG. 37 is a plan view of a cutter assembly used with the first ply table assembly;

FIG. 38 is a section viewed from the line 38—38 of FIG. 37;

FIG. 39 is a section viewed from the line 39—39 of FIG. 37;

FIG. 41 is the first ply cutter assembly viewed from the line 41—41 of FIG. 40;

FIG. 42 is a side view of a blade or knife used in the first ply cutter assembly;

FIG. 43 is an end view of the blade or knife;

FIG. 44 is a plan view of a unit for transferring first ply material from the cutter assembly on to the table assembly;

FIG. 45 is an end view of the first ply transfer unit;

FIG. 46 is a section viewed from the line 46—46 of FIG. 44;

FIG. 47 is a plan view of a unit for transporting a tire building drum in rolling engagement with first ply material positioned on the table assembly;

FIG. 48 is a side view of the first ply drum transport;

FIG. 49 is the drum transport viewed from the line 49—49 of FIG. 48;

FIG. 56 is a plan view of a turret arm of the first turret assembly;

FIG. 57 is a side view of the turret arm;

FIG. 58 is a plan view of an applicator for the tread cushion;

FIG. 59 is a section viewed from the line 59—59 of FIG. 58;

FIG. 60 is a plan view of a unit for storing tread cushion;

FIG. 61 is a side view of the tread cushion storage unit;

FIG. 62 is a side section of a mechanism for setting beads at one end of a tire carcass;

FIG. 63 is a side view of an expansible iris for positioning beads on a tire carcass;

FIG. 64 is a front view of the expansible iris;

FIG. 68 is a section viewed from the line 68—68 of FIG. 67;

FIG. 70 is a section viewed from the line 70—70 of FIG. 69;

FIG. 71 is a cross sectional view of a plastic clip for supporting beads on the bead storage rack;

FIG. 72 is a side section of a mechanism for positioning the bead storage racks;

FIG. 73 is a side section of a mechanism for rotating the bead storage racks;

FIG. 74 is a side view of a second turret assembly for stitching beads, applying white sidewall, and discharging the tire carcass from a tire building drum;

FIG. 75 is a section viewed from the line 75—75 of FIG. 74;

FIG. 76 is a plan view of an applicator for white sidewall;

FIG. 77 is a side view of the white sidewall applicator;

FIG. 78 is a left side view of a cutter assembly of the white sidewall applicator;

FIG. 79 is a right side view of the cutter assembly;

FIG. 80 is a detail view of a mechanism of the cutter assembly;

FIG. 83 is a portion of the discharge ring viewed from the line 83—83 of FIG. 82;

FIG. 84 is a longitudinal section of shaft extensions coupled to a conventional tire building drum, showing a mechanism for collapsing and expanding the drum;

FIG. 85 is a plan view of a discharge conveyor of the second turret assembly;

FIG. 86 is a section viewed from the line 86—86 of FIG. 85;

FIG. 87 is a section viewed from the line 87—87 of FIG. 85;

FIG. 88 is a section viewed from the line 88—88 of FIG. 85;

FIG. 89 is a section viewed from the line 89—89 of FIG. 85;

FIG. 91 is a plan view of an overhead conveyor of the conveying system;

FIG. 92 is a section viewed from the line 92—92 of FIG. 91;

FIG. 94 is a side view of a transfer arm of a drum carrier of the conveying system;

FIG. 95 is an end view of the transfer arm;

FIG. 96 is a plan view of a floor conveyor of the conveying system; and

FIG. 97 is a side view of the floor conveyor.

DESCRIPTION OF THE INVENTION

Figure 1:
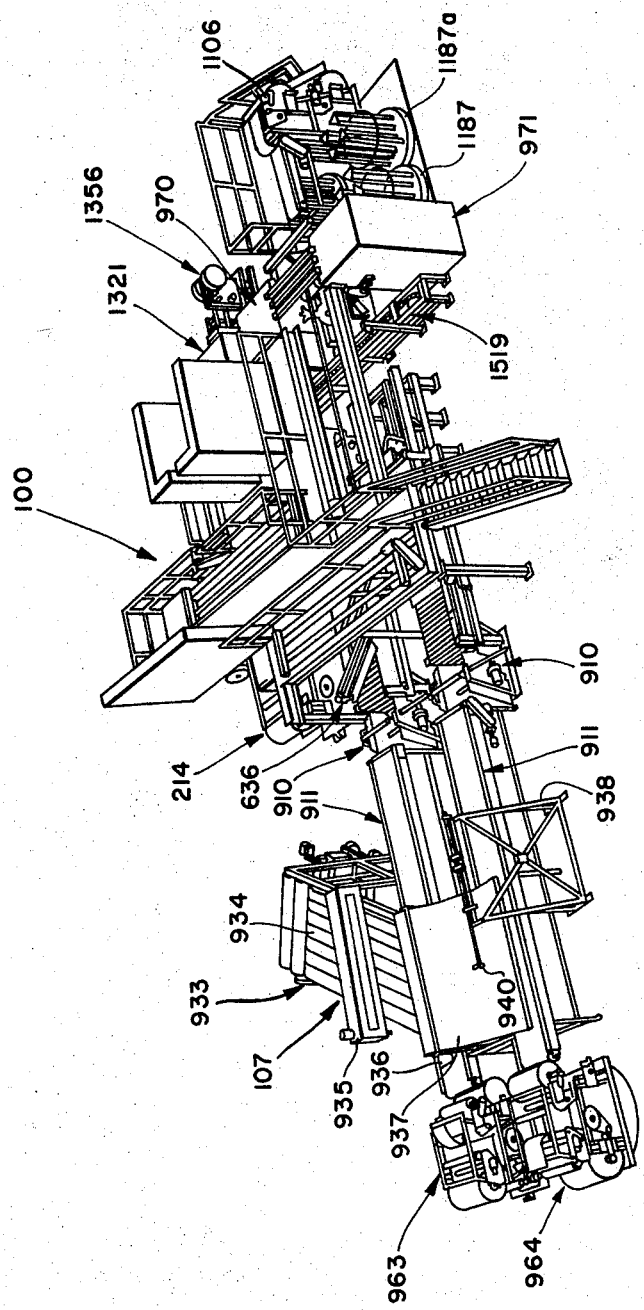
FIGS. 1 and 2 are perspective views of the tire making machine.
Figure 2B:
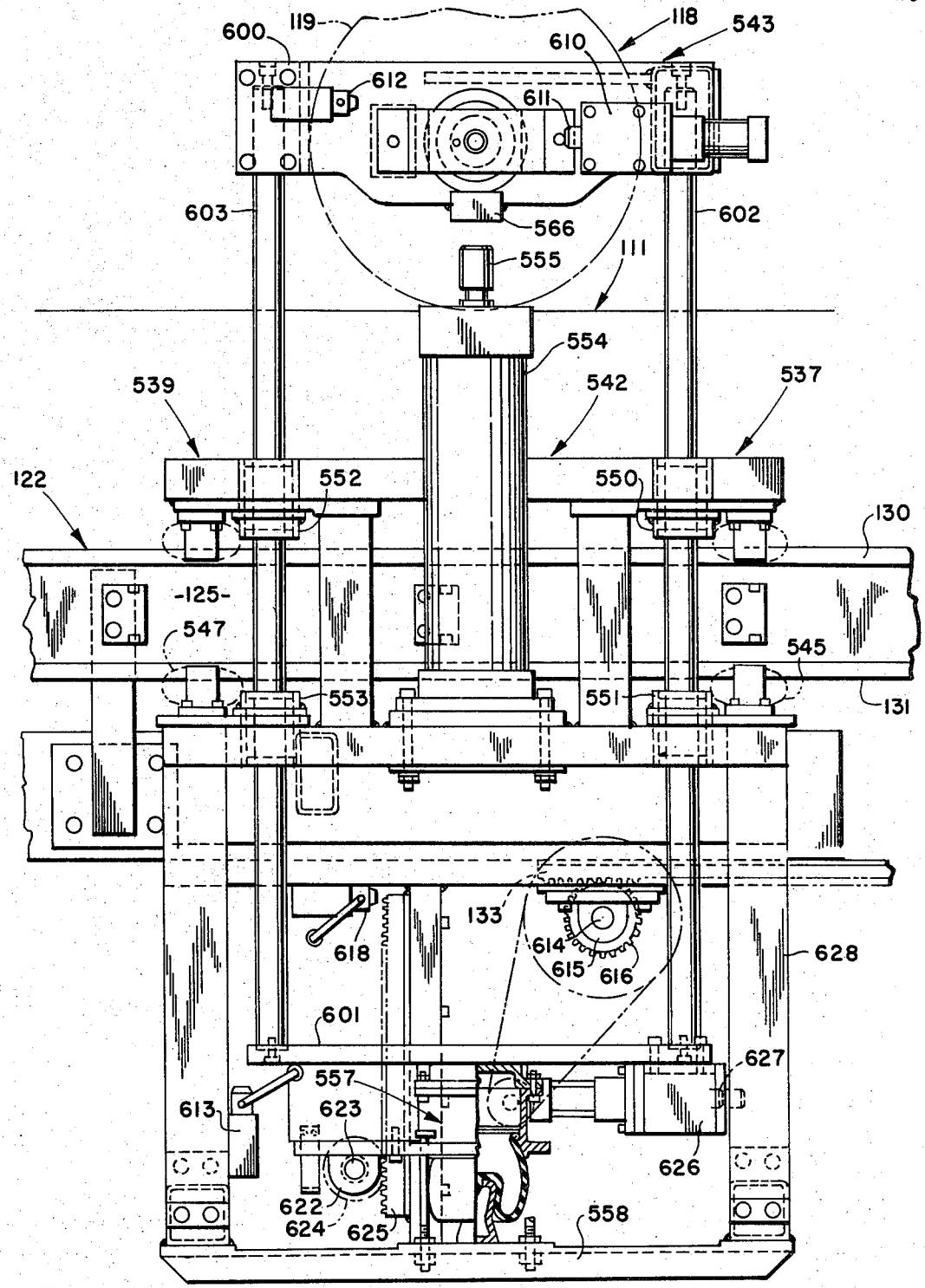
Figure 40:
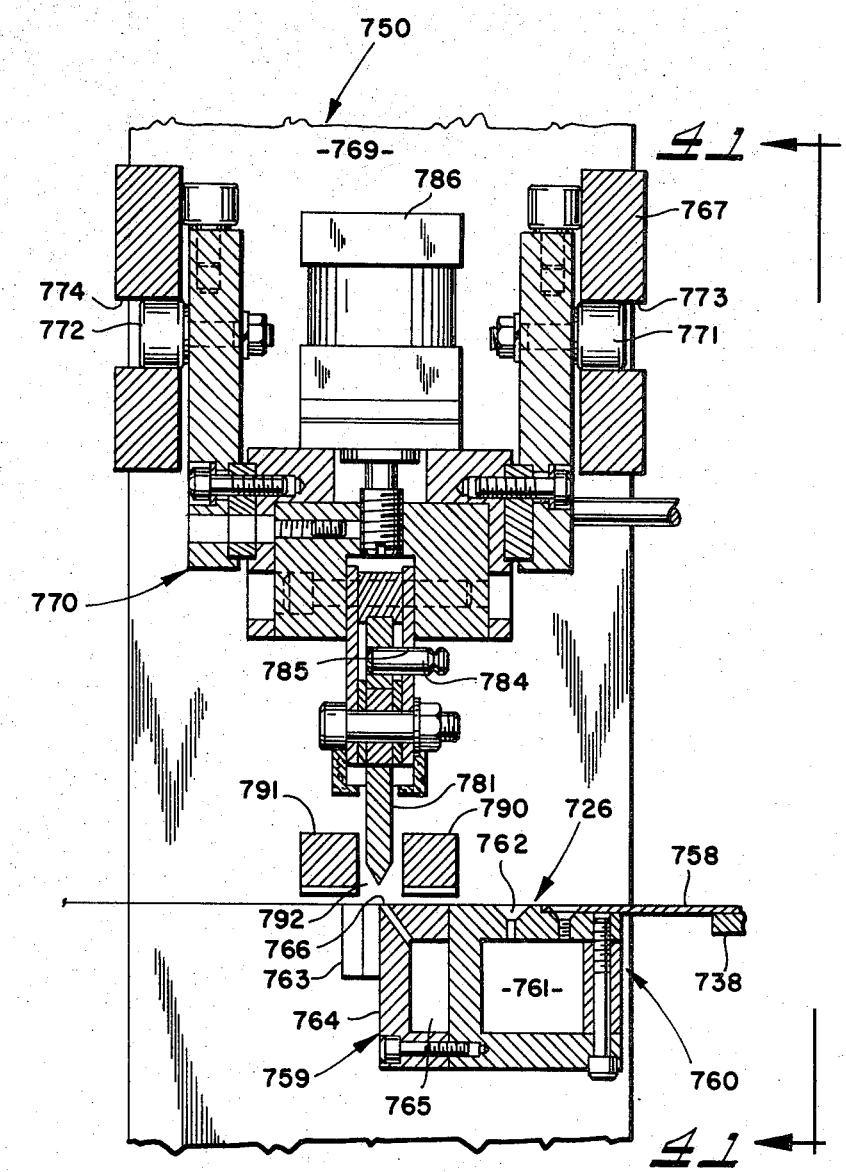
FIG. 40 is a section viewed from the line 40—40 of FIG. 39.
Figure 50:
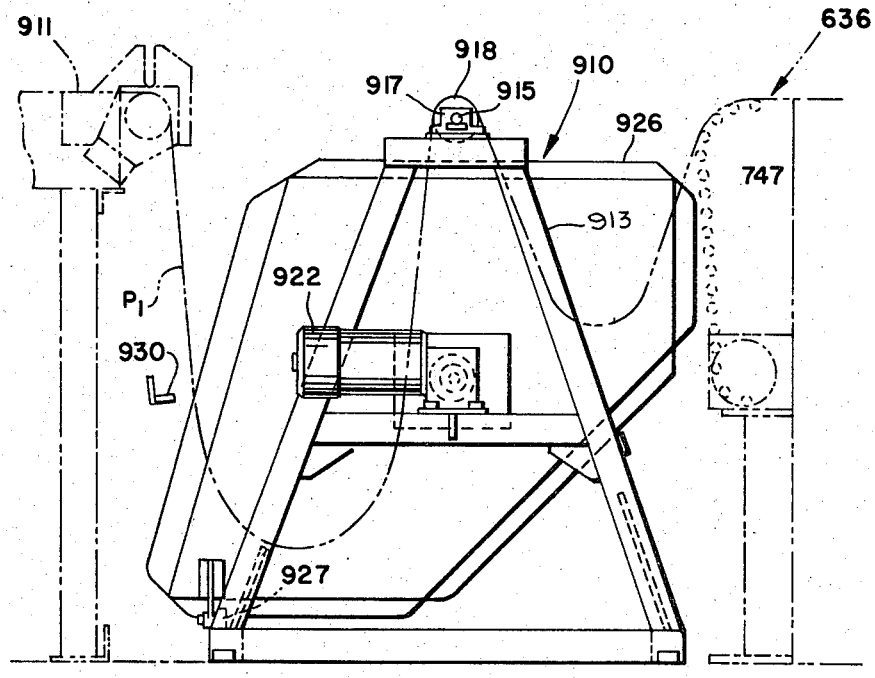
FIG. 50 is a side view of a device for storing a free loop of ply material adjacent the table assembly.
Figure 51:
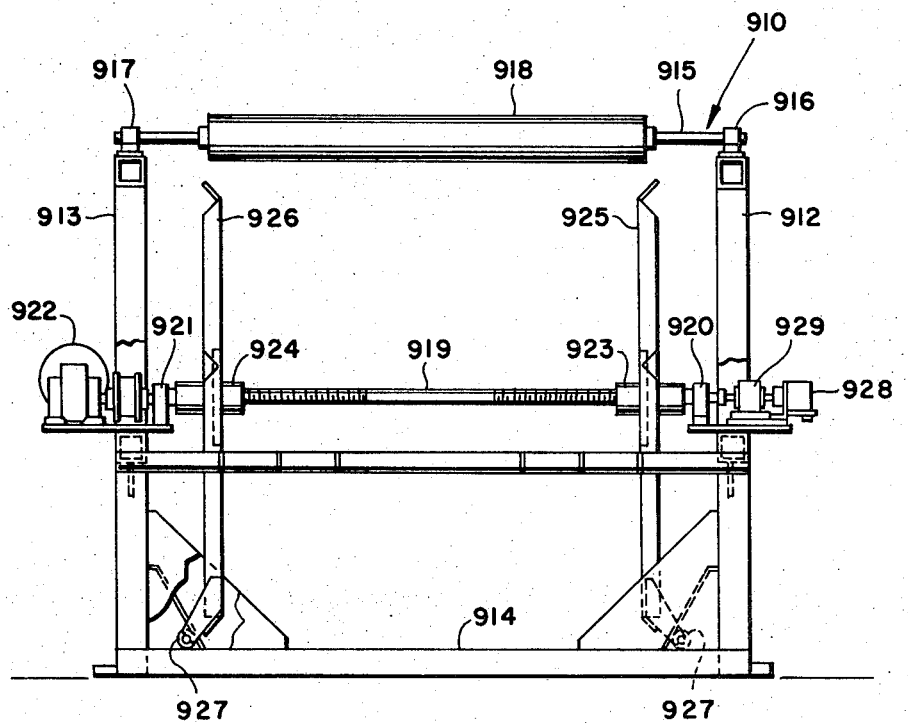
FIG. 51 is an end view of the free loop ply storage device.
Figure 52:
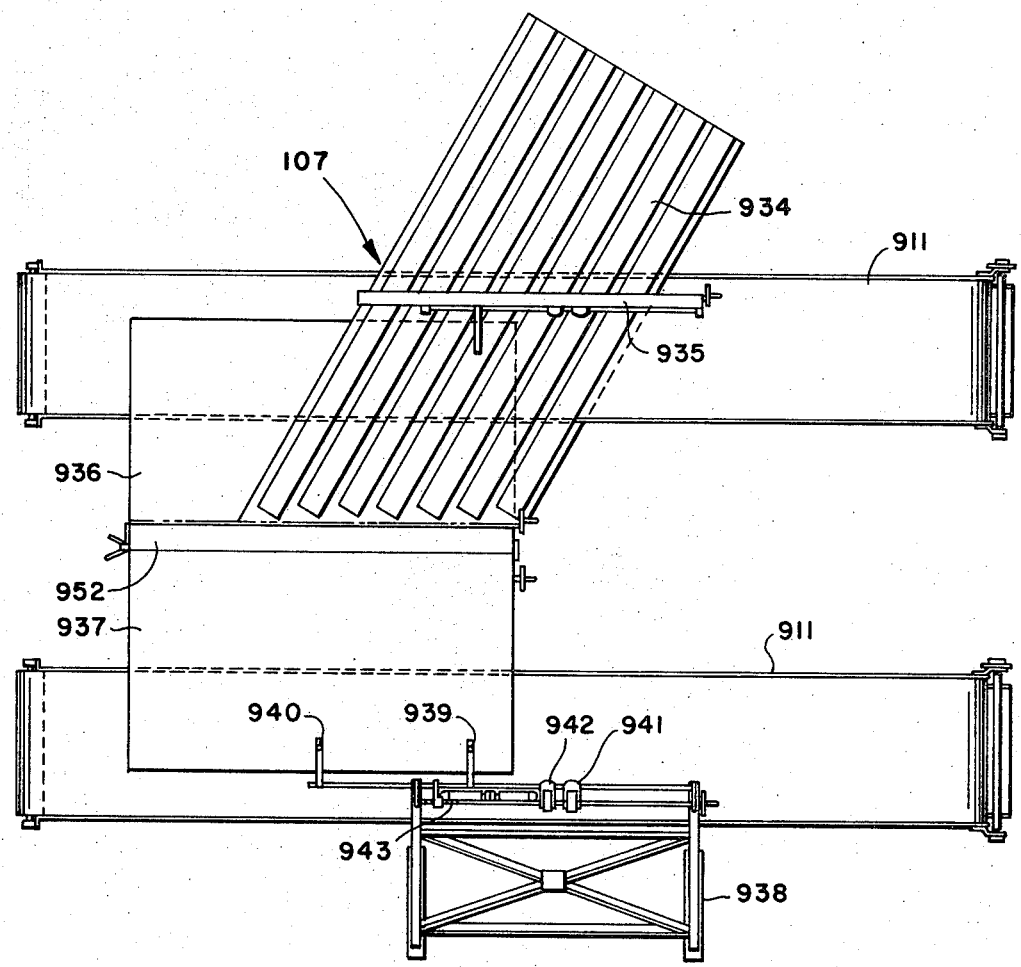
FIG. 52 is a plan view of a unit for handling ply material.
Figure 53:
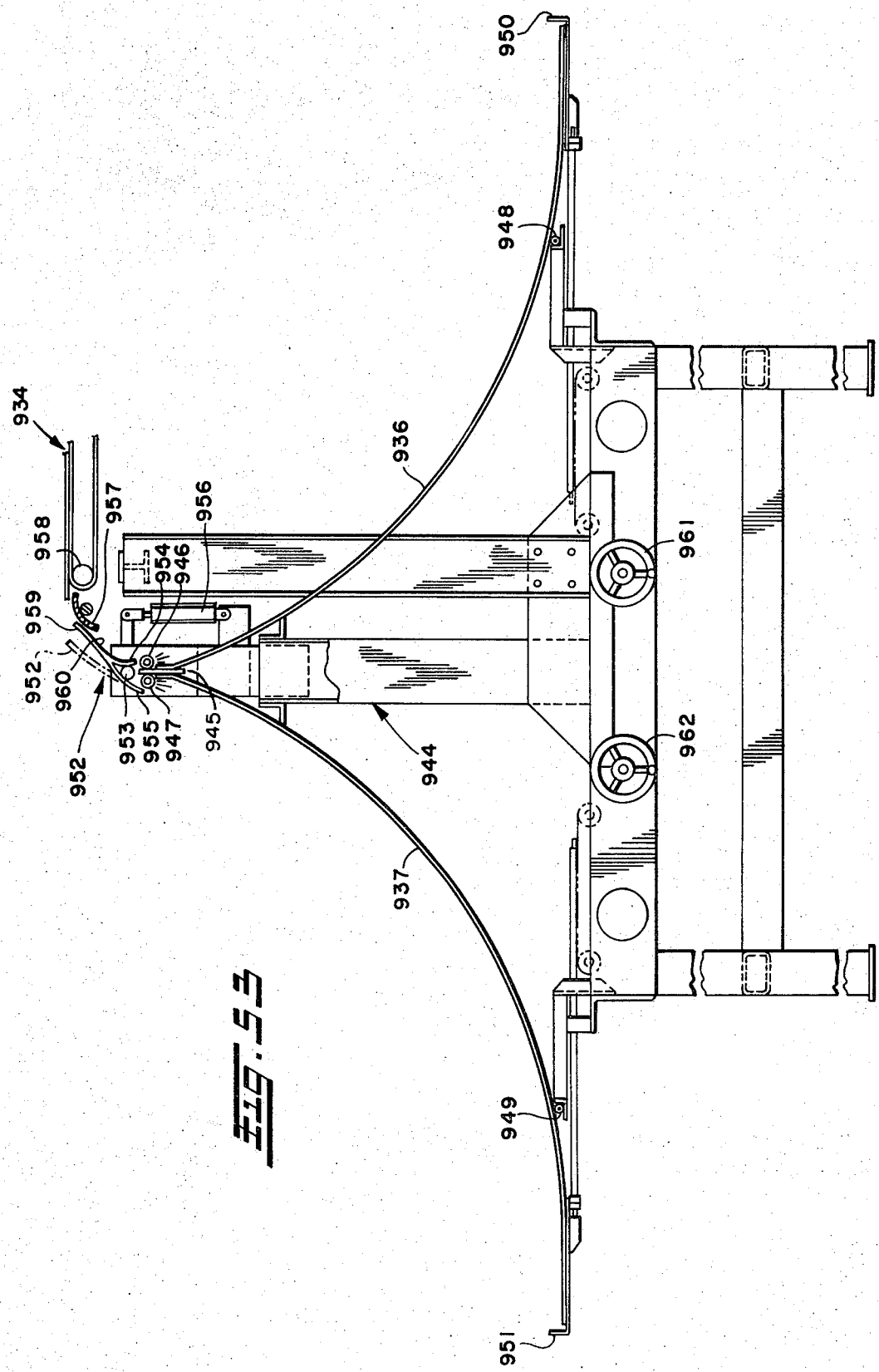
FIG. 53 is an end view of a pair of diverging chutes of the ply material handling unit.

Referring generally to the drawing and more particularly to FIGS. 1–3, there is shown a machine, generally indicated at 100, for automatically producing green tire carcasses, especially suitable for two-ply tubeless tires, comprising successive layers of unvulcanized innerliner and chafer material, first and second rubberized ply material with reinforcing cords in predetermined oriented relation, and strips of tread cushion and white sidewall, if desired. The tire building material and beads are automatically applied on a plurality of collapsible tire building drums, which are continually moving between assemblies of the machine 100. The machine 100 will hereinafter be referred to as the bead and ply applicator, or BPA 100.

The BPA 100 essentially comprises a plurality of interconnected and dependent assemblies, where specialized tire building operations are automatically performed.

A Series 100 Innerliner and Chafer Assembly, generally indicated at 101, is provided for applying a sheet of innerliner with partially overlapped strips of chafer, to the tire building drums. This assembly will hereinafter be referred to as the IC unit 101.

A Series 200 First Ply Assembly, generally indicated at 102, is disposed adjacent the IC unit 101 for applying a first ply on the drums over the innerliner and chafer. This assembly will hereinafter be referred to as the 1-PLY unit 102.

A Series 300 Second Ply Assembly, generally indicated at 103, is disposed adjacent the 1-PLY unit 102 for applying a second ply on the drums over the first ply, in predetermined reinforcing cord oriented relation to the reinforcing cords of the first ply. This assembly will hereinafter be referred to as the 2-PLY unit 103.

A Series 400 Turret Assembly, generally indicated at 104, is disposed adjacent the 2-PLY unit 103 for applying a strip of tread cushion on the drums over the second ply, stitching the plies and setting the beads on the tire carcass. This assembly will hereinafter be referred to as the BA unit 104, since the primary operation at this assembly is the bead application.

A Series 500 Turret Assembly, generally indicated at 105, is disposed adjacent the BA unit 104 and IC unit 101 for stitching the beads, applying a strip of white sidewall on the drums over the second ply, and discharging or removing the tire carcasses from the drums. This particular assembly will hereinafter be referred to as the TD unit 105, since the primary operation at this assembly is the tire discharge.

A Series 600 Drum Transfer Assembly, generally indicated at 106, is provided for conveying the drums between the aforementioned units of the BPA 100. This particular assembly will hereinafter be referred to as the DT unit 106.

A Series 700 Material Handling Assembly, generally indicated at 107, is also provided for supplying continuous sheets of ply material in proper cord oriented relation to the 1-PLY unit 102 and the 2-PLY unit 103. This assembly will hereinafter be referred to as the MH unit 107.

SERIES 100 INNERLINER AND CHAFER ASSEMBLY

The IC unit 101 (FIG. 3), essentially comprises a stationary table 110 with a generally flat bed 111 for supporting innerliner and chafer in a horizontal plane. Means, generally indicated at 112, are included for feeding a continuous sheet of innerliner and strips of chafer to the table 110 in parallel spaced relation. A unit 113 is provided for transferring the sheet of innerliner and strips of chafer on to the flat bed 111. A cutter assembly 114 is disposed adjacent the flat bed 111 for cutting the innerliner and chafer into predetermined lengths for positioning on the flat bed 111. The table 110 includes a pair of movable bed portions 115 and 116 for tensioning the sheet of innerliner positioned on the flat bed 111, to a predetermined longer length. A chafer applicator 117 is supplied for moving the strips of chafer into partially overlapped, superimposed relation on the sheet of tensioned innerliner disposed therebetween. A unit 118 is provided for transporting a building drum across the flat bed 111 in rolling, engaged wrapping relation with the innerliner and chafer to complete the operation of the IC unit 101. For convenience, any tire building drum will hereinafter be referred to as drum 119.

Innerliner and chafer table

Figure 4:
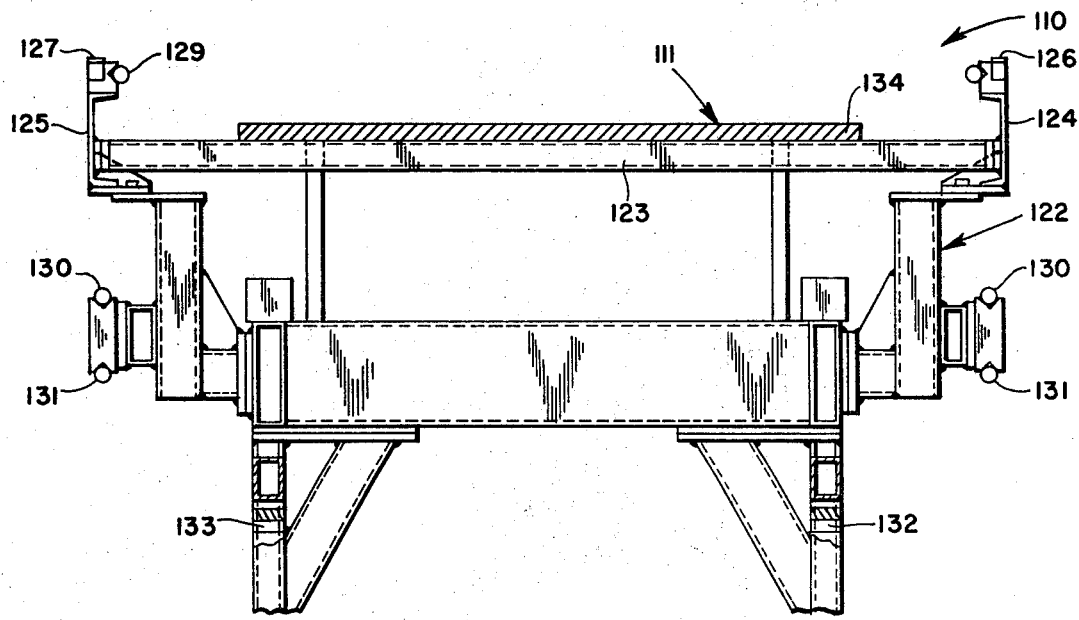
FIG. 4 is a cross section of the table assembly on which innerliner and chafer are positioned.

The IC table 110 (FIG. 4) comprises a rectangular frame 122 composed of conventionally designed structural members. The frame 122 is firmly bolted or attached to the floor of the building in which the BPA 100 is located. The stationary flat bed 134 is supported on legs 120. Upstanding frame sides 124 and 125 support a pair of upwardly facing, parallel gear racks 126 and 127. A set of parallel guide rails 128 and 129 are disposed adjacent the gear racks 126 and 127.

A number of similar guide rails 130 and 131 are disposed adjacent the frame sides 124 and 125 in parallel relation below the flat bed 111. A couple of downwardly directed gear racks 132 and 133 are mounted on the frame 122 in parallel relation below the pairs of guide rails 130 and 131.

Innerliner and chafer tension mechanism

Figure 7:
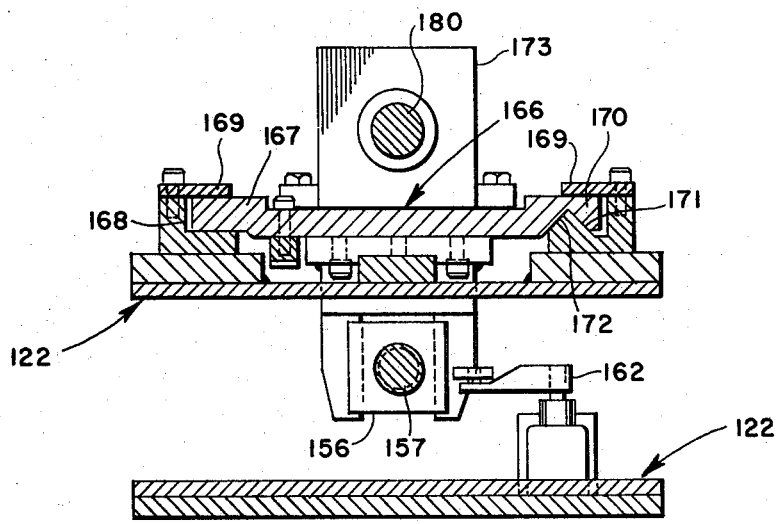
FIG. 7 is a section viewed from the line 7—7 of FIG. 6.

The IC bed 111 (FIGS. 5–7) comprises the stationary bed portion 134, intermediate the movable bed portions 115 and 116. The movable bed portions 115 and 116 are in partially overlapped relation to the stationary bed portion 134. Electric eyes 135–138 are stategically located on the flat bed 111, for sensing innerliner and chafer.

A pair of vacuum manifolds 140 and 141 with sealed air passageways 142 and 143 respectively, are disposed adjacent the marginal edges 144 and 145 of the movable bed portions 115 and 116. A plurality of aligned holes 146 are disposed in the movable bed portions 115 and 116 in communicating relation with the air passageways 142 and 143 of the vacuum manifolds 140 and 141. An air hose and pump (not shown), are secured to the vacuum manifolds 140 and 141 for creating vacuum of air along the marginal edges 144 and 145 of the movable bed portions 115 and 116 to hold the innerliner and chafer firmly in position when the bed portions 115 and 116 are moved.

The bed portion 115 is mounted for reciprocating movement along an axis parallel to the longitudinal axis of the flat bed 111 by any suitable means. For example, the movable bed portion 115 is secured to a pair of bushings 147 slidably mounted on a pair of parallel guide rods 148, which are secured to the frame 122 adjacent opposing sides 150 and 151 of the flat bed 111. A pair of air cylinders 152 and 153 with self-aligning piston rod ends 154 are coupled to a pair of pivot pins 155 extending downwardly in spaced relation from the vacuum manifold 141. The tensioning gap or movement of the bed portion 115 is fixed at about ¼ of an inch.

Any suitable means can be used to adjust the overall length of the table. For example, the other movable bed portion 116 is secured to a sleeve 156 which is threadably engaged with a drive screw 157, journalled for rotation in a pair of spaced pillow blocks 159 and 160 secured to the table frame 122. An electric motor 161 is operatively connected to the drive screw 157 for rotating it to axially move the bed portion 116. A pair of spaced limit switches 162 and 163 are provided for engaging the sleeve 156 to sense its travel along the drive screw 157. The BPA 100 is generally used to produce tires for three rim sizes, namely, 13, 14 and 15 inch rims.

The movable bed portion 116 is secured to a pair of bushings 164, which are slidably mounted on parallel guide rods 165, which are also mounted on the table frame 122 adjacent opposing sides 150 and 151 of the flat bed 111 (FIG. 5).

The threaded sleeve 156 is secured to the underside of a platform 166, which is slidably mounted on the table frame 122 by any suitable means. For example, an edge 167 of the platform 166 is slidable along a supporting ledge 168 formed in the table frame 122. A cover plate 169 is secured to the table frame 122 in spaced relation from the support ledge 168 forming a horizontal recess in which the platform edge 167 slides. An opposing edge 170 of the platform 166 is slidable along a ridge 171 formed in the table frame 122 in spaced relation from the supporting ledge 168. The platform edge 170 is provided with an inverted V-shaped recess 172 for matingly engaging the ridge 171 to prevent lateral movement of the platform 166 as it moves along its pathway. A similar cover plate 169 is provided for forming a horizontal recess with the ridge 171.

An air cylinder 175 secured to the platform 166 is provided for moving the bed portion 116 axially in unison with the bed portion 115 to tension the inner liner positioned on the flat bed 111. The air cylinder has a self-aligning piston rod end 176 which is coupled to a pivot pin 177 extending downwardly from the vacuum manifold 140. The tensioning gap or movement of the bed portion 116 is regulated by adjusting the stroke of the air cylinder 175. To accomplish this, a bracket 178 is mounted on the platform 166 in spaced relation from the air cylinder 175.

An extension rod 179 is coupled to the piston rod 180 and extends through the bracket 178. Spanner nuts 181 are threadably mounted on the extension rod 179 on either side of the bracket 178, to engage the bracket 178 and limit the travel of the piston rod 180.

A table extension 182 is provided for the movable bed portion 116. The table extension 182 provides a rest or support for the drum 119 when the length of the flat bed 111 is shortened to build tire carcasses for smaller rims. The drums 119 normally engage the flat bed 111 in close proximity to the vacuum manifold 140.

A pair of limit switches 183 and 184 (FIG. 5) are provided for sensing the tension movement of the bed portion 115. An actuator 185 is carried by the piston rod 180 of the air cylinder 175 for engaging a pair of spaced limit switches 186 and 187 for sensing the tension movement of the bed portion 116.

Innerliner and chafer feed

The IC feed means 112 (FIGS. 8 and 9) provides free loops of innerliner and chafer which are easily pulled or moved on to the flat horizontal bed 111. The IC feed means 112 comprises a stationary frame 190, which is bolted on the floor adjacent the table 110. A plurality of feed rollers 191, 192 and 193 are rotatably mounted in staggered relation adjacent frame side 194 of the feed frame 190, for receiving a strip of chafer C from a chafer letoff unit, generally indicated at 195. A drive roller 196 is in juxtaposed relation to the feed roller 193 for compressively engaging the strip of chafer moving between them. An electric motor 197 is operatively connected to the drive roller 196 for rotating it to move the strip of chafer C into a free loop 198 adjacent the IC table 110.

A plurality of similar feed rollers 203, 204 and 205 are rotatably mounted in staggered relation adjacent the opposing upstanding frame side 206, for receiving a strip of chafer $C_1$ from the chafer letoff 195. A drive roller 207 is mounted in juxtaposed relation to feed roller 205 and operatively connected to an electric motor 208 for moving the strip of chafer $C_1$ around the feed rollers 203–205 into the free loop 209 adjacent the IC table 110.

A feed conveyor 212 and follower arm 213 are rotatably mounted on the feed frame 190 for rotation about the same axis. The feed conveyor 212 is utilized for conveying innerliner from an adjacently disposed innerliner letoff 214 (FIGS. 10 and 11) into a free loop 215 adjacent the IC table 110. The follower arm 213 is used for rotating the feed conveyor 212 out of engagement with the innerliner letoff 214 and for driving the feed conveyor 212 from rotary power it receives being in rolling engagement with a roll 216 of discarded innerliner fabric wrapping.

The follower arm 213 comprises a pair of spaced parallel side plates 217 and 218 mounted for rotation on a drive shaft 220, which is journalled for rotation in spaced brackets 221 and 222 secured to the feed frame 190. A pair of brackets 223 and 224 are secured to the outstanding ends 225 and 226 of the side plates 217 and 218, respectively. A drive rod 227 is journalled for rotation in the brackets 223 and 224 in parallel spaced relation from the drive shaft 220. An elongated drive roller 228 is mounted for unitary rotation with the drive rod 227, intermediate the side plates 217 and 218. The drive roller 228 acts as a cam follower for rolling engagement on the rotating roll 216 of discarded fabric wrapping for the innerliner.

A drive pulley 230 is mounted on the end 231 of the drive rod 227 extending beyond the bracket 223. A second drive pulley 232 is mounted on the drive shaft 220 adjacent the side plate 217, in aligned relation with the drive pulley 230. A flexible belt 233 is reeved around the drive pulleys 230 and 232 for transferring rotary motion of the elongated roller 228 to the drive shaft 220.

An air cylinder 234 is coupled to the follower arm 213 for rotating the drive roller 228 into and out of rolling engagement with the roll 216 of fabric wrapping and lifting engagement with the feed conveyor 212. The follower arm 213 carries an abutment 235 for engaging a stop 236 on the underside 237 of the feed conveyor 212 to prevent the drive roller 228 from touching the feed conveyor 212 when the follower arm 213 is in engaged lifting relation with the feed conveyor 212. The follower arm 213 and feed conveyor 212 must be lifted out of the pathway of the innerliner letoff 214 when it is rotated to position a new roll of innerliner and replace a depleted roll.

The feed conveyor 212 comprises a pair of side members 240 and 241 which are rotatably mounted in parallel relation on the drive shaft 220 intermediate the side plates 217 and 218 of the follower arm 213. The side members 240 and 241 are joined at their outstanding ends 242 and 243 by a rim 244. A cover plate 245 covers the feed conveyor 212 adjacent the rim 244. A drive bar 246 is journalled for rotation between the side members 240 and 241 adjacent the cover plate 245, in parallel relation with the drive shaft 220. A set of pulleys 250 are mounted in spaced relation on the drive bar 246. Another set of pulleys 251 are mounted on the drive shaft 220 in aligned relation with the pulleys 250 mounted on the drive bar 246. Flexible belts 252 are reeved around pairs of aligned pulleys 250 and 251 and form a driver for moving the innerliner into the loop 215 adjacent the IC table 110.

Electric eyes 253 and 254 and 255 are used to sense the loop 215 of innerliner and the loops 198 and 215 of chafer.

Innerliner letoff

The innerliner letoff 214 (FIGS. 10 and 11) comprises a portable platform 257 mounted on casters 258. The platform 257 is rotatable about the axis of a centrally disposed pivot pin 259 which extends upwards through the platform 257 from a collar 260 secured to a base 261, which is firmly anchored on to the floor adjacent the feed frame 190.

A drive wheel 262 is horizontally keyed to the pivot pin 259 above the platform 257. A cable 263 is reeved around the drive wheel 262 and secured to opposing faces of a piston reciprocable in an air cylinder 264 secured to the platform 257. The platform 257 is rotated approximately 180 degrees in either direction when the air cylinder 264 is actuated. A bracket 265 with adjustable bolts 266 and 267 is secured to the base 261 adjacent the platform 257. A shock absorber 268 with a spring biased plunger 269, is mounted on an end 270 of the platform 257 for engaging the bolt 267 to positiont he platform 257 for innerliner takeoff from the first roll 271 of material. A similar shock absorber 272 with a spring biased plunger 273, is mounted on an opposing end 274 of the platform 257 for engaging the bolt 267 to position the platform 257 for innerliner takeoff from the second roll 275 of material. Thus, when the roll 271 of innerliner is depleted, the platform 257 is immediately rotated approximately 180 degrees to position the fresh roll 275 for takeoff. The empty roll 271 is quickly replaced with a new roll of innerliner. In this way there is relatively little time lost in positioning a new roll for feeding innerliner to the IC table 110.

A storage frame 278 is welded on the platform 257 and supports two rolls of innerliner adjacent opposing ends 279 and 280 of the frame. The mechanisms for supporting the two rolls are similar, therefore, only one of the mechanisms will be described.

The storage frame 278 comprises two parallel side bents 281 and 282 held in spaced relation by cross beams 283. A pair of brackets 284 and 285 are secured to the side bents 281 and 282 adjacent the frame end 279 for slidably receiving the ends 286 and 287 of a rod 288 on which the roll 271 of innerliner is wrapped. The rod ends 286 and 287 are each held in recesses 290 formed in the brackets 284 and 285 by a turn pin 291.

Another pair of brackets 292 and 293 are secured on the side bents 281 and 282 above the first pair of brackets 284 and 285. The second pair of brackets 292 and 293 have similar recesses 294 for receiving the ends 295 and 296 of a roller 297 on which the discarded fabric wraps itself. A turn pin 298 is also used to hold the roller ends 295 and 296 in position on the brackets 292 and 293.

A pair of electric motors 300 and 301 are mounted adjacent the upper bents 281 and 282 of the storage frame 278. The motor 300 is provided with a pair of sprocket wheels 302 and 303. The outside sprocket wheel 302 is coupled by a chain 304 to an aligned sprocket wheel 305 mounted on the protruding end 295 of the roller 297. The inside sprocket wheel 303 is coupled by a chain 306 to an aligned sprocket wheel 307 secured to a drive roller 308 rotatably mounted between the side bents 281 and 282. A pair of feed rollers 309 and 310 and a head roller 311 are rotatably mounted between the side bents 281 and 282 in staggered relation to the drive roller 308.

The motor 301 adjacent the other side bent 282, is provided with a sprocket wheel 312 which is coupled by a chain 313 to an aligned sprocket wheel 314 carried by a beater bar 315 rotatably mounted between the side bents 281 and 282 adjacent the feed roller 310 for helping separate the fabric wrapping W from the innerliner I.

A roller tensioning device 316 is provided for maintaining the innerliner and fabric wrapping IW taut as it moves from the roll 271 to the first feed roller 310, where the fabric wrapping W is separated from the innerliner I by the beater bar 315. The innerliner I moves upwards to the head roller 311 and on to a table portion 317 of the storage frame 278. The fabric wrapping W is reeved in staggered relation around the drive roller 308 and feed roller 309 and then wrapped around the roller 297.

A grab plate 318 is rotatably mounted for engaging and holding innerliner in compressed relation against the table portion 317. A pair of air cylinders 319 are provided for rotating the grab plate 318 into and out of holding relation with the innerliner. The grab plate 318 is used for holding the leading edge of a fresh roll of innerliner in position for immediate splicing when the platform 257 is rotated to position a new roll for innerliner takeoff.

Chafer letoff

Figure 13:
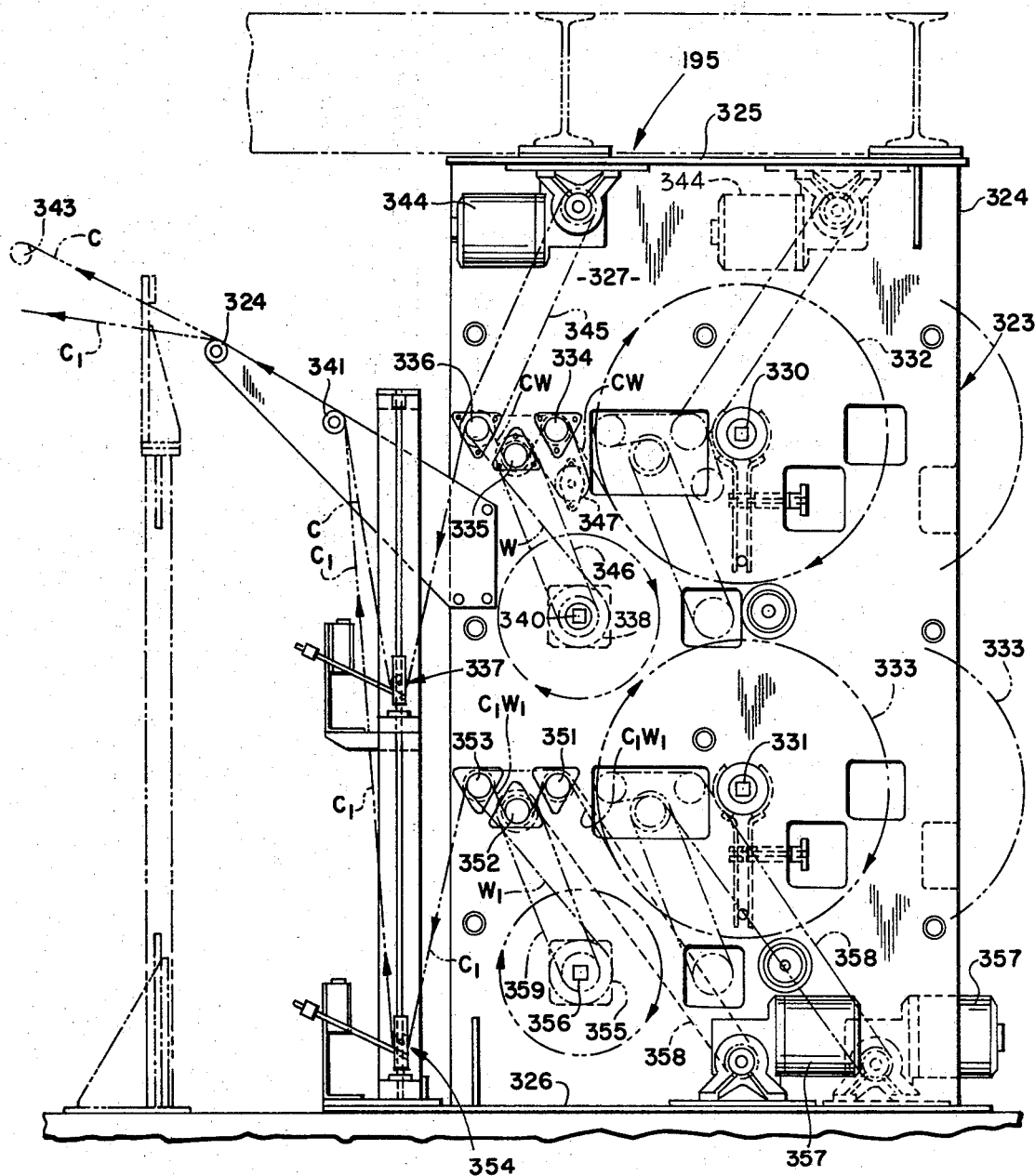
FIG. 13 is a side view of the chafer storage device.
Figure 14:
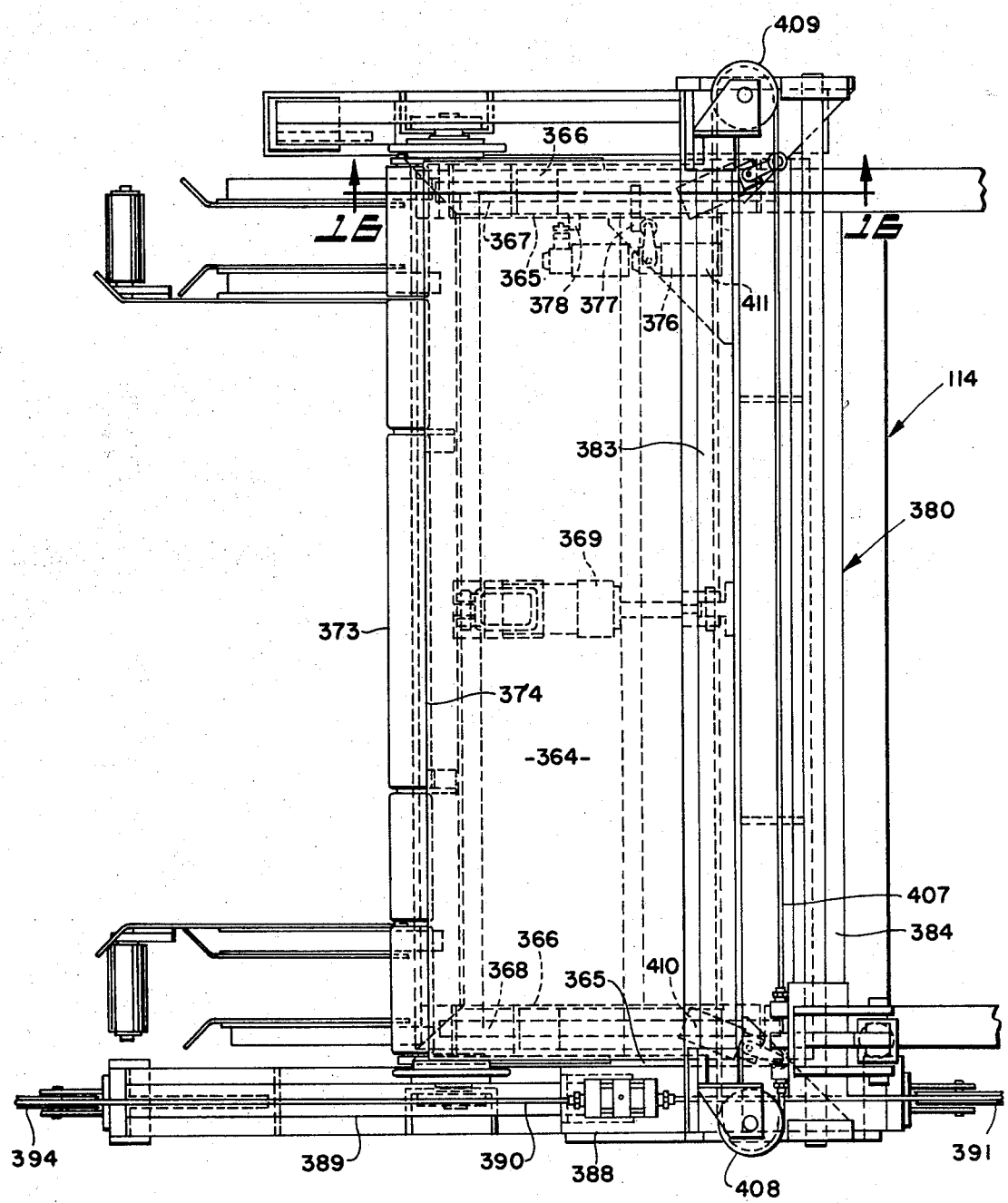
FIG. 14 is a plan view of a cutter assembly used with the innerliner and chafer table assembly.
Figure 15:
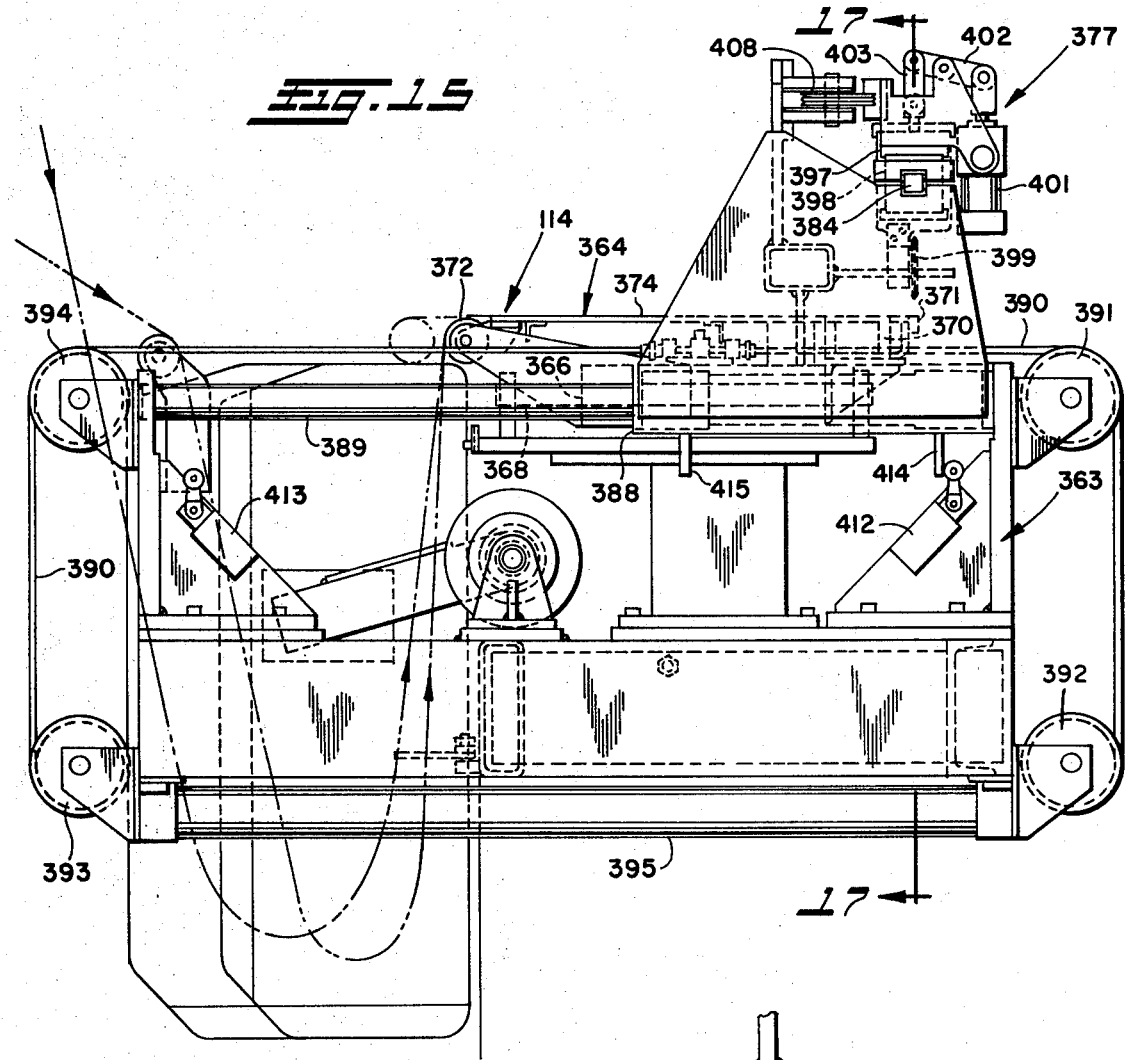
FIG. 15 is a side view of the cutter assembly.
Figure 16:
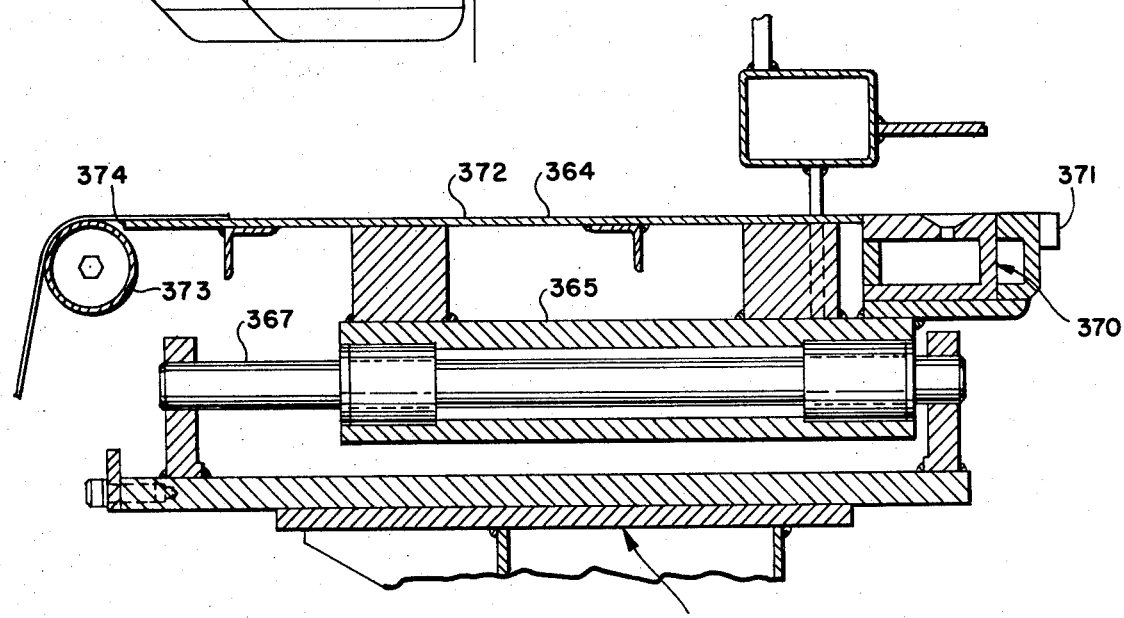
FIG. 16 is a section viewed from the line 16—16 of FIG. 14.

The chafer letoff 195 (FIGS. 12 and 13) comprises a generally I-shaped frame 323 having an upstanding center portion 324 intermediate a top plate 325 and a base 326 which is bolted to the floor adjacent the feed frame 190. The center portion 324 of the frame 323 includes opposing sides 327 and 328 on which are mounted similar mechanisms for supplying the strips of chafer C and $C_1$ to the IC feed means 112; therefore, their description will be in relation to the mechanisms on side 327 of the center portion 324. The chafer letoff 195, like the innerliner letoff 214, provides mechanisms for readying fresh rolls of material for immediate splicing to maintain continued operation of the assemblies without disruptions.

A pair of spindles 330 and 331 are mounted in spaced relation on the frame side 327 for supporting rolls 332 and 333 of chafer rolled in fabric wrapping. A strip of chafer and fabric wrapping CW from the roll 332, is reeved around a set of staggered feed rollers, 334, 335 and 336. The chafer and fabric wrapping are separated at the last feed roller 336, the chafer C being reeved around a roller tensioning device 337 and the fabric wrapping W around a roller 338 mounted on a spindle 340 in spaced relation from the spindle 330. The strip of chafer C is then reeved over feed rollers 341, 342, and 343 for overhead movement to the feed roller 191 of the feed frame 190. An electric motor 344 is coupled by drive belts 345 and 346 to the feed rollers 334–336, the roller 338 on which the discarded fabric wrapping W is rolled, and a beater bar 347, for operating the rollers to move the chafer C from the chafer letoff 195.

A strip of chafer and fabric wrapping $C_1$, $W_1$, from the roll 333, is reeved around a second set of feed rollers 351, 352 and 353. The chafer and fabric wrapping are separated at the last feed roller 353, the chafer $C_1$ being reeved around a roller tensioning device 354 and the fabric wrapping $W_1$ around a roller 355 mounted on a spindle 356 spaced from the spindle 331. The chafer $C_1$ is then reeved over feed rollers 341 and 342 for overhead movement to the adjacent feed roller 203 of the feed frame 190. An electric motor 357 is coupled by drive belts 358 and 359 to the feed rollers 351–353, and the roller 355 on which the discarded fabric wrapping $W_1$ is rolled, for operating the rollers to move the chafer $C_1$ from the chafer letoff 195.

Cutter assembly

The cutter assembly 114 (FIGS. 14–18) comprises a stationary frame 363 which is disposed between the IC table 110 and the IC feed means 112. A table 364 is provided for supporting the innerliner in parallel relation between the strips of chafer C and $C_1$.

The support table 364 is movable into and out of abutting relation with the adjacent movable bed portion 115 by any suitable means. For example, the table 364 is secured to a pair of bushings 365 and 366 slidably mounted on a pair of guide rods 367 and 368, which are mounted in parallel relation on the cutter frame 363. An air cylinder 369 is coupled to the cutter table 364 intermediate the bushings 365 and 366, for reciprocating the cutter table 364 along the guide rods 367 and 368.

A vacuum manifold 370 is disposed along the leading edge 371 of the cutter table 364 for holding the innerliner and chafer against the top 372 of the cutter table 364. A roller 373 is disposed adjacent the trailing edge 374 of the cutter table 364 for guiding the sheet of innerliner and strips of chafer on to the table top 372 in parallel relation. A limit switch 376 is carried by the cutter table 364 for engaging a pair of projections 377 and 378 disposed in spaced relation on the cutter frame 363 to sense the travel or axial position of the cutter table 364 on the cutter frame 363.

A cutter 380 is provided for cutting the sheet of innerliner and strips of chafer positioned on the cutter table 364. The cutter 380 comprises a pair of upstanding side frames 381 and 382 (FIG. 17), joined together by an elongated air cylinder 383 and square shaft 384 which span the cutter table 364 in spaced relation from the table top 372. The side frame 382 carries a plurality of rollers 385, which are movable between a pair of guideways 386 and 387 secured in parallel relation to the cutter frame 363.

The other side frame 381 is secured to a bushing 388 slidably mounted on a guide rail 389 secured to the cutter frame 363 in parallel relation to the guideways 386 and 387. The side frame 381 is fastened to a cable 390 reeved around guide wheels 391–394, which are rotatably mounted in spaced relation on the cutter frame 363. The cable 390 is secured to opposing faces of a piston reciprocable in an air cylinder 395 mounted between guide wheels 292 and 293. The air cylinder 395 is operated to move the cutter 380 relative to the cutter table 364.

A housing 397, including a bushing 398, slidably mounted on the square shaft 384, carries a circular blade 399 with a knife edge 400 for cutting engagement with the innerliner and chafer. An air cylinder 401, associated with the housing 397, is coupled by link arms 402 and 403 to the cutter blade 399 for moving it into engaged relation with the table top 372, and consequent cutting engagement with the innerliner and chafer as the blade 399 rolls transversely across the cutter table 364.

The housing 397 is fastened to a cable 407, which is reeved around a couple of guide wheels 408 and 409 rotatably mounted on the cutter side frames 381 and 382. The cable 407 is secured to opposing faces of a piston reciprocable in the air cylinder 383 spanning the cutter table 364. The air cylinder 383 is operated to move the housing 397 and blade 399 transversely across the cutter table 364.

A set of limit switches 410 and 411 are mounted at either side of the cutter table 364 to sense the transverse position of the housing 397 and blade 399 relative to the cutter table 364. Another set of limit switches 412 and 413 are mounted in spaced relation on the cutter frame 363 for engaging protruding lugs 414 and 415 carried by the bushing 388 to sense the position of the cutter 380 relative to the IC bed 111.

Innerliner and chafer transfer unit

The IC transfer unit 113 (FIGS. 19–22) comprises a carriage 418 mounted for axial movement across the IC bed 111. The carriage 418 is mounted on a number of guide rollers 419–422 movable along the guide rails 128 and 129 of the IC table 110. The guide rollers 419–422, each comprises a couple of chain connected rollers 423 and 424 which angularly engage the guide rails 128 and 129 to prevent lateral movement of the carriage 418 as it moves along the rails.

An electric motor 425 is coupled to a drive shaft 426 journalled for rotation in opposing sides 427 and 428 of the carriage 418. A pair of spur gears or pinions 430 and 431, mounted on protruding ends 432 and 433 of the drive shaft 426, matingly engage the gear racks 126 and 127 and move along them in response to operation of the motor 425 and rotation of the drive shaft 426.

A set of vacuum manifolds 434–436 for picking up the leading edge of the sheet of innerliner, and a pair of vacuum manifolds 437 and 438 for picking up the leading edge of the strips of chafer, are rotatably mounted on the carriage 418. The innerliner manifolds 434–436 comprise a pair of movable wing manifolds 435 and 436 and a center manifold 434 which is stationary. The wing manifolds 435 and 436 are mounted for lateral movement relative to the stationary manifold 434, to adjust or compensate for different widths of innerliner. The chafer manifolds 437 and 438 are mounted for movement in two directions, i.e. parallel to the longitudinal axis of the IC bed 111 and laterally in conjunction with the wing manifolds 435–436. The chafer manifolds are moved in the former direction to translate the strips of chafer relative to the sheet of innerliner prior to cutting to provide longer pieces of chafer, since the chafer is not tensioned as is the innerliner. The innerliner and chafer vacuum manifolds 434–438 are fastened to an air hose and pump (not shown) for creating a vacuum of air in the manifolds.

A pair of guide rods 442 and 443 are rotatably mounted on the carrier 418 in parallel relation to the drive shaft 426 for operating the pinions 430 and 431. The stationary innerliner manifold 434 is secured to a block 444 which is fastened in fixed relation on the guide rods 442 and 443. The innerliner wing manifolds 435 and 436 are secured to a pair of guide blocks 445 and 446 movable along the guide rods 442 and 443. The chafer manifolds 437 and 438 are slidably mounted on the guide blocks 445 and 446 in predetermined spaced relation from the innerliner wing manifolds 435 and 436.

A drive screw 447 is disposed in parallel relation with the guide rods 442 and 443 and journalled for rotation in the carriage sides 427 and 428. The guide blocks 445 and 446 for the wing and chafer manifolds 435–438 are threadably mounted on the drive screw 447. An electric motor 448 is coupled to the drive screw 447 for rotating it to move the guide blocks 445 and 446 along the guide rods 442 and 443, and consequently laterally position the wing manifolds 435 and 436 and chafer manifolds 437 and 438 relative to the stationary manifold 434. A mechanism, e.g. potentiometer 449 and reducer 450, is operatively connected to the drive screw 447 for sensing the lateral positions of the wing and chafer manifolds 435–438.

A couple of air cylinders 451 and 452 are coupled to the chafer manifolds 437 and 438, for moving them relative to the guide blocks 445 and 446, or parallel to the longitudinal axis of the IC bed 111. An air cylinder 453 is coupled to the stationary block 444 for rotating the entire assembly of guide blocks 444–446, guide rods 442–443, and drive screw 447 to position the vacuum manifolds 434–438 for picking up the innerliner and chafer on the cutter table 364.

A guide rail 454 is mounted parallel to the drive screw 447 for rotation about the longitudinal axis of the screw.

A set of brackets 455–457 are slidably mounted on the guide rail 454. The center bracket 455 is fixedly mounted on the drive screw 447 and the side brackets 456 and 457 threadably engage the drive screw 447 for moving laterally relative to the fixed center bracket 455 in response to rotation of the drive screw 447. The brackets 455–457 are designed to support cementing units 458 (FIGS. 24–24). A pair of air cylinders 460 and 461 are coupled to the guide rail 454 adjacent the side brackets 456 and 457, respectively, for rotating the cementing units 458 into engagement with innerliner positioned on the IC bed 111.

A pair of limit switches 462 and 463 are provided for engaging the guide rods 442 and 443 and guide rail 454, respectively, to sense the arcuate position of the vacuum manifolds 434–438 and cementing units 458 relative to the innerliner and chafer positioned on the IC bed 111. A magnet 464 is carried by the carriage 418 for tripping a set of spaced magnetic switches 465–468 mounted on the IC table 110. The magnetic limit switches 465–468 sense the axial position of the carriage 418 on the IC table 110, and act to slow down and stop the carriage 418 in positions for dropping the innerliner and chafer on the IC bed 111 and applying cement or adhesive to the leading edge of the innerliner.

Cement applicator

The cementing units or applicators 458 (FIGS. 23–24) each comprise a frame 470 which is bolted to the brackets 455–457. A roll 471 of adhesive on tape is rotatably mounted on the frame 470 in spaced relation from a discharge roller 472 on which the used tape is wrapped. The adhesive on tape T from the feed roll 471 is reeved around a pair of spaced guide rollers 473 and 474 and wrapped on the discharge roller 472. An air cylinder 475 is coupled to a plunger 476, which is guided by bracket 477 into engagement with the adhesive on tape T between the feed roll 471 and discharge roller 472, to momentarily press the tape against the innerliner to transfer adhesive material from the tape to the innerliner.

A lever arm 478 extends from an adjustable one-way clutch 479 coupled to the discharge roller 472. The lever arm 478 is provided with an elongated slot 480 for slidably receiving a cam follower 481, including a wheel 482 for compressive rolling engagement with the used tape as it wraps on the discharge roller 472. An air cylinder 483 is coupled to the cam follower 481 for operating the lever arm 478 to rotate the discharge roller 472 and move fresh adhesive tape T between the guide rollers 473 and 474.

A spring 485 is provided for biasing the wrapping wheel 482 against the roll of used tape on the discharge roller 472. A micro switch 486 with a plunger 487 for engaging the air cylinder 483, is provided for sensing the operation of the air cylinder 475 and consequent movement of the lever arm 478 to detect when the roll of used tape is large enough to indicate that the feed roll of tape 471 is empty.

Chafer applicator

The chafer applicator 117 (FIGS. 25–26) comprises a pair of vacuum manifolds 490 and 491 disposed adjacent opposing sides 492 and 493 of the IC bed 111. The vacuum manifolds 490 and 491 include a set of aligned nozzle 494 and 495 for picking up the adjacent strips of chafer C and $C_1$ and placing them in at least partially overlapped, superimposed relation on the sheet of innerliner I.

A rectangular housing 496, is mounted on the IC table 110 in spaced relation below the IC bed 111. A guide rod 497 extends between opposing ends 498 and 499 of the housing 496. A drive shaft 501 with threaded ends 502 and 503 is journalled for rotation in a pair of pillow blocks 504 and 505 secured in spaced relation to the housing 496.

A plate 506 is secured to the table frame 122, supports an electric motor 507 below the drive shaft 501. The motor 507 is connected by sprocket wheels 508 and 509 and connecting chain 510 to the drive shaft 501 for rotating it. A mechanism, including a reducer 514 and potentiometer 515 is secured to the plate 506 and operatively connected to the drive shaft 501 for sensing the lateral position of the vacuum manifolds 490 and 491 relative to the longitudinal axis of the IC bed 111.

The mechanisms for operating the chafer manifolds 490 and 491 are essentially the same, therefore, their description will be given in relation to the chafer manifold 491. The manifold 491 is slidably mounted on a pair of configured link arms 520 and 521 which extend below the IC bed 111. The link arms 520 and 521 are rotatably mounted on a frame 522, which is secured to a bushing 523 slidably mounted on the guide rod 497. An air cylinder 524 is interposed between the link arm 520 and manifold 491 to move the manifold 491 laterally relative to the link arms 520 and 521, and parallel to the longitudinal axis of the IC bed 111.

A support 525 is slidably mounted on the housing 496 in threaded engagement with the adjacent end 502 of the drive shaft 501. A pair of air cylinders 526 and 527 are disposed in back-to-back relation between the bushing 523 and support 525, the piston rod 528 extending from the air cylinder 526 being coupled to the bushing 523, and the piston rod 529 extending from the air cylinder 527 being coupled to the support 525. The air cylinder 526 is operated for moving the vacuum manifold 491 from its normal rest position into pick-up relation with the strip of chafer $C_1$. The air cylinder 527 is then operated to move the vacuum manifold 491 towards the adjacent side of the innerliner to place the strip of chafer $C_1$ in partially overlapped relation on the innerliner. The lateral movement of the vacuum manifold 491 is varied by adjusting the stroke of air cylinder 527, i.e. moving the support 525 by operating the motor 507 to rotate the drive shaft 501.

A pair of air cylinders 530 and 531 are coupled to the link arms 520 and 521 for rotating the manifold 491 to pick up and deposit the strip of chafer $C_1$. A pair of slots 532 and 533 are provided in the bed 111 for allowing movement of the link arms 520 and 521 laterally towards the longitudinally axis of the IC bed 111.

Drum transport unit

The drum transport unit 118 (FIGS. 27–29) comprises a drum carrier 537 which supports and moves the tire building drums 119 in rolling engagement across the innerliner and chafer positioned on the horizontal bed 111. The drum carrier 537 comprises a pair of side frames 538 and 539 held in spaced relation by cross members, e.g. members 540 and 541. The side frames 538 and 539 and operating mechanisms are similar; therefore, their description will be in relation to side frame 539.

The side frame 539 comprises a lower frame assembly 542 and an upper frame assembly 543, which is movable relative thereto. Four pairs 544–547 of angularly disposed chain connected rollers 548 are mounted on the lower assembly 542 for rolling engagement along the guide rails 130 and 131 of the table frame 122. Two pairs of guide blocks 550 and 551, and 552 and 553 are disposed on the lower assembly 542 in vertical aligned relation. An air cylinder 554 is mounted on the lower assembly 542 between the guide blocks 550–553. A ram 555 protrudes from the air cylinder 554, and is movable to engage an aligned abutment 556 carried by the upper assembly 543. An adjustable air spring 557 is mounted on the lower assembly 542 in aligned relation below the air cylinder 554.

The upper frame assembly 543 comprises a drum head 600 and platform 601 and connecting parallel guide rods 602 and 603. The guide rods 602 and 603 are movable through corresponding guide blocks 550–553 carried by the lower assembly 542. The ram 555 is operated to engage and raise the drum head 600 for receiving a building drum 119 from the DT unit 106. The drum head 600 is lowered to a position where the platform 601 rests on the air spring 557. The normal weight of a tire building drum, alone, is about 325 lbs. The inflatable bag of the air spring 557 is filled with air and adjusted such that the drum 119 will exert a force of about 100 lbs. against the innerliner and chafer as it rolls across the horizontal bed 111.

A socket assembly 604, including a socket 605 for matingly engaging the adjacent end 606 of drum shaft 607, is movably mounted on the drum head 600. A pair of air cylinders 608 and 609 are coupled to the socket assembly 604 for reciprocating the socket 605 axially into and out of supporting engagement with the drum shaft 607. An air cylinder 610 and pin 611 are provided for locking the socket assembly 604 in position to maintain the socket 605 in supporting relation with the drum shaft 607. A pair of limit switches 612 and 613 are carried by the upper and lower frame assemblies 543 and 542, to sense the vertical position of the drum head 600.

A drive shaft 614 is rotatably mounted in pillow blocks 615 carried by the lower assemblies 542 of the side frames 538 and 539. A pair of pinions 616 are mounted on the drive shaft 614 in aligned, engaged relation with the adjacent gear racks 132 and 133 spaced on the IC table frame 122. An electric motor 617 is operatively connected to the drive shaft 614 for rotating it to drive the pinions 616 along the gear racks 132 and 133. A set of limit switches e.g. limit switch 618, are positioned to engage the drum transport 118 and sense its position on the horizontal bed 111 in much the same manner that the magnetic limit switches are used to sense the position of the IC transfer unit 113.

It is essential that the vertical movement of the drum heads 600 be synchronized. Any suitable means can be used to accomplish this. For example, a pillow block 622 is mounted on the platform 601 of each drum head 600. An axle rod 623 extends between the upper assemblies 543 and is journalled for rotation in the pillow blocks 622. A pair of pinions 624 are secured to the axle rod 623 for unitary movement along a couple of vertical gear racks 625 carried by the lower frame assemblies 542, when the drum heads 600 move.

An air cylinder 626 is bolted on the underside of the platform 601 of the side frame 539. The air cylinder 626 operates a pin 627 for locking the upper and lower frame assemblies 543 and 542 together when the drum heads 600 are supporting the building drum 119 in rolling engagement with the material positioned on the IC bed 111.

SERIES 200 FIRST PLY ASSEMBLY AND SERIES 300 SECOND PLY ASSEMBLY

The 1-PLY unit 102 and the 2-PLY unit 103 are similar except for the angular disposition of the components to accommodate differently oriented bias cut first and second ply material (FIG. 3). The description of both units, therefore, will be given in relation to the Series 200 First Ply Assembly or the 1-PLY unit 102.

The 1-PLY unit 102 (FIG. 3) essentially comprises a stationary table 632 with a generally flat bed 633 for supporting first ply material in a horizontal plane. The bed 633 includes a pair of movable bed sections 634 and 635 for tensioning a sheet of first ply positioned on the bed 633 to a predetermined longer length. A cutter assembly 636 is disposed adjacent the flat bed 633 for cutting a length of first ply material for positioning on the bed 633. Means, indicated at 637, are included for feeding a continuous sheet of first ply material to the flat bed 633. A unit 638 is supplied for transferring the first ply material to the flat bed 633. Another unit 639 is provided for transporting a building drum 119 across the flat bed 633 in rolling, engaged wrapping relation with the first ply to complete the operation of the 1-PLY unit 102.

Many parts of the 1-PLY unit 102 and IC unit 101 are similar and rather than repeat any descriptive matter, the reader will be referred to previous figures and paragraphs for the description of such parts.

Ply table assembly

The first ply table 632 (FIG. 30) comprises a stationary frame 640 positioned in parallel relation to the stationary frame 122 of the IC unit 101. The stationary frames 640 and 122 are essentially the same, having similar gear racks 126, 127, 132 and 133, and guide rails 128, 129, 130 and 131 positioned adjacent frame sides 124 and 125. The horizontal bed 633 for the first ply, is also disposed between the upstanding sides 124 and 125 of the stationary frame 640.

Ply tension mechanism

The first ply bed 633 (FIGS. 31–36) comprises a stationary bed section 641, which is secured to the frame 640 intermediate the movable bed sections 634 and 635. The movable bed sections 634 and 635 are in partially overlapped relation with the stationary bed section 641.

A vacuum manifold 642 is disposed adjacent the angular marginal edge 643 of the bed section 634. A mechanism 644 for moving the bed section 634 to adjust the overall length of the horizontal bed 633 is similar to the motor 161 and drive screw 157 arrangement for moving the bed portion 116 of the IC unit 101. (See correspondingly titled paragraph of the IC unit 101 for more detailed explanation.) A mechanism 645 for moving the bed section 634 to tension a sheet of first ply material positioned on the bed 633 is likewise similar to the air cylinder 175 and bracket 178 arrangement for moving the IC bed portion 116.

The movable bed section 635 is also provided with a vacuum manifold 646 adjacent its marginal edge 647. A mechanism 648 for moving the bed section 635 to tension the sheet of ply material positioned on the bed 633, is also similar to the air cylinder 175 and bracket 178 arrangement for moving the IC bed portion 116.

The movable bed sections 634 and 635 (FIGS. 31 and 34) are mounted on pairs of guides 650 and 651, respectively. The guides 650 each comprise an elongated bushing 652, which is slidably mounted on a guide rod 653 secured between a pair of brackets 654 and 655. The bushing 652 carries a vertical pin 656 on which the movable bed section 634 is pivotally mounted. The guides 651 each comprise an elongated bushing 657, which is slidably mounted on a guide rod 658 secured between a pair of brackets 659 and 660. The bushing 657 also carries a vertical pin 661 on which the movable bed section 635 is pivotally mounted.

A plurality of similar fingers 664 are disposed in spaced relation along the marginal edges 643 and 647 of the movable bed sections 634 and 635. The fingers 664 carry a set of angle irons 665 which are rotatable with the fingers 664 to the position shown in dotted line (FIG. 34) where one leg 666 extends over the movable bed sections 634 and 635, and the other leg 667 abuts the marginal edges 643 and 647 of the bed sections 634 and 635. When the fingers 664 are in the raised position, the air pump connected to the vacuum manifold 646 is reversed and a blast of air is sent through the air holes 146 to lift the first ply material from the bed 633 into positioning engagement with the set of angle irons 665. The bed sections 634 and 635 are then moved towards each other to align material with the fingers. The air pump is then reversed to create a vacuum in the manifold 646 for holding the first ply material firmly in position as the bed sections 634 and 635 are moved apart to tension the material. The fingers 664 adjacent the angle iron 665 are provided with serrations 668 for engaging the ply material and keeping it from moving laterally relative to the longitudinal axis of the horizontal bed 633.

The fingers 664 are clamped on a pair of similar shafts 669 rotatably mounted below the vacuum manifolds 642 and 646 of the movable bed sections 634 and 635. An air cylinder 670 is coupled to a gear rack 671 which is slidable along a support 672 for driving or rotating an engaged pinion 673 keyed to the shaft 669. A limit switch 674 is associated with each air cylinder 670 to sense the position of the gear rack 671 and consequent arcuate position of the fingers 664.

Angular adjustment of the ply bed

The angular disposition of the movable bed sections 634 and 635 relative to the longitudinal axis of the horizontal bed 633, is adjustable to accommodate different bias cut ply material.

The stationary frame 640 includes a fixed underframe 680 disposed in parallel spaced relation below the horizontal bed 633. The underframe 680 comprises side members 681 and 682 which are parallel to the longitudinal axis of the horizontal bed 633, and end members 683 and 684 which are angularly disposed to the longitudinal axis of the horizontal bed 633. The underframe 680 is shaped like a parallelogram and includes a centrally disposed plate 685 secured to the end members 683 and 685 in parallel relation to the side members 681 and 682. A plurality of gusset plates 686–689 are secured at the four corners of the underframe 680 and contain arcuate slots 690–693, respectively. A pair of main pivot pins 694 and 695 (FIG. 32) are vertically mounted on the center plate 685 in spaced relation on the longitudinal axis of the first ply bed 633.

Another framework 698, having the shape of a parallelogram, is pivotally mounted on the main pivot pins 694 and 695 in parallel relation to the underframe 680. The framework 698 comprises a pair of equidistant side beams 699 and 700 held in parallel relation to the longitudinal axis of the horizontal bed 633 by a pair of equidistant end beams 701 and 702, and pivotally joined together in parallelogram forming relation by auxiliary pivot pins 703–706, which are movable in the arcuate slots 690–693, of the gusset plates 686–689. The end beams 701 and 702 are pivotally mounted on the main pivot pins 694 and 695, respectively, at points centrally disposed between auxiliary pivot pins 703 and 706, and 704 and 705. The guides 650 and 651, carrying the movable bed sections 634 and 635, are mounted axially on the side beams 699 and 700 of the framework 698, and remain in parallel relation with the longitudinal axis of the horizontal bed 633 when the angular disposition of the framework 698 is changed.

The mechanism 644 for adjusting the length of the horizontal bed 633, and the mechanisms 645 and 648 for moving the bed sections 634 and 635, act upon the main pivot pins 694 and 695 and, therefore, remain parallel to the longitudinal axis of the horizontal bed 633 at all times.

An electric motor 709 (FIGS. 31, 35 and 36) is mounted on an extension 710 of the gusset plate 689. The motor 709 is operatively connected to a drive screw 711, which is journalled for rotation in spaced pillow blocks 712 and 713. An actuator 714 threadably engages the drive screw 711 and drivingly engages the bifurcated ends 715 and 716 of pivot arm 717 acting against the auxiliary pivot pin 706 at the juncture of the side beam 699 and end beam 701 of the framework 698.

The motor 709 is operated to rotate the drive screw 711 and move the actuator 714 to drive the pivot arm 717. The pivot arm 717 acts against the auxiliary pivot pin 706 to change the angular disposition of the framework 698 which carries the guides 650 and 651 on which the movable bed sections 634 and 635 are mounted. When the guides 650 and 651 move, the angular disposition of the movable bed sections 634 and 635 is correspondingly changed.

A pair of limit switches 718 and 719 are disposed in spaced relation adjacent the drive screw 711 for engaging the pivot arm 717 to sense the arcuate position of the auxiliary pivot pin 706 in the slot 693. Another pair of limit switches 720 and 721 (FIG. 31), are disposed in spaced relation for engaging a projecting plate 722 carried by the piston rod 180 of the air cylinder 175 to sense the axial movement of the movable bed sections 634 and 635.

Ply cutter assembly

Referring generally to FIGS. 37–43 and more particularly to FIGS. 37–38, the cutter assembly 636 comprises a cutter 725, which is mounted for unitary movement with a rotatable support 726 and a trailing conveyor 727 over which the first ply moves to the horizontal bed 633.

A set of guide rails 728–730 are mounted on the 1-PLY stationary frame 640 in parallel relation below the bed 633. A cable car 731 is mounted for movement along the guide rails 728–730 by any suitable means, e.g. angularly disposed chain connected rollers 732 and 733. The cable car 731 is secured to a cable 734 which is reeved around a set of drive pulleys 735 and 736 rotatably mounted in spaced relation on the stationary frame 640. The cable 734 is secured to opposing faces of a piston reciprocable in the air cylinder 737 for operating the cable car 731.

A conveyor 727 comprises a solid table top 738 mounted on the cable car 731. A pair of brackets 740 and 741 extend from opposing sides 742 and 743 of the cable car 731. A pair of link chains 744 and 745 are secured to the outstanding brackets 740 and 741 and reeved around a set of sprocket wheels 746 which are rotatably mounted in rectangular relation on the stationary frame 640 adjacent the opposing sides 742 and 743 of the cable car 731. A plurality of similar rollers 747 are mounted in spaced relation between the link chains 744 and 745 and form a roller conveyor in trailing relation with the table top 738 mounted directly on the cable car 731.

The cutter 725 and support 726 are secured to a U-shaped cutter frame 750 which is pivotally mounted on a vertical center pin 751 carried by the cable car 731, to angularly adjust the cutter 725 and support 726 to corresponding movement of the bed sections 634 and 635. The cutter frame 750 is locked in angular position by any suitable means. For example, an air cylinder 752 carried by the cutter frame 750, is provided for operating a lock nut 753, which is normally slidable in an arcuate slot 754 formed in a bracket 755 secured to a platform extension 756 carried by the cable car 731 (FIGS. 37 and 39).

The 1-PLY support 726 (FIG. 40) comprises a counter top 758 which overlaps the table top 738 carried by the cable car 731. A blower manifold 759 and a vacuum manifold 760 are mounted in side-by-side relation on the counter top 758. The vacuum manifold 760, includes an enclosed air passageway 761 and communicating air holes 762 adjacent the leading marginal edge 763 of the counter top 758. The blower manifold 759 comprises a channel 764 disposed in sealed relation against the vacuum manifold 760, forming an air chamber 765. A plurality of aligned air jets 766 are disposed in the channel 764 in communicating relation with the air chamber 765. The blower and vacuum manifolds 759 and 760 are connected to an air hose and pump (not shown).

The cutter 725 (FIGS. 39–40) comprises a guide 767 mounted between the opposing sides 768 and 769 of the cutter frame 750. A housing 770 is suspended from the guide 767, and mounted on a set of rollers 771 and 772 which are movable along a pair of opposing guideways 773 and 774 formed in the guide 767.

An air cylinder 775 for moving the housing 770 across the 1-PLY support 726, is secured between the cutter frame sides 768 and 769 in parallel relation to the guide 767. A pair of drive pulleys 776 and 777 are rotatably mounted on the frame sides 768 and 769 adjacent the air cylinder 775. A cable 778 is reeved around the drive pulleys 776 and 777, and secured to opposing faces of a piston reciprocable in the air cylinder 775. The cable 778 is fastened to the housing 770.

A specially configured cutting blade 781 (FIGS. 39, 42–43) with a circular knife edge 782 and a blunted fabric-tearing edge 783, is rotatably suspended from the housing 770. The cutting blade 781 carries a lug 784, which is movable in an arcuate slot 785 formed in the housing 770 to limit the rotation of the cutting blade 781 between the knife edge 782 and blunted edge 783. An air cylinder 786 is coupled to the cutting blade 781 for raising and lowering the blade 781 into and out of engagement with first ply material.

A support block 787 (FIGS. 39–40) is mounted on the guide 767 adjacent the housing 770. A foot or clamp 788 is rotatably mounted on a bracket 789 suspended from the support block 787. The clamp 788 comprises a pair of spaced elongated fingers 790 and 791 extending beyond the cutting blade 781. The cutting blade 781 rests in a slot 792 formed between the fingers 790 and 791, and means (not shown) may be included for heating the blade. An air cylinder 793 is coupled to the clamp 788 in spaced relation from the bracket 789, to rotate the fingers 790 and 791 into and out of clamping engagement with an adjacent edge of first ply material positioned on the cutter assembly 636.

Mechanism for adjusting lateral position of ply cutter

A drive shaft 795 with threaded ends 796 and 797 is mounted in parallel spaced relation adjacent the guide member 767 and is journalled for rotation in a set of brackets 798–800. A driver 801 is threadably mounted on the drive shaft end 796. The driver 801 carries a limit switch 802 for engaging the housing 770 to sense its lateral position on the 1-PLY support 726 adjacent the cutter frame side 769.

A mover 803 is threadably mounted on the other drive shaft end 797. The mover 803 carries a gear rack 804 whose free end 805 is movably supported in guide bracket 806 suspended from a platform 807 secured to the guide 767. A spur gear 808 is rotatably mounted on the platform 807 adjacent the guide bracket 806 for rolling engagement with the gear rack 804, the spur gear 808 being driven or rotated by the gear rack 804 as it moves in unison with the mover 803. The spur gear 808 is operatively connected to a potentiometer 809 for sensing the lateral position of the housing 770.

The housing 770 and support block 787 are also coupled to the threaded end 797 of the drive shaft 795 for movement therealong in response to rotation of the drive shaft 795. A limit switch 810 is positionable with the housing 770 for sensing the lateral position of the housing 770 adjacent the cutter frame side 768. An electric motor 811 is connected by engaged, meshing gears 812 and 813 to the drive shaft 795 for operating or rotating it to laterally adjust the position of the cutting blade 781 for different widths of first ply material.

The angular disposition of the cutter frame 750 is simultaneously adjusted when the angular disposition of the movable bed sections 634 and 635 is changed. The cutter frame 750 is moved into compressive abutting engagement with the adjacent movable bed section 634. The locking cylinder 752 is actuated to release the locking nut 753 within the slots 754. The motor 709 is then operated to change the angular disposition of the movable bed sections 634 and 635. The cutter frame 750 being in compressed relation against the movable bed section 634, correspondingly moves to the new angular position. The locking cylinder 752 then is released to lock the nut 753 in the slot 754.

A set of limit switches 815 and 816 are positioned on the frame 640 for sensing the axial position of the cutter assembly 636 relative to the horizontal bed 633. The set of limit switches 815 are similarly used to slow down and stop the cutter assembly 636.

Ply transfer unit

The first ply transfer unit 638 (FIGS. 44–46) comprises a carriage 820 mounted on pairs 821–823 of angularly disposed chain connected rollers 824 and 825, which are movable along the guide rods 128 and 129 of the table frame 640. A drive shaft 826 is journalled for rotation in a set of pillow blocks 827–829 carried by the carriage 820. A pair of pinions 830 and 831 are keyed to the drive shaft 826 for rolling engagement along the gear racks 126 and 127 of the table frame 640. An electric motor 832 is mounted on the carriage 820 and connected by pulleys 833 and 834 and belt 835 to the drive shaft 826 for operating the carriage 820 along its trackway.

A manifold assembly 836 is mounted on the carriage 820 for picking up the ply material. The assembly 836 comprises a center vacuum manifold 837, wing vacuum manifolds 838 and 839, and a mechanism 840 for adjusting the lateral position of the wing manifolds 838 and 839 relative to the center manifold 837, to compensate for different widths of ply material.

The mechanism 840 for adjusting the position of the wing manifolds 838 and 839 comprises a pair of parallel guide rods 841 and 842 on which the wing manifolds 838 and 839 are slidably mounted. A drive screw 843 is centrally disposed between the guide rods 841 and 842 and coupled to the wing manifolds 838 and 839. An electric motor 844 is operatively connected to the drive screw 843 for moving the wing manifolds 838 and 839 axially towards and away from the center manifold 837.

The manifold assembly 836 is rotatably mounted in suspended relation from support plate 845 (FIG. 46), which, in turn, is mounted for limited rotation around a pivot pin 846 to angularly position the manifolds 837–839. The pivot pin 846 is carried by a gusset plate 847 secured to the carriage 820.

An air cylinder 850 is mounted on the support plate 845 and coupled by linkage 851 to the manifold assembly 836 for rotating the manifolds 837–839 about the longitudinal axis of the rear guide rod 841.

A vertical pivot arm 852 is secured to the support plate 845 adjacent its end farthest from the pivot pin 846. The pivot arm 852 is movable in an arcuate slot 853 formed in the gusset plate 847. The pivot arm 852 includes a pair of bifurcated levers 854 and 855 for engaging a driver 856 threadably mounted on a drive screw 857 journalled for rotation in a set of pillow blocks 858 and 859 secured to the carriage 820. An electric motor 860 is operatively connected to the drive screw 857 for rotating the pivot arm 852 to angularly position the vacuum manifolds 837–839. A mechanism, e.g. reducer 864 and potentiometer 865, are coupled to the drive screw 857 for sensing the angular position of the vacuum manifolds 837–839. A similar sensing mechanism, including a potentiometer 866 and reducer 867, are coupled to the drive screw 843 for sensing the lateral position of the wing manifolds 838–839 relative to the center manifold 837.

The vacuum manifolds 837–839 are connected to an air hose and pump (not shown) for creating a vacuum to pick up the ply material. A plurality of limit switches similar to the magnetic switches for sensing the position of the IC transfer unit 113 can be used to sense the movement of the ply transfer unit 638 across the horizontal bed 633.

Ply drum transport unit

The first ply drum transport unit 639 (FIGS. 47–49) is similar to the IC drum transport unit 118, shown in FIGS. 27–29 and described in the paragraph entitled "Drum Transport Unit." The reader is referred to this particular paragraph for a general description of FIGS. 47–48. Like reference numerals are used in FIGS. 47–48 to identify corresponding parts, except for those parts already defined as part of the 1-PLY unit 102.

There are two notable differences between the 1-PLY drum transport unit 639 and the IC drum transport unit 118, which will be explained in the succeeding paragraphs.

A plurality of air cylinders 870–873 (FIG. 48) are vertically disposed on the crossbead 558 of the lower assemblies 542, for engaging the platforms 601 as they move into engagement with the air cushion springs 557. The air cylinders 870–873 and the fixed limit stops 874–875 act to serve as travel limit stops for the downward travel of the platforms. A plurality of cylinders and fixed limit stops are required to provide separate stops for 13″, 14″ and 15″ bead size drums. Stops are only used when drum is positioned in an area where, because of the angle of the ply, the bed unit is open. The air cushion springs 557 are adjusted to maintain the force exerted by the tire building drum 119 against the first ply at about 100 lbs.

A cushion roller 876 is carried by each drum head 600 for rolling engagement with the material extending beyond the ends of the building drum 119, as the building drum 119 rolls across the bed 633 to pick up new tire building material. The description of the cushion rollers will be given in relation to cushion roller 876, since both rollers are operated in unison and in the same manner.

The cushion roller 876 is rotatably mounted on a lever arm 877, which is rotatably mounted on the bifurcated end 878 of a guide block 879. The guide block 879 is slidably mounted on a pair of parallel guide rods 880 and 881, which are mounted between guide brackets 882 and 883 secured to the cross beam 540. A slidable stop 884 is keyed into guide bracket 883 to prevent its rotation. The stop is threadably mounted on the adjacent end 885 of a drive shaft 886. The drive shaft 886 is journalled for rotation in a set of pillow blocks 887 and 888. An electric motor 890 is connected by a pair of sprocket wheels 891 and 892 and chain belt 893 to a drive shaft 886 for laterally positioning the slidable stop 884. A mechanism, e.g. potentiometer 894 and reduced 895, is coupled to the drive shaft 886 for sensing the lateral position of the slidable stop 884 on the guide rods 880 and 881. The slidable stop 884 acts as a movable stop for striking engagement with the guide block 879.

An elongated air cylinder 896 is coupled to the guide block 879 for reciprocating it along the guide rods 880 and 881, between the fixed guide 882 and slidable stop 884. A limit switch 897 is mounted on the fixed guide bracket 882 for engaging an angle bar 898 carried by the guide block 879 to sense the farthest lateral position of the roller 876 from the building drum 119.

The cushion roller 876 carries a rotatable guide wheel 899 which is positionable in a recess 900 formed in the inner periphery 901 of the building drum 119 adjacent the drum end 902. An air cylinder 903 (FIG. 48) rotatably mounted on the guide block 879 is coupled to the lever arm 877 intermediate its extremities for rotating the cushion roller 876 into and out of its material engaging position. A limit switch 904 is positioned for engaging the air cylinder 903 to sense the arcuate position of the lever arm 877.

Ply feed means

The feed means 637 (FIGS. 3, 50–53) comprises a compensator unit 910 for holding free loops of ply material adjacent the cutter assembly 636. A conveyor 911 is provided for moving a continuous sheet of ply material with properly oriented reinforcing chords, to the compensator unit 910 for looped storage.

The compensator unit 910 (FIGS. 50–51) comprises a pair of vertical A-frames 912 and 913 held in parallel relation by cross beams 914 and a shaft 915, which is mounted in brackets 916 and 917 secured to the A-frames 912 and 913. A guide roller 918 is mounted on the shaft 915 intermediate the brackets 916 and 917. A drive screw 919 is journalled for rotation in pillow blocks 920 and 921 mounted on the A-frames 912 and 913. An electric motor 922 is mounted on the A-frame 913 and coupled to the drive screw 919 for rotating it. A pair of guide blocks 923 and 924 are threadably mounted on the drive screw 919 between the pillow blocks 920 and 921. A set of guide plates 925 and 926 are carried by the guide blocks 923 and 924 for positioning the loops of ply material on the compensator unit 910. The guide plates 925 and 926 are mounted on casters 927 for rolling support on the compensator unit 910.

A mechanism, e.g. potentiometer 928 and reducer 929 is coupled to the drive screw 919 for sensing the position of the guide plates 925 and 926 on the drive screw 919.

A pair of electric eyes 930 are used for sensing the loop of ply material $P_1$ on the compensator unit 910.

SERIES 700 MATERIAL HANDLING ASSEMBLY

The MH unit 107 (FIGS. 3, 52–53) comprises a storage device 933 for holding at least two rolls of ply material in fabric wrapping to permit replacement of a depleted roll without disrupting operation of the unit. An overhead conveyor 934 is disposed in surmounted relation to the floor conveyors 911 for carrying ply material from the storage device 933. A cutter 935 is disposed above the overhead conveyor 934 for bias cutting predetermined lengths of ply material for deflection into a pair of oppositely disposed chutes 936 and 937, which diverge toward the parallel floor conveyors 911 leading to the 1-PLY unit 102 and 2-PLY unit 103.

A structural frame 938 is positioned adjacent each floor conveyor 911. A set of electric eyes 939 and 940 are disposed on the frame 938 for sensing ply material on the chutes 936 and 937. A pair of light projectors 941 and 942 are mounted on the frame 938 for transmitting a pair of parallel light lines on the floor conveyors 911. An operator at the floor conveyor 911, takes the ply material from the chutes 936 and 937 and splices them together on the conveyors 911 into continuous sheets of first and second ply material with properly oriented cords. It is important that none of the splices fall within the projected light lines, since it is predetermined that the ply material will be cut on the bias by the cutter assemblies 636 somewhere between these two lines.

As previously indicated, the cutter tears rather than cuts the ply material on the bias. It is necessary that only one layer of ply material falls into position for cutting or tearing by the cutter assembly 636. If the splice falls within the light lines, the operator will recut the preceding piece by hand to reposition the splice from between the light lines. The light projectors 941 and 942 are adjustable along a drive screw 943 which is hand operated.

The diverging chutes 936 and 937 are mounted on a table frame 944. The chutes 936 and 937 are secured at their upper marginal edges, to a plate 945 which is coextensive with the width of the chutes 936 and 937. A couple of tubes 946 and 947 with air holes are secured to the plate 945 and are attached to an air pump for sending a stream of air down the surfaces of the chutes 936 and 937. A set of similar air tubes 948 and 949 are provided near the bottom edges 950 and 951 of the chutes 936 and 937 to strengthen the air stream, such that the ply material will slide down the chutes on a cushion of air.

A deflector or baffle 952 is secured to a rotatable pivot rod 953 spanning the chutes 936 and 937. The deflector 952 is provided with curved ends 954 and 955 extending on either side of the pivot rod 953. An air cylinder 956 is provided for rotating the deflector 952 into and out of engagement with a shield 957 mounted adjacent the head roller 958 of the overhead conveyor 934, in ply material receiving relation to the conveyor 934. When the deflector 952 engages the shield 957 as shown in heavy line, the ply material passes over the topside 959 of the deflector 952 and is deflected down the chute 937. When the deflector 952 is disengaged from the shield 957 as shown in the dotted position, the ply material engages the underside 960 of the deflector 952 and is deflected down the other chute 936. A pair of hand cranks 961 and 962 are used to adjust the lateral position of the bottom edges 950 and 951 of the chutes 936 and 937. The ply material, as it moves down the chutes 936 and 937, is in proper cord oriented relation for splicing to the continuous sheets of first and second ply material already formed on the conveyors 911. The action of the ply material as it is reversely directed down the chute 936 is tantamount to taking a piece of ply material from the chute 937 and flipping it over on its reverse side, which is literally what must be done to properly orient the two plies.

SERIES 400 TURRET ASSEMBLY

The BA unit 104 (FIGS. 54–55) comprises a pair of turret frames 970 and 971 in spaced relation from the 2-PLY unit 103. The building drums 119 are held between the turret frames 970 and 971 in a plurality of arcuately spaced positions, or at Station A where a strip of tread cushion is applied over the second ply material and the plies are stitched and at Station B where the beads are set.

A drive shaft 972 is journalled for rotation between the turret frames 970 and 971. A conventionally designed hydraulic motor assembly, generally indicated at 973, is provided for rotating the drive shaft 972 in either direction. A pair of drum movers 974 and 975 are keyed to the drive shaft 972 in parallel relation for unitary movement with the drive shaft 972 to rotate the building drums 119 between the different stations of the BA unit 104. The description of the drum movers 974 and 975 will be given in relation to drum mover 975, since both units are similar and operate in unison.

Turret frame and arms

The drum mover 975 (FIG. 54) comprises a turret arm frame 976 with a plurality of outstanding turret arms 977–979. The turret arms 977–979 are in predetermined arcuate spaced relation corresponding to the arcuate spacing between the different stations of the BA unit 104. The following description of the turret arms will be given in relation to turret arm 977, since all of them are similar.

The turret arm 977 (FIGS. 56–57) comprises a pair of oppositely disposed fingers 980 and 981 which are movable into and out of mating, clasping engagement with the shaft 607 of a building drum 119, and more particularly into a circular recess 982 formed in the drum shaft 607. The fingers 980 and 981 are rotatably mounted on the outstanding end 983 of the turret arm 977. A pair of link arms 984 and 985 are coupled to the fingers 980 and 981 intermediate their extremities to rotate them into and out of engagement with the drum shaft 607. The link arms 984 and 985 are pivotally mounted on a pin 986 carried by a guide block 987, which is reciprocable in an elongated axial slot 988 formed in the turret arm 977.

A collar 989 is mounted for rotation about the drive shaft 972 adjacent the turret arm frame 976. A plurality of similar brackets 990 are secured to the collar 989 in arcuate spaced relation to the arcuate spacing of the turret arms 977–979. A connecting link 991 is pivotally mounted on the pivot pins 986 and 992 carried by the guide block 987 and collar bracket 990. And air cylinder 993 is rotatably mounted on the outstanding plate 994 of the turret arm frame 976 and coupled to the pivot pin 992 of the collar bracket 990 for rotating the collar 989 to operate the fingers 980 and 981.

A pair of overhead drum-rests 995 are positioned on the turret frames 970 and 971 for receiving building drums 119 from the 2-PLY unit 103 and the DT unit 106. The turret arms 977 and 979 are in aligned vertical relation when the turret arm frame 976 is in its rest position.

Providing other operating conditions of the BA unit 104 are satisfied, the turret arm frames 976 are rotated in unison to position the turret arms 977 for grabbing the shaft 607 of a building drum 119 positioned in the drum rests 995, turret arms 978 for grabbing the shaft 607 of a drum lid in unit A, and turret arms 975 for grabbing the shaft 607 of a drum 119 in unit B. The turret arm frames 976 are then rotated in the opposite direction to position the turret arms 977, 978 and 975 for depositing the building drums 119 at the Stations A, B and in position for pickup by arms 1604, respectively. When in position, units A, B and arms 1604 engage drums and fingers 980–981 release drums 119. The turret arm frames 976 are then rotated back to their rest positions.

Drum support and rotating mechanism at first station

A motor assembly 1000 and a socket assembly 1001 are disposed in aligned relation on the turret frames 970 and 971 for engaging the drum shaft 607 and supporting the building drum 119 at the first Station A.

The socket assembly 1001 comprises an elongated bushing 1002 for guiding and supporting an axle 1003 movable therethrough. A pair of air cylinders 1004 and 1005 are coupled to the axle 1003 for moving it axially through the bushing 1002. A socket 1006 is rotatably mounted on the axle 1003 for matingly engaging the adjacent end 606 (FIG. 47) of the drum shaft 607. A pair of limit switches 1007 and 1008 are provided for sensing the lateral movement or travel of the axle 1003.

The motor assembly 1000 comprises a platform 1009 which is slidably mounted on a pair of parallel guides 1010 secured to the turret frame 970. An air cylinder 1011 is coupled to the platform 1009 for moving it along the guides 1010 in a direction towards the socket assembly 1001. A limit switch 1012 is positioned for engaging an angle bar 1013 carried by the platform 1009 to sense the lateral position or travel of the motor assembly 1000 relative to the building drum 119. A movable drive shaft and collet assembly 1014 is mounted on the platform 1009 for supporting and driving engagement with the adjacent end 606 of the drum shaft 607. An electric motor 1015 is coupled to the assembly 1014 for operating or rotating the building drum 119 at the Station A.

Ply stitcher

A ply stitcher 1018 (FIGS. 54–55) is disposed between the turret frames 970 and 971 adjacent the building drum 119 positioned in the first Station A. The ply stitcher 1018 comprises a base 1019 secured between the turret frames 970 and 971. A drive screw 1020 is mounted on the base 1019 between a pair of parallel guide rods 1021 and 1022. An electric motor 1023 is mounted on the base 1019 and coupled to the drive screw 1020 for rotating it. A pair of guide blocks 1024 and 1025 are slidably mounted on the guide rods 1021 and 1022 and threadably engaged with the drive screw 1020 for transverse movement along the guide rods 1021 and 1022 in response to the rotation of the drive screw 1020.

A pair of stitch rollers 1026 and 1027 are each rotatably mounted on a couple of jack-knifing link arms 1028 and 1029, which are rotatably mounted on the guide blocks 1024 and 1025. A pair of air cylinders 1030 and 1031 are coupled between the stitch rollers 1026 and 1027 and guide blocks 1024 and 1025 for operating or moving the stitch rollers 1026 and 1027 into stitching engagement with the material wrapped on the rotating building drum 119. The stitch rollers 1026 and 1027 are in abutting side-by-side relation shown in dotted line, when they first engage the ply material. The motor 1023 is operated to move the stitch rollers 1026 and 1027 transversely across the ply material wrapped on the rotating building drum 119. A limit switch 1032 and engaging plate 1033 are carried by the guide blocks 1024 and 1025 for sensing when the stitch rollers 1026 and 1027 are in abutting side-by-side relation. The guide block 1024 also carries another limit switch 1034 for engaging an adjustable plate 1035 for sensing when the stitch rollers 1026 and 1027 are in farthest spaced relation.

Tread cushion applicator

A tread cushion applicator 1040 (FIGS. 55, 58–59) is provided for applying a strip of tread cushion over the ply material wrapped on the building drum 119 at the first Station A. The tread cushion applicator 1040 comprises a framework 1041 secured between the turret frames 970 and 971. A drum mount 1042 is slidably mounted on a pair of guide rails 1043 disposed between brackets 1044 and 1045 secured in spaced relation to an outstanding leg 1046 of the framework 1041. An air cylinder 1047 is coupled to the drum mount 1042 between the guide bushings 1043 for moving the drum mount 1042 towards the building drum 119 positioned at the first Station A. A pair of shock absorbers 1048 and 1049 are carried by the drum mount 1042 for engaging the brackets 1044 and 1045 to slow down the drum mount 1042 as it approaches the brackets 1044 and 1045.

An applicator drum 1050 is mounted on the drum mount 1042 for rotation about its longitudinal axis which parallels the longitudinal axis of the building drum 119. A predetermined length of tread cushion material is applied on the applicator drum 1050 prior to the positioning of the building drum 119 at the first Station A. The applicator drum 1050 with the tread cushion material is then moved into rolling engagement with the adjacent building drum 119 to transfer the tread cushion to the ply material wrapped on the building drum 119. The ply stitcher 1018 is then actuated to stitch the material on the building drum 119.

The applicator drum 1050 comprises a cylindrical portion 1051 with a vacuum manifold 1052 adjacent its leading marginal edge 1053 and a cylindrical segment 1054 with a vacuum manifold 1055 adjacent its trailing marginal edge 1056. The drum segment 1054 is arcuately adjustable relative to the drum portion 1051 for varying the circumfirential distance between the vacuum manifolds 1052 and 1055 to accommodate different lengths of tread cushion for different sized building drums. Any suitable mechanism, e.g. rack 1057 and pinion 1058, can be used to arcuately adjust the drum segment 1054.

The vacuum manifolds 1052 and 1055 are connected to air hoses and pumps (not shown) for creating a vacuum along the leading and trailing marginal edges 1053 and 1056 to hold the tread cushion on the applicator drum 1050 until it is transferred to the building drum 119.

An air cylinder 1060 is provided for locking the applicator drum 1050 in position for receiving the tread cushion adjacent the vacuum manifold 1052. A set of limit switches 1061 are provided to sense the arcuate position of the applicator drum 1050. A limit switch 1062 is mounted on the outer periphery of the applicator drum 1050 in predetermined relation between the leading and trailing marginal edges 1053 and 1056 for sensing the transfer of tread cushion to the ply material. An electric motor 1063 is secured to the drum mount 1042 and operatively connected to the applicator drum 1050 for operating or rotating the drum 1050 about its axis. A mechanism 1064 is associated with the applicator drum 1050 for sensing its arcuate position for receiving tread cushion, the cutting of said cushion to length, and the transfer of the tread cushion to the building drum 119.

A feed table 1065 is rotatably mounted between upstanding frame sides 1066 and 1067 (FIG. 58). A feed roller 1068 is rotatably mounted adjacent the trailing edge 1069 of the feed table 1065. A pair of adjustable link arms 1070 are used to position the leading edge 1071 of the feed table 1065 in close proximity to the applicator drum 1050. A drive screw 1072 is journalled for rotation above the feed table 1065. A pair of elongated guides 1073 and 1074 are threadably mounted on the drive screw 1072. A hand crank 1075 is provided for rotating the drive screw 1072 to adjust the distance between the guides 1073 and 1074 to accommodate different widths of tread cushion as it moves over the feed table 1065 from a free loop L of tread cushion formed adjacent the feed table 1065.

A vacuum manifold 1080 (FIG. 59) with attached air hose 1081 and pump (not shown) is provided for holding the leading edge of the continuous sheet of tread cushion and moving it into engaged relation with the vacuum manifold 1052 at the leading edge 1053 of the applicator drum 1050. At least one air cylinder 1082 is coupled by pairs of connecting pivot arms 1083 and 1084 to the vacuum manifold 1080 for rotating it into close proximity with the applicator drum 1050 to transfer the leading edge of tread cushion to the drum 1050. A set of limit switches 1085 and 1086 are positioned for engaging a plate 1087 carried by the pivot arm 1084 to sense the arcuate position of the vacuum manifold 1080 relative to the applicator drum 1050.

A cutter assembly 1090 is provided for cutting the continuous sheet of tread cushion after a predetermined length of the tread cushion has been wrapped on the applicator drum 1050. The cutter assembly 1090 comprises a cutter 1091 which is mounted for movement along a guide rail 1092 spanning the feed table 1065 and applicator drum 1050. An elongated air cylinder 1093 is surmounted in spanning relation over the feed table 1065 in parallel relation to the guide rail 1092. A pair of guide pulleys 1094 and 1095 are rotatably mounted at either end of the air cylinder 1093. A cable 1096 is reeved around the guide pulleys 1094 and 1095 and fastened to opposing faces of a piston reciprocable in the air cylinder 1093. The cable 1096 is secured to the cutter 1091 and drives or moves it along the guide rail 1092 when the air cylinder 1093 is operated.

A circular blade 1097 is rotatably suspended from the cutter 1091. An air cylinder 1098, associated with the cutter 1091, is coupled to the cutter blade 1097 for moving it into cutting engagement with a strip of tread cushion adjacent the trailing edge 1056 of the applicator drum 1050. A limit switch 1099 is positioned for engaging an angle bar 1100 carried by the cutting blade 1097 to sense the vertical position of the blade 1097 relative to the applicator drum 1050. A set of limit switches 1101 and 1102 are positioned adjacent ends of the air cylinder 1093 for engaging the cutter 1091 to sense its position on the guide rail 1092.

Tread cushion letoff

A tread cushion letoff 1105 (FIGS. 60–61) is provided for supplying a continuous sheet of tread cushion to the tread cushion applicator 1040. The tread cushion letoff 1105 comprises a storage unit 1106 for holding at least two rolls of tread cushion in fabric wrapping, and a horizontally disposed overhead conveyor 1107 for moving the sheet of tread cushion from the storage unit 1106 to the tread cushion applicator 1040. A drive pulley 1108 is coupled to the rear roller 1109 of the overhead conveyor 1107. An electric motor 1110 is connected to the drive pulley 1108 for operating the overhead conveyor 1107.

The storage unit 1106 comprises a vertical frame 1111 on which are mounted at least two rolls R and $R_1$ of tread cushion in fabric wrapping to give an operator time to replace a depleted roll without shutting down operation of the tread cushion applicator 1040. The upper roll $R_1$ is rotatably mounted on a pair 1112 of support brackets 1113 secured to the letoff frame 1111. The tread cushion and fabric wrapping TW is reeved around a roller tensioning device 1114 and drive roller 1115 where the tread cushion is separated from the fabric wrapping W. The tread cushion T is reeved around a couple of staggered guide rollers 1116 and 1117 for movement onto the conveyor 1107.

The fabric wrapping W is reeved around a set of drive rollers 1115, and 1118 and 1119 and wrapped on a roller 1120 rotatably mounted between a pair 1121 of support brackets 1122 secured to the letoff frame 1111. An electric motor 1123 is connected to the drive rollers 1115, 1118–1120 for operating or rotating them to feed tread cushion to the overhead conveyor 1107 and applicator 1040.

The lower roll R of tread cushion and fabric wrapping is rotatably mounted on a pair 1125 of support brackets 1126 secured to the letoff frame 1111. The tread cushion and fabric wrapping $T_1W_1$ is reeved around a roller tensioning device 1127 and drive roller 1128 where the thread cushion $T_1$ is separated from the fabric wrapping $W_1$. The fabric wrapping $W_1$ is reeved around a set of drive rollers 1129 and 1130 and wrapped on a roller 1131 mounted on a pair 1132 of support brackets 1133 secured to the letoff frame 1111. An electric motor 1134 is connected to the drive rollers 1128–1131 for operating or rotating them to move the tread cushion and fabric wrapping $T_1$ and $W_1$ from the lower roll R. The tread cushion $T_1$ is reeved on guide rollers 1135 and 1136 for movement to the overhead conveyor 1107. The tread cushion of the alternate roll is reeved on the rollers for immediate splicing with the trailing edge of a depleted roll of tread cushion.

Bead setting mechanism

Figure 54:
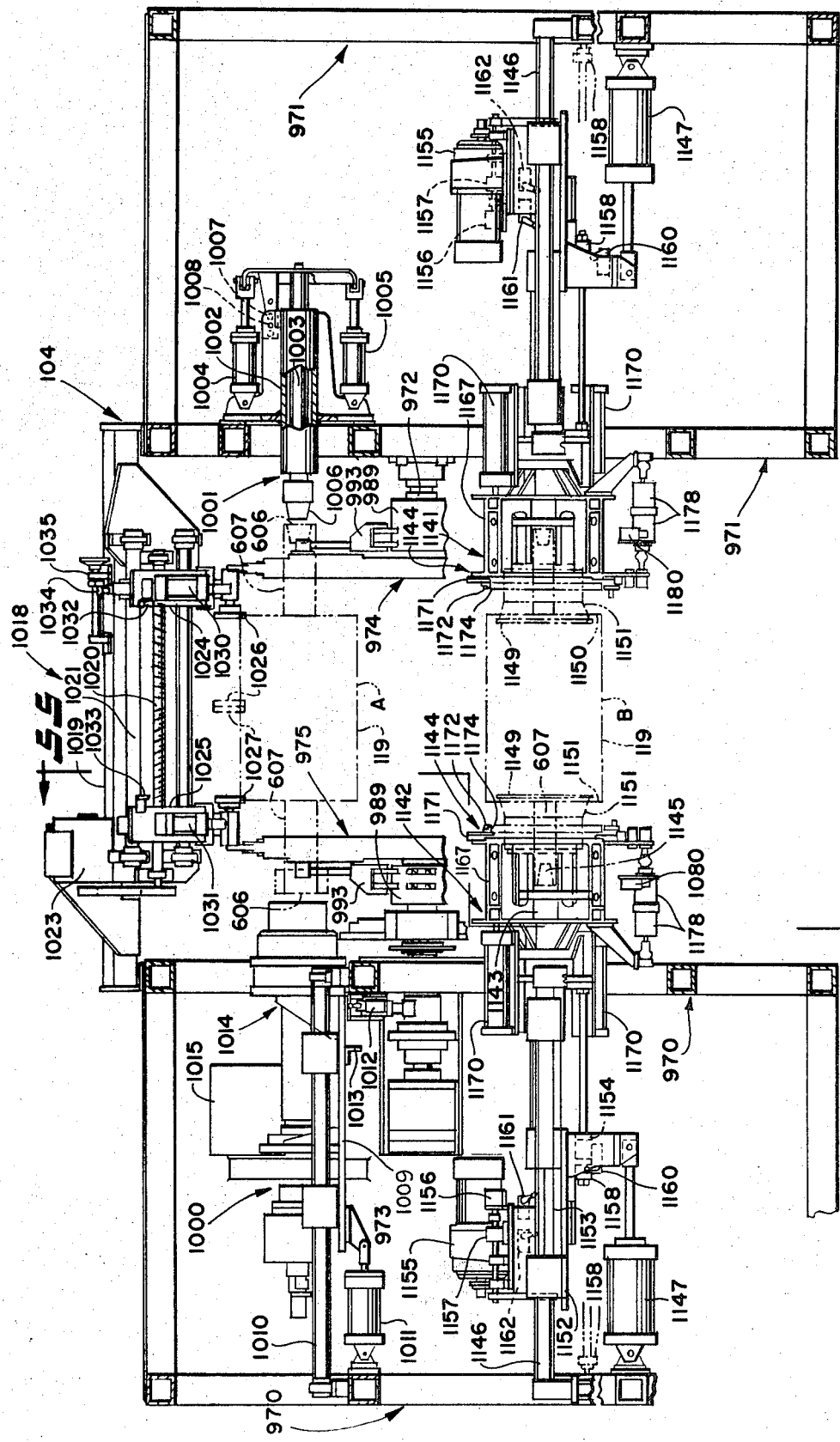
FIG. 54 is a side view of the first turret assembly for stitching plies, setting beads, and applying tread cushion.
Figure 55:
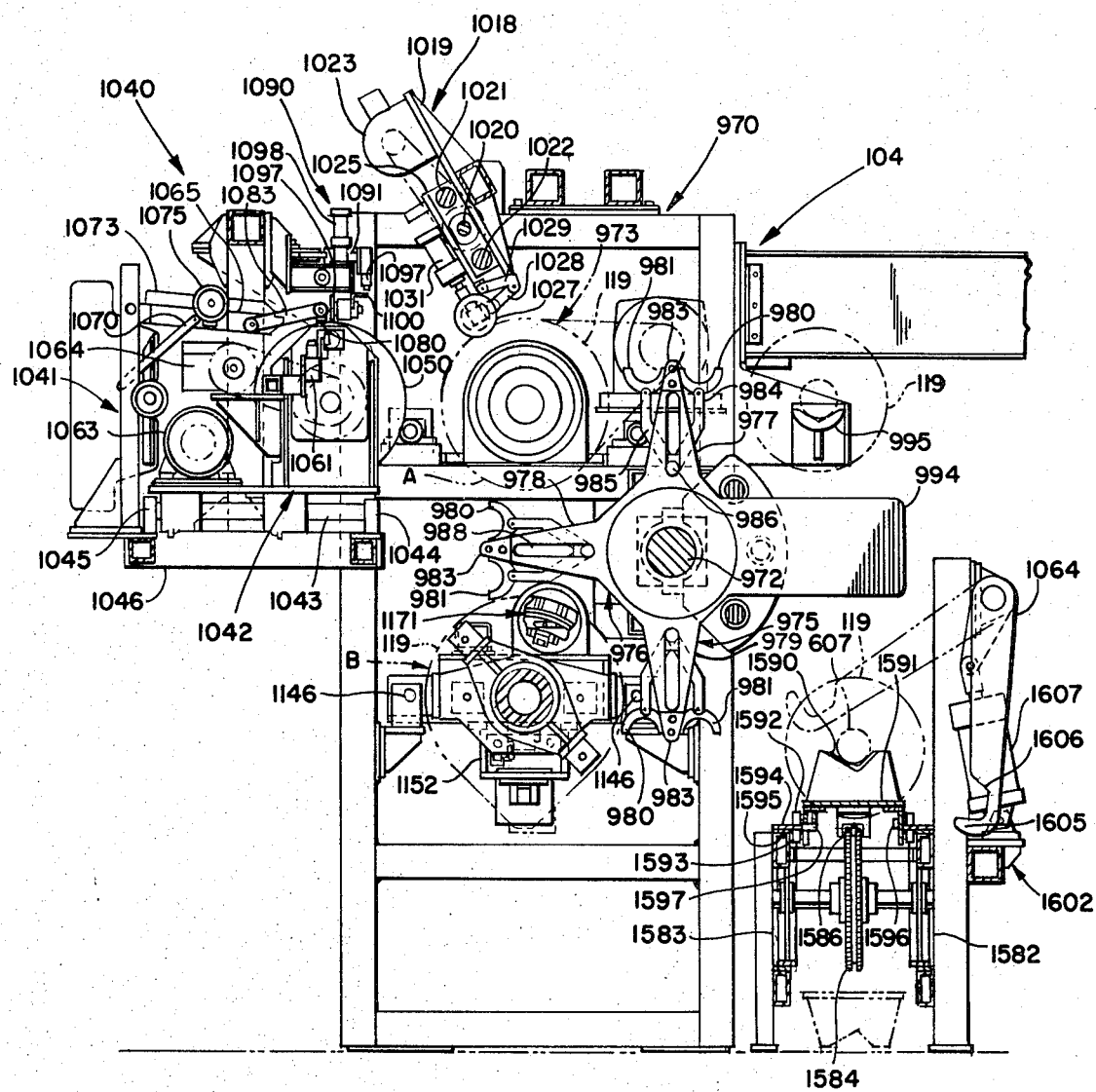
FIG. 55 is a section view from the line 55—55 of FIG. 54.

After the tread cushion is applied and the plies are stitched, the building drum 119 is ready for removal to the second Station B (FIG. 54). At this station, the ply material extending beyond the ends of the building drum 119 is crimped or turned down to receive a pair of beads. After the beads are positioned on the tire carcass the turned down material is reversely folded back over the beads into engaged relation with the outer ply material to firmly set the beads in position. The mechanism for performing the above operations is generally indicated at 1140 (FIG. 54).

The bead setting mechanism 1140 (FIGS. 54 and 62) comprises a pair of similar aligned units 1141 and 1142 for working on adjacent ends of the tire carcass wrapped on the building drum 119. Each of the bead working units 1141 and 1142 comprises a socket 1143 which is movable into mating engaged relation with the adjacent end of the drum shaft 607 for supporting the building drum 119 at Station B.

A combination plydown and bladder turnup assembly 1144 is movable with the socket 1143 to a position adjacent the drum 119 for working on the adjacent end of the tire carcass. The plydown and bladder assembly 1144 is further spaced from the building drum 119 than the exposed end 1145 of the socket 1143, even when the socket 1143 is supportingly engaged with the drum shaft 607.

The socket 1143 and plydown and bladder turnup assembly 1144 are guideably mounted on a pair of rails 1146 secured in parallel relation on the turret frame 970. An air cylinder 1147 is provided for moving the socket 1143 and plydown bladder assembly 1144 along the guide rails 1146. A pair of air cylinders 1148 are furnished for moving the plydown and bladder turnup assembly 1144 relative to the socket 1143 and to a position where the leading edge 1149 of the assembly 1144 extends about ¾ of an inch inside the adjacent rim 1150 of the building drum 119. This is important to properly position the inflatable bladder 1151 for engaging the turned-down ply material.

The movement of the plydown and bladder turnup assembly 1144 is adjustable to accommodate different drums by regulating the axial position of the assembly 1144 prior to actuating the operating air cylinders 1148.

The operating air cylinder 1147 is coupled to a support platform 1152 which is movable along the guide rails 1146. A drive screw 1153 is mounted for rotation on the platform 1152. A shock absorber 1154 is slidably mounted on the platform and threadably engaged with the drive screw 1153. An electric motor 1155 is connected to the drive screw 1153 for operating or moving the shock absorber 1154 axially on the drive screw 1153 to adjust its position relative to the assembly 1144. A mechanism, e.g. potentiometer 1156 and reducer 1157, are coupled to the drive screw 1153 for sensing the axial position of the shock absorber 1154. The plydown and bladder turnup assembly 1144 carries a bumper 1158 in fixed relation to the end 1149 of the assembly 1144 adjacent the building drum 119. The bumper 1158 engages the shock absorber 1154 to limit the axial movement or travel of the plydown and bladder assembly 1144 relative to the socket 1143 and adjacent building drum 119.

A limit switch 1160 is carried by the shock absorber 1154 to sense the engagement between the bumper 1158 and shock absorber 1154. A set of limit switches 1161 and 1162 are carried by the platform 1152 for sensing the axial position of the shock absorber 1154 on the drive screw 1153.

A number of plydown fingers 1165 are rotatably mounted in cone-forming relation on a circular frame 1166 slidably mounted on the plydown and bladder assembly 1144. The finger frame 1166 is movable relative to a surrounding housing 1167 which is also slidably mounted on the assembly 1144. An air cylinder (not shown) is used to operate the finger frame 1166 for moving the plydown fingers 1165 into expanded, surrounding relation over ply material extending beyond the rim 1150 of the drum 119. A stop is disposed on the assembly 1144 adjacent the bladder 1151 for engaging a mating stop 1169 carried by the finger frame 1166 to axially position the plydown fingers 1165 for engaging the ply material. A pair of air cylinders 1170 are coupled to the finger housing 1167 for moving it over the expanded plydown fingers 1165 to engage and rotate the fingers 1165 into crimping or turn down engagement with the ply material. The finger housing 1167 carries an expansible iris 1171 (FIGS. 63–64) holding a previously mounted circular bead 1172. The iris 1171 moves the bead 1172 over the turned down ply material and positions it on the adjacent end of the tire carcass. The plydown fingers 1165 and housing 1167 are retracted to their normal rest position on the assembly 1144 after the beads 1172 are placed on the tire carcass. The bladder 1151 is then inflated for folding the plydown material back over the bead 1172 to set it firmly in position on the tire carcass.

The expansible iris 1171 (FIGS. 63–64) comprises a plurality of fingers 1173 for holding the bead 1172. The bead fingers 1173 are slidably mounted on a circular frame 1174 for radial movement relative to the center point about which they are equally angularly spaced. The bead fingers 1173 are held in equally spaced radial distance from the center point by a collar 1175, which is mounted on the frame 1174 for rotation about the center point to move the bead fingers 1173 in unison relative to the frame 1174. The bead fingers 1173 each carry a pin 1176 which is engaged in a corresponding slot 1177 disposed in the collar 1175. The slots 1177 are angularly disposed to the radial axes along which the bead fingers 1173 move. An air cylinder 1178, for operating the bead chain 1179 to the collar 1175, for operating the bead fingers 1173 by rotating the collar 1175 and slots 1177 to drive the engaged pins 1176 and attached bead fingers 1173 towards or away from the center point depending on which direction the collar 1175 is rotated, to correspondingly disengage or engage the bead 1172. A limit switch 1180 is provided for sensing the arcuate position of the collar 1175 and corresponding radial position of the bead fingers 1173.

After the beads are set, the air cylinders 1148 are retracted to withdraw the plydown and bladder assemblies 1144 to their supported rest position behind the sockets 1143. Assuming other operating procedures are satisfied, the turret arm frames 976 are rotated to position the turret arms 979 for grabbing the building drum 119. When the building drum 119 is secured by the turret arms 979, the operating air cylinders 1147 are retracted to withdraw the bead working units 1141 and 1142 to their fully retracted rest positions. The turret arm frames 976 are then rotated to position the turret arms 979 for depositing the building drum 119 on the DT unit 106 for removal to the TD unit 105.

Bead transfer arm

Figure 65:
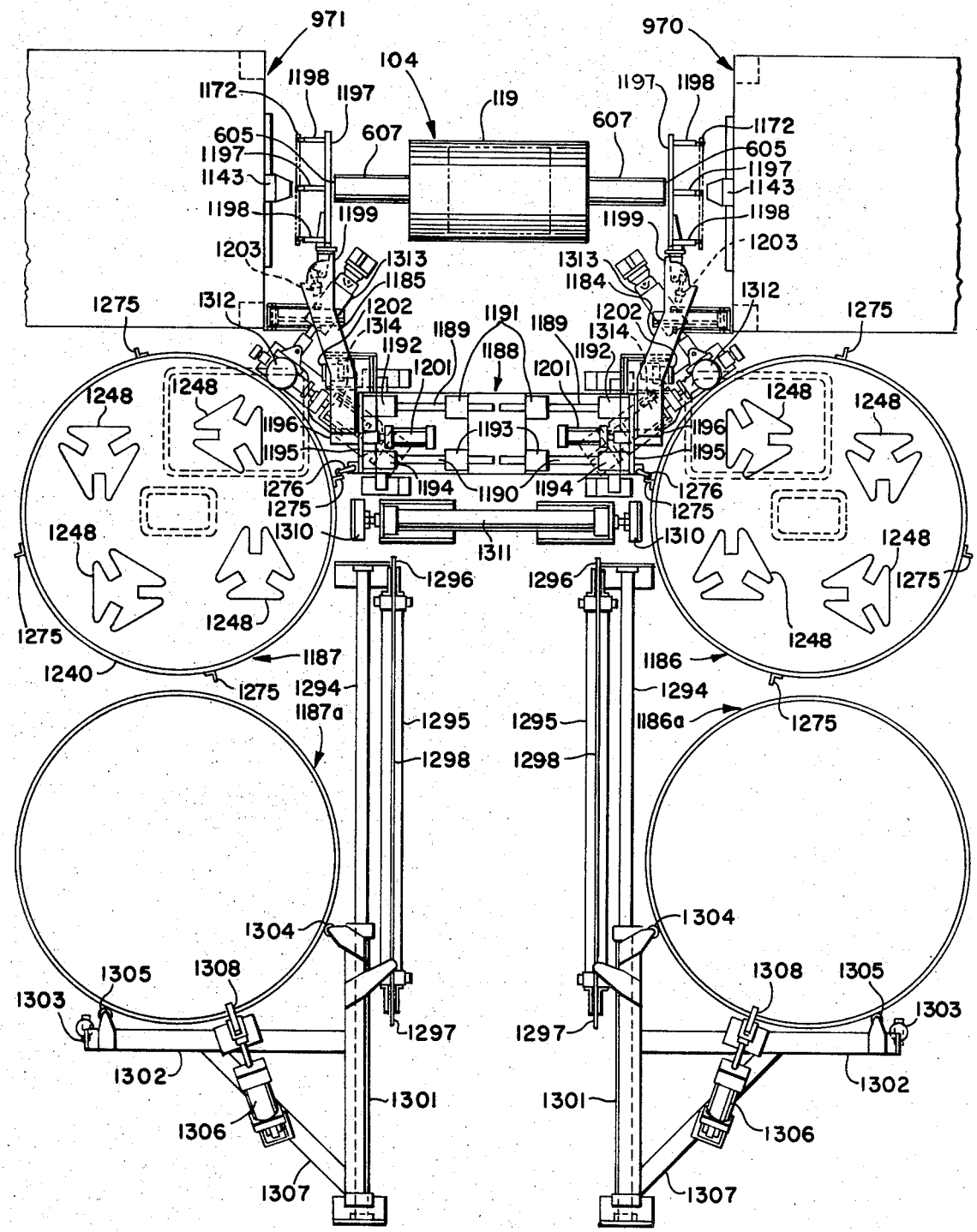
FIG. 65 is a plan view of a unit for transferring beads to the expansible iris.
Figure 66:
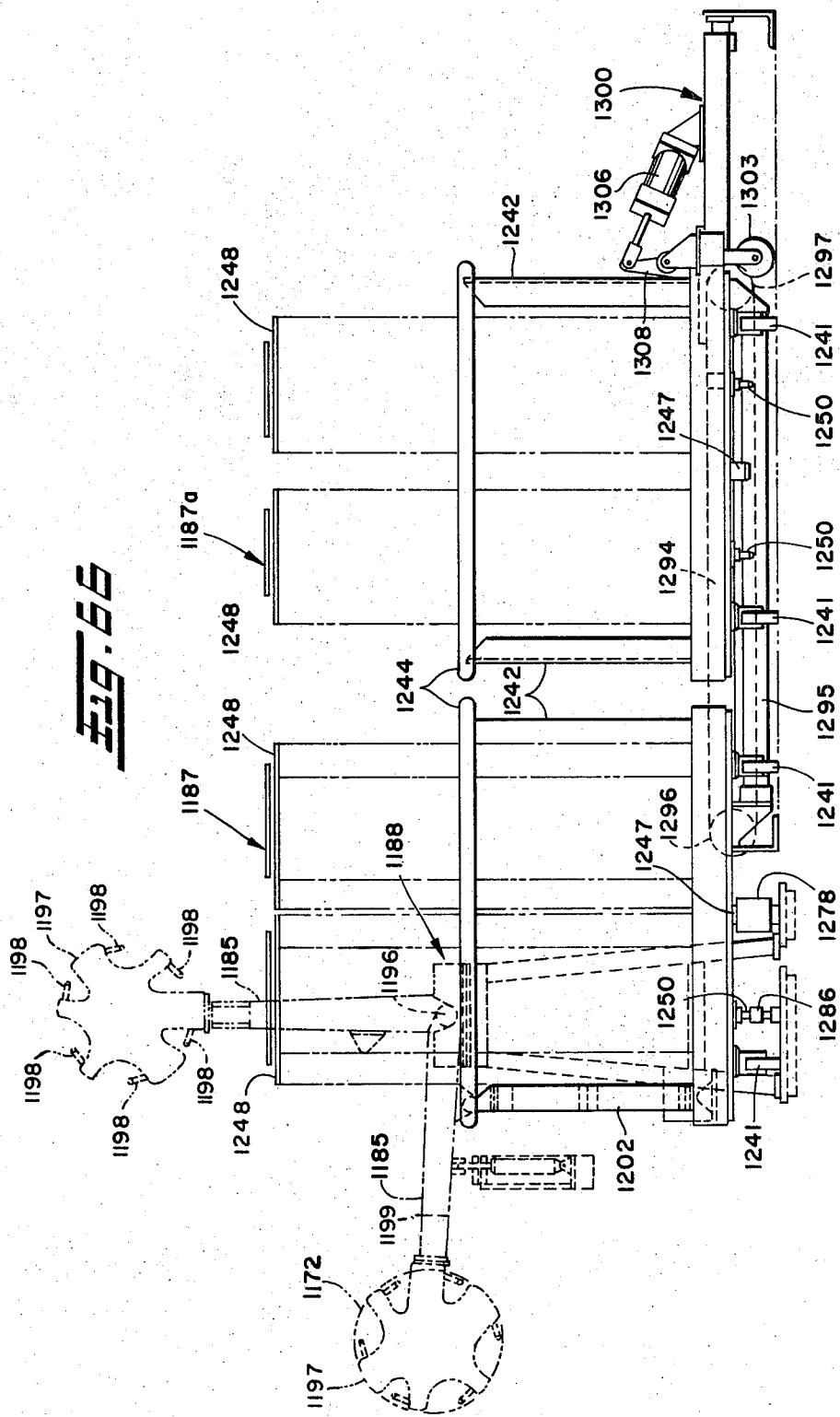
FIG. 66 is a side view of the bead transfer unit.

A pair of similar bead transfer arms 1184 and 1185 (FIGS. 65–66) are provided for taking beads from a couple of portable bead storage racks 1186 and 1187 and moving them into position on the expansible iris 1171 carried by each of the bead setting units 1141 and 1142.

An A-frame 1188 is positioned adjacent the BA unit 104 between the turret frames 970 and 971. Two pairs of guide rods 1189 and 1190 are slidably mounted in parallel relation on pairs of guide brackets 1191 and 1192, and 1193 and 1194 secured in spaced relation to the A-frame 1188. A support plate 1195 is firmly secured to the ends of each pair of guide rods 1189 and 1190 extending beyond the A-frame 1188. A pivot pin 1196 is centrally disposed on each support plate 1195. The bead transfer arms 1184 and 1185 are rotatably mounted on the pivot pins 1196.

A bead transfer hand 1197, including a set of bead grabbing fingers 1198, is rotatably mounted on the free end 1199 of each of the transfer arms 1184 and 1185 for picking up beads from the storage racks 1186 and 1187 and moving them into position adjacent each expansible iris 1171. A pair of air cylinders 1201 are coupled to the support plates 1195 for moving the bead fingers 1198 into close proximity with the outstretched fingers 1173 of each iris 1171, to transfer the beads 1172 from the transfer arms 1184 and 1185 to the adjacent iris 1171 of the bead working units 1141 and 1142.

A pair of elongated air cylinders 1202 are coupled to the bead transfer arms 1184 and 1185 for rotating them to three different arcuate positions. In the first, or bead placing position, each bead hand 1197 is axaially aligned with the adjacent expansible irris 1171. In the second, or bead receiving position, each bead hand 1197 is in position for grabbing a bead 1172 from the bead storage racks 1186 and 1187. In the third, or rest position, the bead hands 1197 are arcuately positioned between the first and second positions out of interfering relation with the bead setting mechanism 1140. A smaller air cylinder 1203 is carried by each of the bead transfer arms 1184 and 1185 for operating or rotating the bead hands 1197 to pick up beads from the bead storage racks 1186 and 1187.

Figure 67:
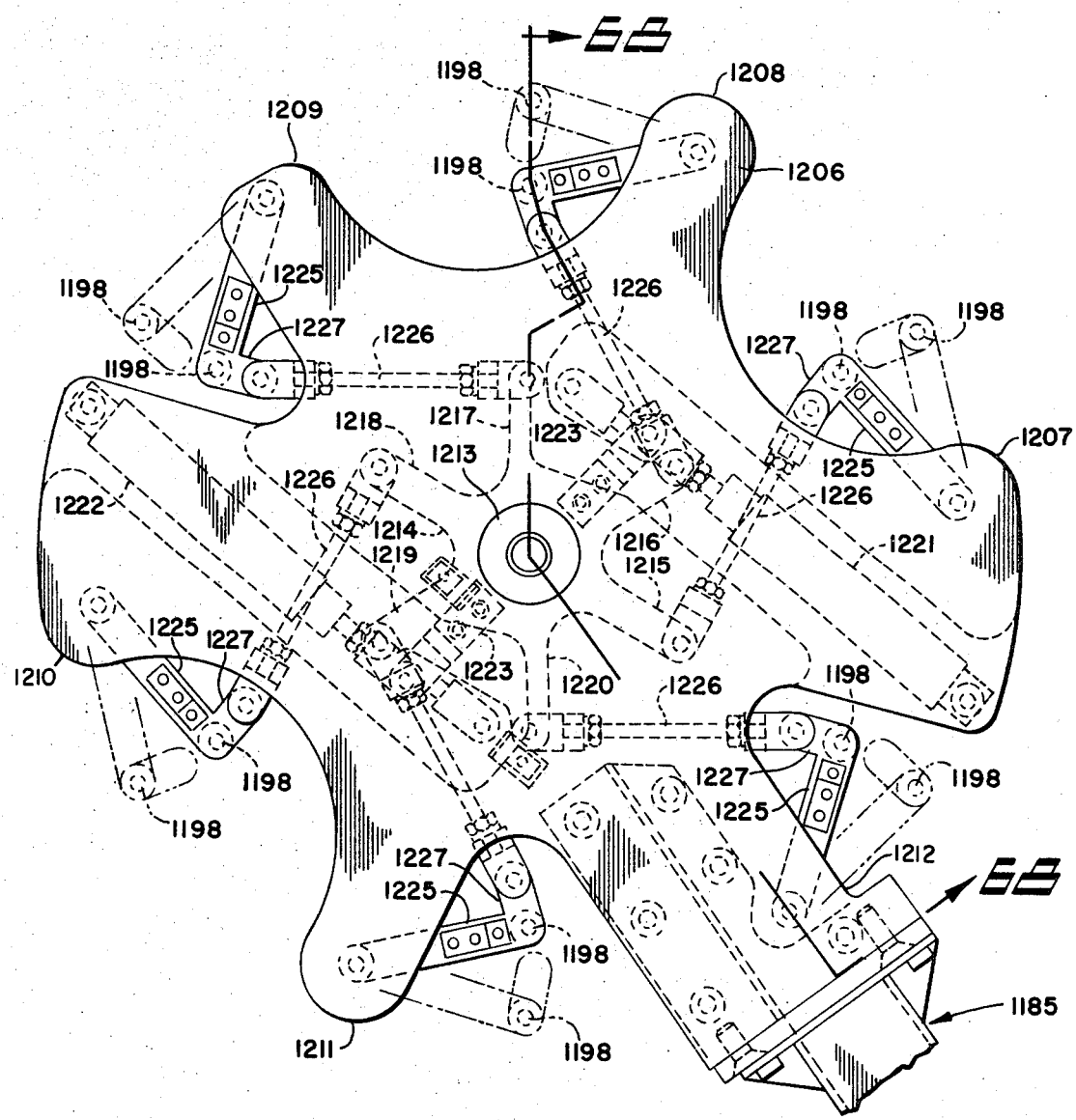
FIG. 67 is a plan view of a bead holding hand of the bead transfer unit.

Each bead hand 1197 (FIGS. 67–68) comprises a flat plate 1206 having a wagon-wheel configuration, including a number of spokes 1207–1212 projecting radially from a hub or pivot pin 1213. A sprocket wheel 1214 with a similar number of projecting sprockets 1215–1220, is rotatably mounted on the hub 1213 in spaced relation from the plate 1206. A pair of air cylinders 1221 and 1222 are coupled to a set of similar pivot arms 1223 fastened to the sprocket wheel 1214, for operating the sprocket wheel 1214 by rotating it about the hub 1213.

The fingers 1198 are each mounted on a link arm 1225, which is rotatably mounted on each of the spokes 1207–1212 adjacent the outer rim of the plate 1206. A cross arm 1226 is rotatably mounted on the tips of each of the sprockets 1215–1220, and coupled by a cross link 1227 to the bead fingers 1198 carried by the spokes 1207–1212. When actuated, the air cylinders 1221 and 1222 (FIG. 67) rotate the sprocket wheel 1214 in a counter-clockwise direction, to move the bead fingers 1198 outwardly from the hub 1213 to engage and pick up beads. Conversely, when the air cylinders 1221 and 1222 are retracted, the bead fingers 1198 move to disengage beads.

The bead fingers 1198 each comprise a base portion 1230 and a tip portion 1231 which is slidably mounted on the base portion 1230 by any suitable means, e.g. pin 1232 carried by the tip portion 1231 slidable in slot 1233 formed in the base portion 1230. A coil spring 1234 acts against the tip portion 1231 to bias it outwardly from the base portion 1230. A shoulder 1235 is formed in the tip portion 1231. A configured pin 1236 is carried by the tip portion 1231 for engaging a bead 1172 and deflecting or directing it into seating engagement against the tip shoulder 1235.

Portable bead storage rack

Figure 69:
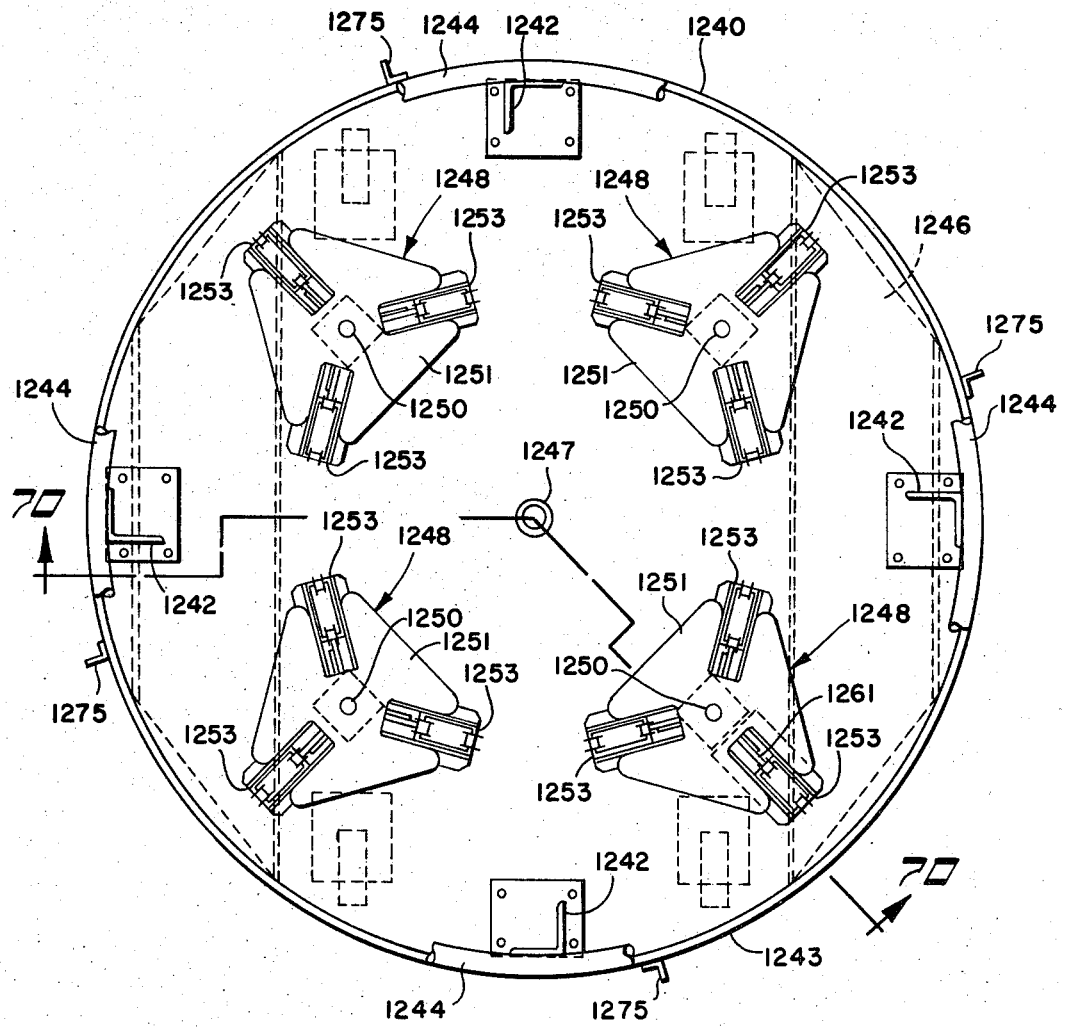
FIG. 69 is a plan view of a portable bead storage rack of the bead transfer unit.

The bead storage racks 1186 and 1187 (FIGS. 69–70) each comprise a platform 1240 mounted on a set of casters 1241. A number of balusters 1242 are arcuately spaced around the outer periphery 1243 of the platform 1240. A circular railing 1244 joins the balusters 1242 together at their upper marginal edges 1245. A pair of similar tubes 1246 are secured on the underside of the platform 1240 adjacent the casters 1241, for receiving the forks of a conventionally designed fork lift truck used to pick up and move the bead storage racks 1186–1187. A centrally disposed pivot pin 1247 extends downward from the platform 1240, and is used for positioning the bead storage racks 1186 and 1187 adjacent the bead transfer arms 1184 and 1185.

A set of four similar bead magazines 1248 are mounted in vertical relation on the platform 1240. The bead magazines 1248 are equally spaced from and about the center pivot pin 1247. The bead frames 1248, each comprise a vertical drive screw 1250 journalled for rotation between the platform 1240 and a top cover plate 1251. A driver 1252 is mounted on the drive screw 1250 below the platform 1240. A set of three tubular frames 1253 are secured between the platorm 1240 and cover plate 1251. The tube frames 1253 are equally spaced from and about the drive screw 1250. A link chain 1254 is mounted on the tube frames 1253 for supporting a stack of horizontally disposed beads. The link chains 1254 are each reeved around a pair of head rollers 1255 adjacent the top cover plate 1251 and a pair of bottom rollers 1256 adjacent the platform 1240. The link chains 1254 are movable along opposing sides 1257 and 1258 of each tube frame 1253.

A mover 1259 is threadably mounted on the drive screw 1250, and carries a dowel 1260 for indicating an empty magazine, and a set of lugs 1261 which project into driving engagement with the link chains 1254 mounted on the tube frames 1253.

A number of plastic clips 1262 (FIG. 71) are frictionally mounted on each link chain 1254 for supporting the individual beads in predetermined spaced relation. Each plastic clip 1262 is generally H-shaped, including a supporting ledge 1263 for engaging the beads, and a pair of configured legs 1264 and 1265 which are insertable in adjacent spaces of the link chain 1254 and compressively engage adjacent link pins 1266 and 1267 of the chain 1254.

A pair of wire sensors 1270 and 1271 (FIG. 70) are positioned on the adjacent turret frame 971 for sensing a bead 1172 in the pick-up position. An air cylinder 1272 is provided for rotating the wire sensors 1270 and 1271 out of interfering bead pick-up relation with a properly positioned bead 1172 adjacent the top cover plate 1251. A limit switch 1273 is provided for sensing the arcuate position of the wire sensors 1270 and 1271. The wire sensors 1270 and 1271, air cylinder 1272, and limit switch 1273 are all mounted on a plate 1274 which is vertically adjustable on the turret frame 971.

A set of four projecting angle bars 1275 (FIGS. 65–69), one for each bead magazine 1248, are disposed in predetermined spaced relation around the periphery 1243 of the platform 1240 relative to the arcuate position of the bead magazines 1248, for engaging a limit switch 1276 mounted on the A-frame 1188 to position the stacks of beads for removal by the transfer arms 1184 and 1185.

Storage bead rack positioner and operator

A pair of similar centering pins in the form of bushings 1278 (FIG. 72) are provided for positioning the bead racks 1186 and 1187 adjacent the bead transfer arms 1184 and 1185. The bushings 1278 are each mounted on an air cylinder 1279 which is disposed in a pit below the floor. The air cylinder 1279 is operated to raise the bushing 1278 into rack centering engagement with the pivot pin 1247 extending below the platform 1240. The pivot pin 1247 and platform 1240 are free to rotate about the axis of the bushing 1278.

A pair of similar mechanisms 1280 (FIG. 73) are provided adjacent the centering bushings 1278, for engaging and rotating the drive screws 1250 of the bead magazines 1248. Each mechanism 1280 is disposed in a pit covered over by a cover plate 1281 with a centrally disposed opening. A pair of guide rods 1282 and 1283 are secured to the cover plate 1281 in vertical, parallel relation. A support 1284 is slidably mounted on the guide rods 1282 and 1283. An air cylinder 1285 connected between the cover plate 1281 and support 1284, is operated to move the support plate 1284 along the guide rods 1282 and 1283 towards the cover plate 1281.

A rotor head 1286 with a plurality of spring biased pins 1287 and 1288, is secured to the end of a drive shaft 1289 which is rotatably mounted on the support 1284. The rotor head 1286 is movable with the support 1284, upwards through the opening in the cover plate 1281 into driving or spinning engagement with the driver 1252 on each drive screw 1250. An electric motor 1290 operates the drive shaft 1289 which, in turn, rotates the drive screw 1250 when the rotor head 1286 is coupled to the driver 1252. A number of limit switches 1291 are positioned for sensing vertical movement of the rotor head 1286, or position of the support 1284 on the guide rods 1282 and 1283.

The dowel 1260 carried by the drive screw mover 1259 engages a sensor pin 1292 adjacent the protruding rotor head 1286 when the bead magazine 1248 is empty. The sensor pin 1292 is moved by the dowel 1260 into contact with an adjacent limit switch 1293, which controls the final shut down of the motor 1290 and air cylinder 1285 and retraction of the rotor head 1286 into the pit below the cover plate 1281, to permit rotation of the platform 1240 for positioning another bead magazine 1248 with a fresh supply of beads.

Provision is made for moving a pair of fully stocked bead racks 1186a and 1187a into position as soon as the stacks of beads carried by the bead racks 1186 and 1187, are depleted. A pair of parallel guide poles 1294 are secured in spaced relation from the floor. A pair of air cylinders 1295 are mounted in parallel relation between the guide poles 1294. A set of guide pulleys 1296 and 1297 are rotatably mounted at the ends of each air cylinder 1295. A set of cables 1298 are reeved around the pairs of guide pulleys 1296 and 1297 and fastened to pistons reciprocable in the air cylinder 1295.

A bushing 1301 is slidably mounted on each guide pole 1294 and carries an outstanding leg 1302 with a caster 1303 at its extended end. A pair of cushion rollers 1304 and 1305 are carried by each bushing 1301 and leg 1302. An air cylinder 1306 is angularly mounted on a cross brace 1307 extending between each bushing 1301 and leg 1302. The air cylinders 1306 are coupled to a set of clamps 1308 for engaging the bead racks 1186a and 1187a and holding them in position against the cushion rollers 1340 and 1305. The bushing 1301 are attached to the cables 1298 for movement along the guide poles 1294 when the air cylinders 1295 are operated.

A couple of rams 1310 extend from a pair of air cylinders 1311 for ejecting the bead racks 1186 and 1187 when the air cylinders 1311 are operated. A drive roller 1312 and operating air cylinder 1313 are mounted on each of the turret frames 970 and 971. An electric motor 1314 is connected to each drive roller 1312 for rotating the bead racks 1186 and 1187 about their pivot pins 1247, when the drive rollers 1312 are moved by the air cylinders 1313 into driving engagement with the platforms 1240.

The wire sensor 1270 mounted on each turret frame 970–971, acts to operate the electric motor 1290 for rotating the drive screw 1250 to move the beads 1172 upwards to the pickup position. The wire sensor 1270 will continue operating the motor 1290 until it senses a bead, or the dowel 1260 indicates that the magazine 1248 is empty and acts to rotate the platform 1240 as previously described. The wire sensor 1271 acts as an override to sense an improperly positioned bead, and shut down operation of the unit until the bead is removed.

The electric motor 1314 operates each drive roller 1312 to rotate the adjacent bead rack about its pivot pin 1247, until the next projecting angle bar 1275 engages the limit switch 1276 to indicate that the next succeeding bead magazine 1248 is in position. The air cylinder 1285 acts to couple the rotor head 1286 with the driver 1252. The wire sensor 1270 is immediately rotated into position for sensing a bead in the pick-up position. In the case of a fresh stack of beads, the transfer arm will continue operating until the dowel 1260 reaches bottom and signals the bead magazine 1248 is empty. If the wire sensor 1270 does not sense a bead, it will continue operating the motor 1290 as previously described, until the next bead magazine 1248 is positioned. The sensing mechanisms are programmed to search 5 bead magazines, after which the air cylinder 1311 is operated to move the ram 1310 for ejecting the empty bead rack.

As soon as the ram 1310 is retracted, the air cylinder 1295 is operated to move the bushing 1301 and clamped alternate bead racks 1186a and 1187a along the guide pole 1294, until the pivot pin 1247 is properly positioned over the centering pin or bushing 1278. The air cylinder 1279 is operated to move the bushing 1278 into coupling engagement with the pivot pin 1247. The air cylinder 1306 is retracted to unclamp the bead rack, after which the air cylinder 1295 is withdrawn to move the bushing 1301 back to its rest position for reloading with another portable bead rack with fresh stacks of beads.

The air cylinder 1313 is operated to move the retracted roller 1312 into engagement with the adjacent platform 1240. The motor 1314 is then operated to rotate the platform 1240 and position a bead magazine 1248, after which the rotor head 1286 is coupled to the driver 1252 for rotating the drive screw 1250, if the wire sensor 1270 indicates that a bead is not in the pick-up position.

The bead transfer arms 1184 and 1185, after they each place a bead on the adjacent iris 1171, move to their second or vertical position. The air cylinder 1203 is operated to rotate the bead hand 1197 over the bead in the pick-up position. The bead fingers 1198 extend inside the positioned bead 1172. The air cylindres 1221 and 1222 are operated to move the fingers 1198 outwardly from the hub 1213 to compressively engage the bead 1172 and retain it against the shoulder 1235 of the finger tip portions 1231. The air cylinder 1203 is retracted to rotate the bead hand 1197 back to its generally vertical position on top of the bead transfer arm. The bead transfer arms 1184 and 1185 are then rotated to their third or rest position until the building drum 119 is removed from Station B and it is clear to place another bead in position on the iris 1171.

SERIES 500 TURRET ASSEMBLY

The DT unit 106 (FIGS. 74–75) comprises a pair of turret frames 1320 and 1321 in spaced relation from the BA unit 104 and the IC unit 101. The building drums 119 are held between the turret frames 1320 and 1321 in a plurality of arcuately spaced positions or at Station D where the beads are stitched and white sidewall, if required, is spun on to the tire carcass, and at Station E where the drum is collapsed, the tire discharged from the drum, and the drum expanded for removal and recycling to the IC unit 101.

A drive shaft 1322 is journalled for rotation between the turret frames 1320 and 1321. A hydraulically operated motor assembly 1323, similar to the hydraulic unit 973 for rotating the drive shaft of the BA unit 104, is provided for operating or rotating the drive shaft 1322. A pair of drum movers 1324 and 1325 are mounted for unitary motion on the drive shaft 1322 for moving the building drums between the Stations D and E.

Turret frame and arms

The drum movers 1324 and 1325 are essentially the same as drum mover 975 described in the corresponding titled paragraph of the Series 400 Turret Assembly. The reader is referred to this paragraph for a more detailed description of the drum movers 1324 and 1325 of the DT unit 106. The reference numerals used in FIGS. 74–75 correspond to those used in the aforementioned paragraph.

Drum support and rotating mechanism at first station

The mechanism for supporting the drum and rotating it at the first Station D, comprises a motor assembly 1326 on the turrent frame 1321, and a socket assembly 1327 on the turrent frame 1320 in aligned relation with the motor assembly 1326. The motor assembly 1326 and the socket assembly 1327 are essentially the same as the motor assembly 1000 and socket 1001 used at Station A of the BA unit 104, and described in the correspondingly titled paragraph of the Series 400 Turret Assembly. The reader is referred to this paragraph for a more detailed description of the motor assembly 1326 and the socket assembly 1327. The reference numerals used in FIGS. 74–75 correspond to those used in the aforementioned paragraph.

Bead stitcher

A bead stitcher 1330 (FIGS. 74–75) is provided for stitching the plydown material firmly in position to set the beads adjacent the ends of the tire carcass. The bead stitcher 1330 comprises a pair of upstanding frames 1331 and 1332, which are positioned between the turret frames 1320 and 1321 below the motor assembly 1326 and socket assembly 1327. A guide rod 1333 is mounted between the bead frames 1331 and 1332. A pair of guide supports 1334 and 1335 are rotatably mounted on the guide rod 1333 adjacent the bead frames 1331 and 1332. A guide rail 1336 is mounted between the guide supports 1334 and 1335 in parallel relation from the guide rod 1333. A pair of stepped frames 1337 and 1338 are slidably mounted on the guide rod 1333 and guide rail 1336 adjacent the guide supports 1334 and 1335. The stepped frames 1337 and 1338 each comprise a number of sections 1339–1341, which are in offset planar relation.

A drive shaft 1342 with threaded ends 1343 and 1344 is disposed in parallel relation between the guide rod 1333 and guide rail 1336. The drive shaft 1342 is rotatably mounted on a stationary motor mount 1345 secured to the guide rod 1333 and guide rail 1336, intermediate the guide supports 1334 and 1335. The stepped frames 1337 and 1338 threadably engage the adjacent ends 1343 and 1344 of the drive shaft 1342.

A stitch roller 1348, is slidably mounted on each of the offset sections 1339–1341 of the stepped frames 1337 and 1338, by any suitable means, e.g. pins 1349 carried by the rollers slidable in slots 1350 disposed in the offset sections. A number of air cylinders 1351 are provided for moving the stitch rollers 1348 into stitching relation with the plydown folded over the beads to lock the beads in position.

A set of air cylinders 1352 are coupled to the guide supports 1334 and 1335 intermediate the guide rods 1333 and guide rails 1336, for rotating the stepped frames 1337 and 1338 and their stitch rollers 1348 about the axis of the guide rod 1333 towards the adjacent building drum 119. A mechanism 1353, including an electric motor, a potentiometer and reducer, are secured on the motor mount 1345 and operatively connected to the drive shaft 1342 for rotating it to laterally move the stepped frames 1337 and 1338 and their stitch rollers 1348, and to sense the lateral position of the stepped frames 1337 and 1338 on the threaded ends 1343 and 1344 of the drive shaft 1342.

White sidewall applicator

A mechanism 1356 (FIGS. 76–77) is provided for applying a strip of white sidewall on the tire carcass. The WSW mechanism 1356 comprises a platform 1357, which is mounted on a set of casters 1358 movable along a track plate 1359 and a couple of trolley wheels 1360 movable along a guideway 1361. A drive screw 1362 is journalled for rotation in a pair of pillow blocks 1363 and 1364 secured to the underside of the platform 1357. The drive screw 1362 threadably engages a stationary bushing 1365 bolted on the floor. A hand operated crank 1366 is operatively connected to the drive screw 1362 for rotating it to move the platform 1357 along the track plate 1359 and guideway 1361 to position the white sidewall WSW mechanism 1356 for applying a strip of white sidewall to the building drum 119 at Station D.

A movable supply unit 1370 is provided for holding at least two rolls of white sidewall material in fabric wrapping, to give an operator time to change a depleted roll, without stopping operation of the machine. The supply unit 1370 comprises and upstanding frame 1371 mounted on a set of casters 1372 and trolley wheels 1373, which are movable along a track plate 1374 and guideway 1375 secured in parallel relation to the platform 1357. An air cylinder 1376 is coupled to the underside of the supply frame 1371 for moving it laterally on the platform 1357 to alternately position the two side-by-side rolls of white sidewall in aligned relation with an adjacent splice table 1377 and storage unit 1378 mounted on the platform 1357.

A pair of spindles 1381 and 1382 for receiving the rolls of white sidewall in fabric wrapping, extend from opposing sides of the supply frame 1371. A second pair of spindles 1383 and 1384 for receiving rollers 1385 on which the separated fabric wrapping is rolled, are similarly mounted on opposing sides of the supply frame 1371 in spaced relation from the first pair of spindles 1381 and 1382. A set of guide rollers 1386–1388 are mounted in staggered relation on each side of the supply frame 1371. An electric motor 1389 is provided for rotating each of the rollers 1385 on which the separated fabric wrapping W is rolled. The white sidewall and fabric wrapping is reeved around the nearest guide roller 1386 where the fabric wrapping W is separated from the white sidewall WS. The white sidewall WS is reeved over the farthest guide roller 1388 for movement on to the splice table 1377 and into the storage unit 1378. The fabric wrapping W is reeved around the guide rollers 1387 and 1388 and wrapped around the roller 1385.

The storage unit 1378 comprises a set of staggered guide rollers 1390. The white sidewall WS is reeved around the guide rollers 1390 forming a number of vertically disposed loops of white sidewall for feeding beneath the platform 1357 to a white sidewall applicator 1393.

The WS applicator 1393 (FIG. 77) comprises an upstanding frame 1394 extending from the platform 1357. A guide pole 1395 extends from the applicator frame 1394 and terminates in close proximity to a building drum 119 positioned at the first Station D. A guide channel 1396 extends from the applicator frame 1394 in parallel relation to the guide pole 1395. A support 1397 (FIGS. 78–79) is secured to a bushing 1398 which is slidably mounted on the guide pole 1395. The support 1397 carries a guide wheel 1399, which is movable along the guide channel 1396. An air cylinder 1400 coupled between the frame 1394 and support 1397, is provided for moving the support 1397 along the guide pole 1395 and guide channel 1396.

A driver 1401 for moving white sidewall WS from the storage unit 1378, is mounted on the movable support 1397. The driver 1401 comprises a number of aligned oppositely disposed drive rollers 1402 and 1403. An electric motor 1404 is provided for rotating the drive rollers 1402 and 1403 in unison.

A large stitch roller 1405 is provided for pushing the strip of white sidewall WS into wrapping engaged relation with the ply material on the drum 119 and stitching the material thereon. The stitch roller 1405 is rotatably mounted on a bifurcated guide arm 1406, which is slidably mounted between a pair of similar, but oppositely disposed U-shaped channels 1407 secured to the movable support 1397. An air cylinder 1408 is coupled to the guide arm 1406 for moving the stitch roller 1405 into pushing engagement with the strip of white sidewall WS extending from the driver 1401.

A cutter assembly 1410 for cutting a predetermined length of the continuous strip of white sidewall WS for wrapping on the ply material, is angularly mounted on the movable support 1397 between the driver 1401 and stitch roller 1405. The cutter assembly 1410 comprises a housing 1411 through which the strip of white sidewall WS passes.

A stationary knife 1412 is mounted within the housing 1411 adjacent one side of the white sidewall WS, and a movable knife 1413 is mounted within the housing 1411 adjacent the opposing side of the white sidewall WS in angularly aligned relation with the stationary knife 1412. An air cylinder 1414 is coupled to the movable knife 1413 for moving it into slicing and angular splicing engagement with the strip of white sidewall WS as it passes through the housing 1411.

A mechanism 1415 (FIG. 80) is provided for actuating the knife 1413 after a predetermined length of white sidewall WS is wrapped on the tire carcass. The knife actuating mechanism 1415 comprises a set of sensing wheels or cam followers 1416 and 1417, which are positioned in rolling engagement with the ply material on a rotating building drum 119 for sensing the leading edge of the white sidewall WS wrapping on the ply material of the rotating drum 119. The cam followers 1416 and 1417 are rotatably mounted on a pair of lever arms 1418 and 1419 which, in turn, are rotatably mounted on a couple of brackets 1420 and 1421, adjustably mounted on the housing 1411 of the cutter assembly 1410. The adjustable brackets 1420 and 1421 each carry a micro switch 1422 for triggering engagement with an actuator 1423 mounted on each of the lever arms 1418 and 1419 to sense angular rotation of the lever arms 1418 and 1419 caused when the cam followers 1416 and 1417 engage the leading edge of white sidewall. The leading cam follower 1416 acts to engage the brake unit attached to rolls 1403. The trailing cam follower 1417 operates the air cylinder 1414 to move the knife 1413 and slice or cut the strip of white sidewall on an angle for splicing engagement with the leading edge of the white sidewall already wrapped on the drum 119. The drum continues to rotate slightly and then stops to permit an operator present at this station, to complete the splice. The building drum 119 is ready for removal to Station E.

Tire discharge mechanism

A discharge assembly, generally indicated at 1425 (FIGS. 74-75) is provided on the turret frame 1321 for supporting the building drum 119 and removing the green tire carcass. The end of the building drum 119 adjacent the turret frame 1320 is unsupported to permit removal of the tire carcass on to a discharge conveyor 1426 (FIG. 85-89).

The discharge assembly 1425 comprises a base plate 1427, which is slidably mounted on a pair of guide rails 1428 and 1429 secured in parallel relation to the turret frame 1321. An air cylinder 1430 is coupled to the base plate 1427 for moving the discharge assembly 1425 towards the building drum 119.

A conventionally designed collet chuck and operating assembly 1431 is mounted on the base plate 1427 for engaging and supporting the adjacent drum shaft 607.

A discharge ring 1432, for engaging a tire carcass and pushing it from the building drum 119, is secured to a pair of guide rods 1433 and 1434 which are each slidably mounted on a set of aligned bushings 1435 and 1436 carried by the base plate 1427. A number of projecting lugs 1437 and 1438 are carried by the discharge ring 1432 for engaging a set of limit switches 1439 mounted on the guide bushings 1435 and 1436, to sense the travel or movement of the discharge ring 1432 relative to the building drum 119.

A couple of air cylinders 1440 and 1441 in back-to-back relation, are provided for moving the discharge ring 1432. The rear cylinder 1440 acts to move the discharge ring 1432 into engagement with the adjacent bead of the tire carcass, and the front cylinder 1441 acts to move the discharge ring 1432 axially across the building drum 119 to push the tire carcass from the building drum 119.

The stroke of the rear cylinder 1440 is adjustable to accommodate different building drum sizes. The piston rod 1442 protruding from the rear cylinder 1440, is coupled to a drive screw 1443 which is journalled for rotation between a pair of spaced pillow blocks 1444 and 1445 secured to the base plate 1427. An electric motor 1446 is provided for rotating the drive screw 1443 to move the piston rod 1442 relative to the rear cylinder 1440. A mechanism, e.g. potentiometer 1447 and reducer 1448, is coupled to the drive screw 1443 for sensing the position of the protruding piston rod 1442 relative to the rear cylinder 1440. A limit switch 1449 is positioned for sensing the maximum travel of the piston rod 1442 from the rear cylinder 1440.

Figure 81:
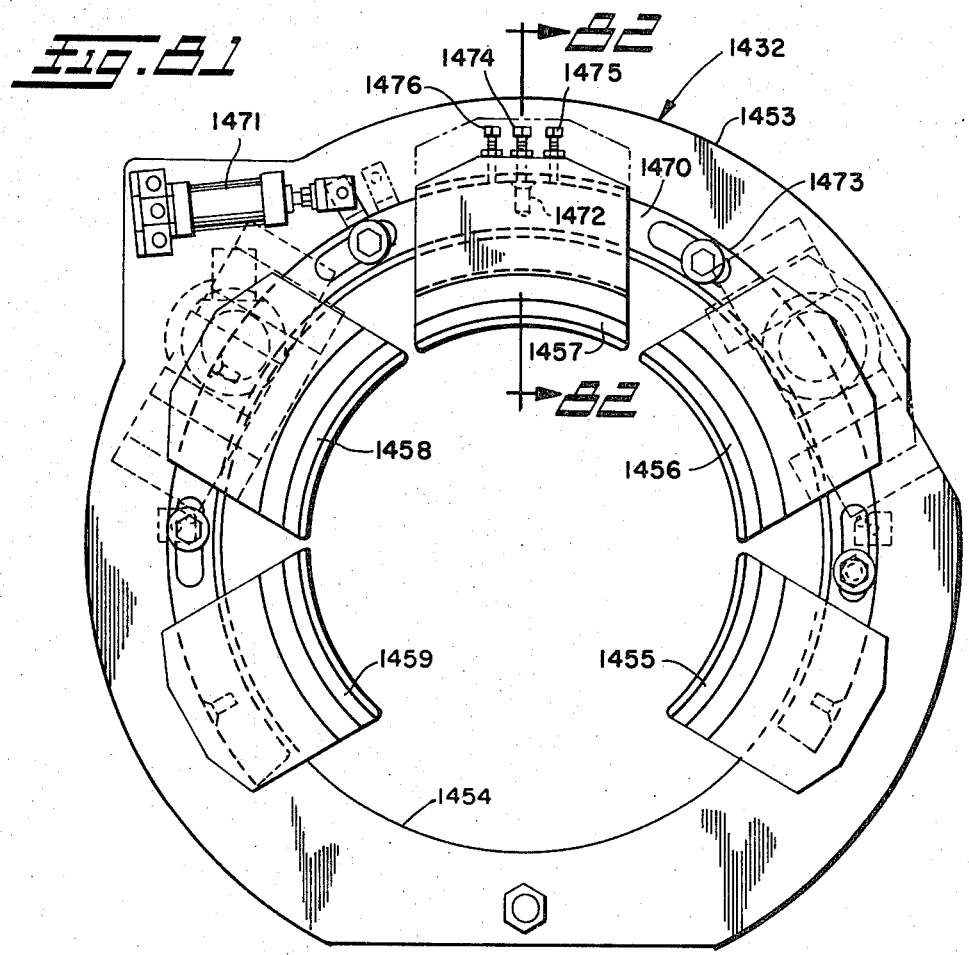
FIG. 81 is a front view of a discharge ring for engaging the tire carcass.
Figure 82:
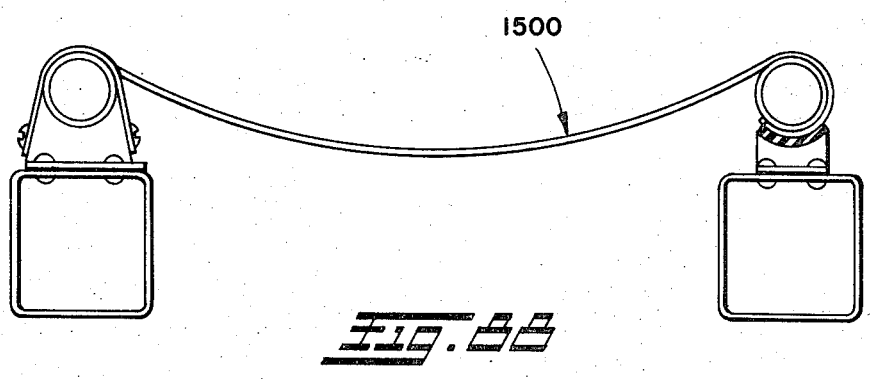
FIG. 82 is a section view from the line 82—82 of FIG. 81.

The discharge ring 1432 (FIGS. 81-83) comprises a support plate 1453 with a circular opening 1454 through which any size building drum will pass with sufficient clearance. A set of ring segments 1455-1459 are carried by the support plate 1453 for engaging the adjacent bead of the tire carcass and supporting it in generally circular relation, as the tire carcass is removed from the building drum. The ring segments 1455-1459 are equally spaced radially from the center point of the circular opening 1454 of the support plate 1453. The ring segments 1455-1459 are arcuately spaced around the upper portion of the support plate 1453. The ring segments 1455-1459 are adjustable radially from the center point of the support opening 1454 to accommodate 13, 14, and 15 inch bead diameters. Since all of the ring segments are identical and are operated in the same manner, their description will be given in relation to ring segment 1457.

The ring segment 1457 (FIGS. 82-83) is fastened on a pair of parallel guide pins 1460 and 1461 which are slidably mounted in a couple of bushings 1462 and 1463 secured in parallel relation on the support plate 1453. An air cylinder 1464 intermediate the bushings 1462 and 1463 is coupled to the ring segment 1457 for moving it radially towards the center point of the support opening 1454. The ring segment 1457, along its inner arcuate edge 1465, is provided with a projecting shoulder 1466 for supporting engagement with a tire bead. A wedging surface 1467 slopes or converges toward the shoulder 1466 for engaging a misaligned bead and deflecting it into seating relation against the shoulder 1466.

The ring segments 1455-1459 straddle an arcuate collar 1470 which is slidably mounted on the support plate 1453 for limited rotation about the center point of the support opening 1454. An air cylinder 1471 is connected to the arcuate collar 1470 for rotating it. A number of similar holes 1472 are arcuately spaced along the outer periphery 1473 of the collar 1470 in aligned relation with an adjustable center bolt 1474 carried by each of the ring segments 1455-1459. Further, the ring segments 1455-1459, each carry a set of adjustable side bolts 1475 and 1476 which are positioned on either side of the center bolt 1474 for engaging the periphery 1473 of the collar 1470, when the center bolt 1474 is positioned in the hole 1472. The ring segments 1455-1459 are in position for engaging a 15 inch bead when they are fully retracted relative to the operating air cylinders 1464. The ring segments 1455-1459 are in position to engage a 14 inch bead when the center bolt 1474 engages the periphery 1473 of the collar 1470. The ring segments 1455-1459 are in position for engaging a 13 inch bead when the center bolt 1474 is in the hole 1472 and the side bolts 1475 and 1476 engage the periphery 1473 of the collar 1470. The ring segments 1455-1459 are adjusted in all cases first, by fully retracting them adjacent their operating cylinders. If a 13 or 14 inch bead ring size is desired, the collar 1470 is rotated accordingly to align or disalign the holes 1472 with the center bolts 1474.

The ring segments 1455-1459 are moved into supporting engagement with the adjacent bead, prior to collapsing the building drum 119. The ring segments 1455-1459 hold the bead, and to some extent the tire carcass, in circular surrounding relation with the collapsed drum 119, as the carcass is pushed on to the discharge conveyor 1426. The opposing end of the tire carcass is supported by the discharge conveyor 1426 which is moved under the building drum 119 to receive the discharged tire carcass.

The tire building drum

The building drums 119 (FIG. 84) used in the operation of the BPA machine 100, are of conventional design, employing an axially moving shaft 1479 for operating the mechanism to collapse and expand the drum. The building drums 119 are each provided with a set of shaft extensions 1480 and 1481.

The shaft extension 1481 has a center bore 1482, which is axially aligned with the operating shaft 1479. A circular abutment or projection 1483 extends into the bore 1482 intermediate the ends of the shaft extension 1481. An elongated collar 1484 is journalled on the circular abutment 1483 for rotation about the longitudinal axis of the bore 1482. The collar 1484 threadably engages a screw 1485, which is secured to the operating shaft 1479 in axially aligned relation. The collar 1484 carries an axially aligned nut 1486.

A spring loaded socket 1487 is carried by the discharge assembly 1425 for matingly engaging the nut 1486 and rotating it and the collar 1484 in one direction, to correspondingly move the screw 1485 and attached operating shaft 1479 axially to collapse the building drum 119. After the tire carcass is discharged from the collapsed drum 119, the socket 1487 is rotated in the opposite direction to expand the drum 119 for removal to the DT unit 106.

Discharge conveyor

The discharge conveyor 1426 (FIGS. 85-89) comprises a conveyor frame 1490 which is positioned on the turret frame 1320 across from the discharge assembly 1425 on the turret frame 1321. A pair of parallel guide rails 1491 and 1492 are mounted on the conveyor frame 1490 in axially aligned relation with the discharge assembly 1425 and a building drum 119 positioned at Station E. A carcass carrier 1493 is slidably mounted on the guide rails 1491 and 1492. An air cylinder 1494 is provided for moving the carcass carrier 1493 along the guide rails 1491 and 1492 into partially cantilevered or overhanging relation to the conveyor frame 1490 and carcass receiving relation to the building drum 119, at Station E. The carcass carrier 1493 is secured to a cable 1495, which is reeved around a set of guide pulleys 1496 and 1497 and secured to a piston reciprocable in the air cylinder 1494.

A wire cage 1498 is positioned on the extended end 1499 of the carcass carrier 1493 for axially receiving the tire carcass removed from the collapsed drum 119. The wire cage 1498 has a concaved cross-sectional configuration to maintain the carcass on the cage 1498 as it moves with the carcass carrier 1493 back to its rest position on the conveyor frame 1490. A matingly configured wire frame 1500 (FIG. 88) is disposed in supporting relation below the wire cage 1498. The wire cage 1498 is secured to a pivot pin 1501, journalled for rotation between a pair of brackets 1502 and 1503, which are secured in spaced relation on the carcass carrier 1493. An air cylinder 1504 is linked to the pivot pin 1501 for rotating the wire cage 1498 about the longitudinal axis of the pivot pin 1501.

The carcass carrier 1493 with a tire carcass positioned on the wire cage 1498, is reciprocated back on to the frame 1490 until the wire cage 1498 is in side-by-side aligned relation with a wire discharge chute 1505 extending laterally from the conveyor frame 1490. The air cylinder 1504 is operated to rotate the wire cage 1498 and spill the tire carcass into the discharge chute 1505 for removal to a storage rack. The discharge chute 1505 has a longitudinal cross-section which is generally J-shaped, the lower looped portion 1506 being curved upwardly to form a cradle for holding the tire carcass, as it is inspected.

An adjusting screw 1507 and wing nut 1508 (FIG. 87) are used for raising or lowering the end 1509 of the conveyor frame 1490 closest the building drum 119 to vertically adjust the position of the wire cage 1498 relative to the adjacent end of the tire carcass prior to collapsing the drum 119.

The expanded drum 119 is removed from the discharge Station E and placed on a set of similar drum supports 1512 extending from the turret frames 1320 and 1321 for recycling to the IC unit 101.

SERIES 600 DRUM TRANSFER ASSEMBLY

Figure 90:
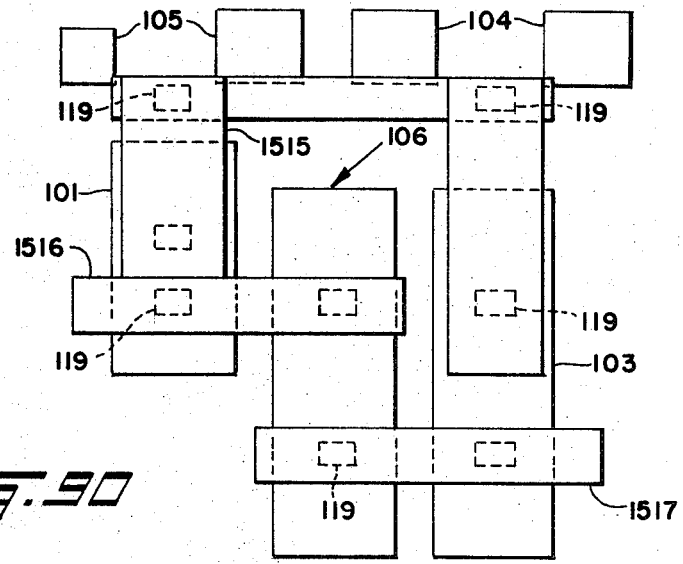
FIG. 90 is a schematic of a system for conveying the tire building drums between the assemblies.

The DT unit 106 (FIG. 90) comprises: an overhead conveyor 1515 for moving the building drums 119 transversely between the TD unit 105 and the IC unit 101; an overhead conveyor 1516 for moving the building drums 119 axially between the IC unit 101 and the 1-PLY unit 102; an overhead conveyor 1517 for moving the building drums 119 axially between the 1-PLY unit 102 and the 2-PLY unit 103; an overhead conveyor 1518 for moving the building drums 119 transversely between the 2-PLY unit 103 and the BA unit 104; and a floor conveyor 1519 for moving the building drums 119 axially between the BA unit 104 and TD unit 105.

The conveyors 1515 and 1518 for moving the building drums transversely are, with the exception of the orientation of the drum carrier, essentially the same as the overhead conveyors 1516 and 1517 for moving the building drums axially. Therefore, a description of the overhead conveyor 1515 should be sufficient to comprehend the structure and operation of the other overhead conveyors 1516-1518.

Figure 93:
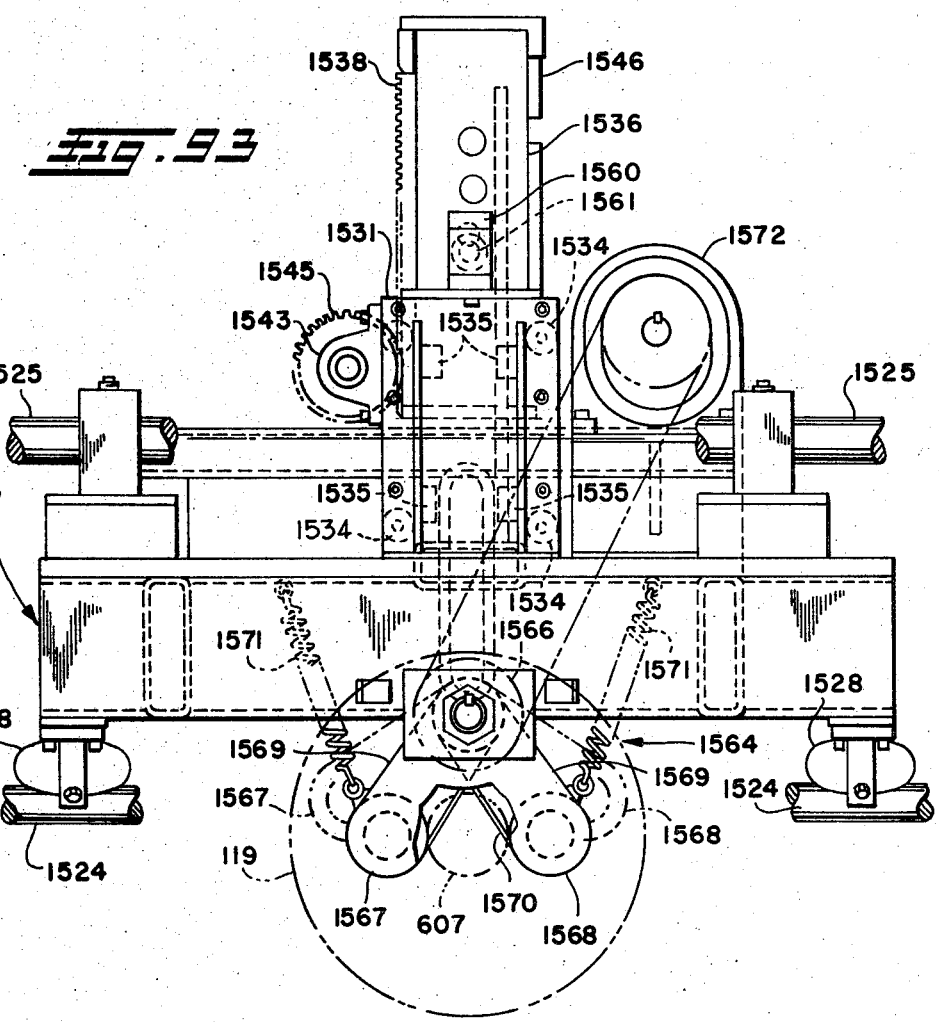
FIG. 93 is a section viewed from the line 93—93 of FIG. 91.

The overhead conveyor 1515 (FIGS. 91-93) comprises a rectangular overhead frame 1520, including a couple of parallel side beams 1521 and 1522. A pair of guide rails 1523 and 1524 are mounted in parallel relation on the overhead frame 1520, adjacent the side beams 1521 and 1522. A drive shaft 1525 is rotatably mounted on the overhead frame 1520 in parallel relation to the guide rails 1523 and 1524. The drive shaft 1525 is positioned adjacent the side beam 1522 and guide rail 1524, but could be positioned anywhere between the guide rails 1523 and 1524, without affecting the operation of the unit. An electric motor 1526 is operatively connected to the drive shaft 1525 for rotating it about its longitudinal axis.

A drum carrier 1527 for moving a building drum on the overhead conveyor 1515, is mounted on a number of chain connected roller assemblies 1528, which are movable along the guide rails 1523 and 1524. The drum carrier 1527 is coupled to the drive shaft 1525 for movement along the guide rails 1523 and 1524 in response to operation of the electric motor 1526 and rotation of the drive shaft 1525.

A set of vertical guide brackets 1530 and 1531 are secured adjacent opposing sides 1532 and 1533 of the drum carrier 1527. A number of angularly disposed rollers 1534 and 1535, are rotatably mounted on the guide brackets 1530 and 1531 for rolling engagement with a transfer arm framework 1536, which is guided vertically between the guide brackets 1530 and 1531. A couple of vertical gear racks 1537 and 1538 are secured adjacent the opposing sides 1539 and 1540 of the transfer arm framework 1536.

A drive rod 1541 is rotatably mounted between a pair of pillow blocks 1542 and 1543 secured to the guide brackets 1530 and 1531. A pair of spur gears or pinions 1544 and 1545 are keyed to the drive rod 1541 in aligned, mating engaged relation with the gear racks 1537 and 1538. An air cylinder 1546 is coupled between the drum carrier 1527 and transfer arm frame 1536 for moving the transfer arm framework 1536 vertically. The engaged racks and pinions keep the frame sides 1539 and 1540 moving in unison to prevent binding of the transfer arm framework 1536 in the vertical guide brackets 1530 and 1531.

The transfer arm framework 1536 includes a pair of transfer arms 1550 and 1551 hanging from opposing sides 1539 and 1540 of the framework 1536 in parallel relation below the drum carrier 1527 for engaging opposing ends of the buildings drum shaft 607. The transfer arms 1550 and 1551 (FIGS. 94–95) each include a pair of oppositely disposed fingers 1552 and 1553 for encircling and matingly engaging the drum shaft 607 in a circular recess 982, formed in the shaft. The fingers 1552 and 1553 are rotatably mounted on the free ends 1554 of the transfer arms 1550 and 1551. A pivot pin 1555 is slidably mounted in an elongated slot disposed in each of the transfer arms 1550 and 1551. A set of link arms 1557 and 1558 are coupled between the fingers 1552 and 1553 and pivot pin 1555 for rotating the fingers 1552 and 1553 into and out of engagement with the drum shaft 607 in response to movement of the pivot pin 1555 in the slot 1556. An air cylinder 1559 is linked to the pivot pin 1555 for moving it axially in the elongated slot 1556 to rotate the fingers 1552 and 1553. An air cylinder 1560 with a locking pin 1561, is provided for locking the transfer arm framework 1536 to the drum carrier 1527, when it is transferring building drums between the assemblies.

Drum indexer

A drum indexer 1564 (FIGS. 92–93) is provided on the drum carriers 1527 of the overhead conveyors 1515–1517, for indexing or rotating the building drums 119, to a predetermined arcuate position for engaging stock positioned on the IC unit 101, the 1-PLY unit 102, and the 2-PLY unit 103, to arcuately space the splices of stock wrapped on the drums. The drum indexer 1564 comprises a drive pulley assembly 1565, including a drive pulley 1566, which is rotatably mounted on the drum carrier 1527, adjacent the transfer arm 1551 in aligned relation with the building drum shaft 607. A set of drive rollers 1567 and 1568 are each rotatably mounted on a pivot arm 1569, which is rotatably mounted on the drive pulley assembly 1565. The drive rollers 1567 and 1568 are in spaced, aligned relation with the drive pulley 1566. A flexible drive belt 1570 is reeved in triangular relation around the drive pulley 1566 and drive rollers 1567 and 1568. A coil spring 1571 is used to bias the drive rollers 1567 and 1568 in shaft receiving relation (note dotted position of rollers in their rest position).

The drum shaft 607 engages the drive belt 1570 between the rollers 1567 and 1568 when it is lifted into transporting relation with the drum carrier 1527. The drum shaft 607, as it moves upward in engaged relation with the drive belt 1570, forces the drive rollers 1567 and 1568 to move into abutting relation with the drum shaft 607. The drive belt 1570 is reversely reeved halfway around the drum shaft 607 for driving or rotating it in a controlled manner. An electric motor 1572 is connected to the drive pulley 1566 for operating it to rotate the drum 119.

A sensor 1573 is mounted for rolling engagement on the drum shaft 607 to sense any imperfection, such as a projection or indentation, which is deliberately placed on the surface or the drum shaft 607, to mark or identify the arcuate positions of the building drum 119 which it must be in, if the splices are to be properly staggered on the drum 119. Three markings are applied in different locations on each drum shaft 607, and each drum carrier 1527 of the aforementioned conveyors has an appropriately mounted sensor for engaging the particular mark of the aforementioned units involved. It should be readily appreciated that it is immaterial in what position the building drum 119 is picked up, since the indexer 1564 will rotate it until the particular sensor engages its particular marking on the drum shaft 607.

A pair of projecting angle bars 1576 and 1577 are fastened in spaced relation on the drum carrier 1527, for engaging two sets of limit switches 1578 and 1579 mounted in spaced relation on the overhead frame 1520. The first set of switches 1578 act to slow down the drum carrier 1527 and the second set of switches 1579 act to stop the drum carrier 1527 for picking up or depositing building drums 119. The building drums 119 are in drum transferring relation to the drum carrier 1527, when the operating air cylinder 1546 is fully retracted.

Floor conveyor

The floor conveyor 1519 (FIGS. 55, 96–97) for moving building drums between the BA unit 104 and the TD unit 105, comprises a pair of parallel conveyor-like trackways 1582 and 1583 mounted in spaced relation from the floor adjacent the turret frames 970 and 971, and 1320 and 1321. A set of sprocket wheels 1584 and 1585 are rotatably mounted between the trackways 1582 and 1583 adjacent their opposing ends. A chain belt 1586 is reeved around the sprocket wheels 1584 and 1585. An electric motor 1587 is operatively connected to the sprocket wheel 1585 adjacent the TD unit 105, for rotating it to move the chain belt 1586 along the trackways 1582 and 1583 in the direction indicated by the arrows (FIG. 97).

A number of drum carts 1588 are fastened in spaced relation to the chain belt 1586 for holding the building drums 119 as they are moved along the floor conveyor 1519. The drum carts 1588 each comprise a pair of oppositely disposed V-shaped drum brackets 1589 and 1590 for receiving adjacent ends of the drum shaft 607. The drum brackets 1589 are each mounted on a skate 1591 which is fastened to the chain belt 1586 and are movable along the trackways 1582 and 1583 in response to operation of the motor 1587 and rotation of the sprocket wheels 1584 and 1585.

The skates 1591 (FIG. 55) are each mounted on four sets of oppositely disposed rollers 1592 and 1593 for rolling engagement with opposing sides 1594 and 1595 of the trackways 1582 and 1583. Each skate 1591 is also provided with two sets of guide wheels 1596 and 1597 which are rotatably mounted between the rollers 1592 and 1593 for rolling engagement with the adjacent inner edges of the trackways 1582 and 1583 to maintain the drum carts 1588 in position, as they move along the trackways 1582 and 1583.

A pair of drum movers 1600 and 1601 are centrally disposed between the turret frames 970 and 971 of the BA unit 104, and the turret frames 1320 and 1321 of the TD unit 105 for transferring the building drums 119 between the lower turret arms 979 and the drum carts 1588. The drum movers 1600 and 1601 each comprise a stationary frame 1602 positioned adjacent the outer trackway 1582 of the conveyor 1519. A couple of support arms 1603 and 1604 are rotatably mounted on each frame 1602 in parallel relation to the adjacent turret arms 979. The free ends 1605 of the support arms 1603 and 1604 are each provided with a recess 1606 configured for receiving the drum shaft 607. An air cylinder 1607 is connected to each set of support arms 1603 and 1604 for operating or rotating them in unison.

OPERATION OF BPA MACINE

The operation of the BPA 100 is best explained by following a single building drum 119 through the various assemblies of the BPA machine 100. Assume that a building drum 119 has just left the IC unit 101, and that the drum 119, whose progress we intend following, is positioned in the IC drum transport unit 118 which is awaiting the signal to move the drum 119 into rolling engagement with innerliner and chafer on the IC bed 111.

At the onset of this description, it should be expounded that the different units 101–107 of the BPA machine 100, are designed to operate independently of each other. That is, if one unit malfunctions or stops working, the remaining units will continue operating. However, there is a sequence of operation which will be interrupted when the drums begin congregating around the unit that is not functioning properly.

The normal procedure for loading the IC unit 101 with stock begins as soon as a drum, wrapped in innerliner and chafer, leaves the unit 101 and the drum transport 118 moves back to its rest position on the IC table 110, regardless of the position of the approaching drum 119.

The operating air cylinder for the IC cutter assembly 114 is actuated to move the assembly into abutting relation with the adjacent movable bed portion 115 of the IC table 110, where the assembly triggers a limit switch effecting the operation of the IC transfer unit 113. The electric motor of the IC transfer 113 is operated to move the unit across the IC bed 111 into pick-up relation with the innerliner and chafer positioned on the cutter table 364. The vacuum manifolds of the IC transfer 113 are actuated to pick up the leading edges of the sheet of innerliner and strips of chafer from the cutter table 364. The vacuum manifolds, picking up the strips of chafer, are translated or moved relative to the vacuum manifolds picking up the sheet of innerliner, such that the leading edges of the chafer extend beyond the leading edge of the innerliner.

The IC transfer 113 moves back across the IC bed 111 with the inner liner and chafer until slowed down and stopped by the set of limit switches positioned on the IC table 110. These limit switches effect operation of the cutter 380, which is reciprocated by its operating air cylinder, across the cutter table 364 to cut the chafer and inner liner being held by the vacuum manifolds in unstretched relation on the IC bed 111. The cutter 380, as it moves back to its rest position, engages a limit switch effecting operation of the chafer applicator 117. The cutter assembly 114 retracts to its rest position after the innerliner and chafer are cut to length.

The operating air cylinders of the chafer applicator 117 are actuated for moving the chafer manifolds 490 and 491 to pick up the strips of chafer and deposit them in overlapped side-by-side relation on the sheet of innerliner. Just prior to depositing the chafer on the inner liner, the movable bed portions 115 and 116 are operated to tension the innerliner on the IC bed 111, and the cementing units 458 are operated to place a number of spots of adhesive adjacent the leading edge of the innerliner. The chafer manifolds 490 and 491 are translated or moved, such that the ends of the chafer are in the same spaced relation from corresponding edges of the innerliner, to stagger or arcuately space the splices of innerliner and chafer on the drum 119. The IC transfer 113 moves to its retracted rest position adjacent the bed 111. The table is now loaded with stock and ready for the drum 119.

The electric eyes, located in the bed 111, indicate to the drum transport 118 that the bed is loaded and ready. The operating air cylinder of the drum transport 118 is actuated to move the drum 119 downward into engaged relation with the innerliner and chafer. The drum transport 118, when it reaches its lowest position, engages a limit switch to start operation of the motor for moving the drum transport 118 across the bed 111 to wrap the innerliner and chafer around the drum 119. The drum transport 118 triggers a set of limit switches positioned at the other end of the IC table 110, for slowing and stopping it in position for passing the drum 119 to the drum carrier 1527 of the overhead conveyor 1516 for removal to the 1-PLY unit 102. As soon as the transfer is completed, the drum transport 118 moves back to its rest position for receiving another drum from the drum carrier 1527 of the overhead conveyor 1515, while the IC unit 101 acts to reload the IC bed 111 with more stock. The drum carrier 1527 moves with the drum 119 along the overhead conveyor 1516, until it is properly positioned for depositing the drum 119 on the 1-PLY drum transport 639.

The 1-PLY drum transport 639 moves from its normal semi-retracted rest position to an extended position for receiving the drum 119 from the drum carrier 1527. After securing the drum 119, the drum transport 639 moves back to its rest position to await instructions from the 1-PLY unit 102 that the first ply is properly positioned on the 1-PLY bed 633. The drum carrier 1527 returns to the IC unit 101 for picking up another drum. The 1-PLY unit 102 is normally loaded with stock awaiting the arrival of a drum from the IC unit 101. Moreover, the 1-PLY unit 102 is loaded with stock in essentially the same manner as the IC unit 101. Nevertheless, a brief description will be given of the procedures for positioning a first ply on the bed 633.

The ply cutter assembly 636, carrying a sheet of first ply material, is operated and moved into abutting engagement with the adjacent movable bed section 634 of the 1-PLY table 632. The ply transfer 638 is then operated and moved across the bed 633 to a position adjacent the ply cutter assembly 636, for picking up the leading edge of the first ply with its vacuum manifolds 837–839. The ply transfer 638 immediately reciprocates back across the bed 633, until stopped by limit switches similar to those used to slow down and stop the IC transfer 113. The ply transfer 638 drops the first ply, which is immediately picked up by the vacuum manifolds carried by the movable bed sections 634 and 635. The ply transfer 638 is free to retract to its normal rest position adjacent the bed 633.

The cutter 725 of the assembly 636 is operated and moved on a bias across the bed 633, tearing the first ply as it moves. After the first ply is cut, the cutter assembly 636 retracts to its normal rest position adjacent the bed 633. The fingers 664 and angles 665, carried by the movable bed sections 634 and 635, are rotated into position for engaging and positioning the first ply on the bed 633. A blast of air is sent through the vacuum manifolds of the movable bed sections 634 and 635, to lift the first ply from the bed 633 for positioning engagement with the angles. Once positioned, the first ply is immediately picked up by the vacuum manifolds 643 and 646, and the movable bed sections 634 and 635 are operated to tension the first ply to wrap it around the innerliner and chafer alto the drum transport 639 that the first ply is properly positioned and ready for wrapping engagement with the drum 119. The drum 119 has been properly indexed for engaging the first ply in position on the bed 633.

The drum transport 639 lowers the drum 119 into engaged relation with the first ply and moves the drum 119 across the bed 633 in rolling engagement with the first ply to wrap it around the innerliner and chafer already wrapped on the drum 119. The drum transport 639 is stopped when it reaches the other end of the bed 633, and extends itself for raising the drum 119 into position for pick-up engagement by the drum carrier 1527 of the overhead conveyor 1517 and removal to the 2-PLY unit 103, where the drum 119 goes through a similar operation for receiving the second ply. The mechanisms for loading the 2-PLY unit 103 are essentially the same as those of the 1-PLY unit 102. Since all mechanisms and ply-applying procedures of the 2-PLY unit 103 have been previously discussed in connection with the 1-PLY unit 102, it will be assumed that the operation of applying the second ply is complete, and the drum 119 has been removed by the drum conveyor 1527 of the overhead conveyor 1518 and placed in the brackets 995 secured to the turret frames 970 and 971 of the BA unit 104.

The BA unit 104 will not operate, i.e. the turret arms will not rotate to pick up the building drums, unless, (a) a building drum is resting in the brackets 995, and (b) the drum cart 1588, positioned on the floor conveyor 1519 adjacent the BA unit 104, is empty. Assuming these conditions are satisfied, the turret arms are rotated to pick up the drum 119 from the brackets 995 and move it to Station A, where tread cushion is applied over the second ply material by the tread cushion applicator 1040. As soon as this operation has been completed, the ply stitcher 1018 is actuated to stitch the tread cushion and ply material wrapped on the drum 119. When this is finished, the turret arms are rotated to pick up the drum 119 and move it to Station B, where the bead setting mechanism 1140 acts to turn down the ply material extending beyond each end of the drum 119, move the beads over the plydown into position on the tire carcass, and fold the plydown back over the beads to set them for stitching. The drum 119 can now be removed by the turret arms which rotate the drum 119 into position for engaging the drum mover 1600 which takes the drum 119 and deposits it on a drum cart 1588 for movement along the floor conveyor 1519 to a position adjacent the drum mover 1061 and TD unit 105.

The drum 119 is picked up by the drum mover 1601 and moved into the waiting turret arms for positioning at Station D, where the bead stitcher 1330 acts to stitch the plydown material. Strips of white sidewall, if desired, are then applied by the WS applicator 1393. When these operations are finished the turret arms are rotated to move the drum 119 to the discharge Station E. The ring segments of 1455–1459 are moved into engaged relation with the adjacent bead for supporting it is surrounding relation to the drum 119, after it is collapsed. The drum 119 is then collapsed and the discharge ring 1432 is operated to push the green tire carcass from the drum 119 on to the discharge conveyor 1426 for removal to a storage rack. The drum 119 is then expanded and rotated by the turret arms into position on the brackets 1512 to await removal by the drum carrier 1527 of the overhead conveyor 1515 leading to the IC unit 101.

The BPA machine 100 is designed to comfortably accommodate 8 building drums, moving between its assemblies. As previously indicated, the units 101–107 work independent of each other, which is important since a malfunction in one unit will not completely shut down operation of the BAP machine 100. The units 101–107 will continue working until they are forced to stop, because, (a) there is no building drum available to move through the unit, or (b) the last building drum is not able to move from the unit because of a backlog of drums ahead of it. The green tire carcasses produced by the BPA machine 100 are taken to other machines for tread application and curing.

Thus, there has been provided a machine for automatically making green tire carcasses of consistent quality and at a constant rate of about one tire carcass every 20–30 seconds. Operators are only needed in the areas of material storage and handling, especially to replace rolls of material which have been depleted. Otherwise, the tire carcasses are formed automatically by a number of cooperating machines working in unison.

What is claimed is:

1. A machine for producing green tire carcasses, comprising in combination:
    (a) a stationary table including a rigid horizontal bed;
    (b) means associated with the table for positioning a piece of ply material on the bed;
    (c) other means associated with the table and responsive to ply material on the bed, for transporting a tire building drum across the bed in rolling engagement with the piece of ply material to wrap the material around the drum; the positioning means including
    (d) means for stretching the pieces of ply material to a predetermined length for wrapping around the drum in overlapping splacing relation,
    wherein the stretching means includes at least one bed portion, which is movable to stretch the piece of ply material.

2. A machine for producing green tire carcasses, comprising in combination:
    (a) a stationary table including a horizontal bed for supporting carcass forming material;
    (b) means associated with the table for bringing a sheet of ply material to the bed;
    (c) a unit mounted on the table and reciprocable along the longitudinal axis of the bed, for taking the sheet from the means and transferring it on to the bed;
    (d) a cutter mounted on the table and movable transversely across the bed, for cutting the sheet after it has been moved a predetermined distance across the bed;
    (e) a pair of bed portions movably mounted on the table for stretching the cut piece of ply material to a predetermined length for wrapping around a tire building drum in overlapped splicing relation;
    (f) another unit mounted on the table and reciprocable along the longitudinal axis of the bed, for transporting a tire building drum across the bed in rolling engagement with the stretched piece of ply material, to wrap the material around the drum;
    (g) means for conveying a tire building drum to the table for wrapping in ply material; and
    (h) means for conveying a tire building drum away from the table after it has been wrapped in ply material.

3. The machine of claim 2, which includes:
    (i) means for sequentially operating the means (b), unit (c), cutter (d), bed portions (e), and unit (f).

4. The machine of claim 3, wherein the means (b), unit (c), bed portions (e), and unit (f) carry vacuum manifolds for holding the ply material.

5. The machine of claim 4, which includes:
    (j) means for adjusting the angular disposition of the movable bed portions relative to the longitudinal axis of the bed to accommodate different bias cut ply material.

6. A machine for producing green tire carcasses, comprising in combination:
    (a) a plurality of dependent assemblies for performing carcass building operations, the assemblies including at least two rigid stationary beds for supporting ply material in horizontal planes;
    (b) means for positioning a piece of ply material on the first of the two beds;
    (c) means for positioning a piece of ply material on the second of the two beds in second ply oriented relation to the ply on the first bed;
    (d) at least one tire building drum, movable between the assemblies, for receiving the ply material in wrapping relation;
    (e) means responsive to ply material positioned on the beds, for transporting the drum successively across the two beds, in rolling engagement with the pieces of ply material to successively wrap the plies around the drum; and (f) means for indexing the drum to a different arcuate position, for engaging each of the materials on the beds, to arcuately space the splices of material wrapped on the drum.

7. The machine of claim 6, wherein the assemblies include:

(g) a third stationary bed for supporting innerliner and chafer material in a horizontal plane;

(h) means for positioning pieces of innerliner and chafer material on the third bed; and (i) means responsive to innerliner and chafer positioned on the third bed, for transporting the drum across the third bed in rolling engagement with the pieces of innerliner and chafer material to wrap the material around the drum, prior to moving the drum to the first and second beds.

8. The machine of claim 7, wherein the third bed includes:

(j) stationary table for supporting the bed in a horizontal plane.

9. The machine of claim 8, which includes:

(k) means mounted on the table for bringing a continuous sheet of innerliner and continuous strips of chafer to the third bed.

10. The machine of claim 9, wherein the positioning means (h) includes:

(l) a unit mounted on the table and reciprocable along the longitudinal axis of the third bed, for taking the sheet of innerliner and strips of chafer from the means (k) and transferring them on to the bed in spaced relation.

11. The machine of claim 10, which includes:

(m) means carried by the transfer unit for moving the strips of chafer axially relative to the sheet of innerliner, such that the leading edges of the chafer engaged by the transfer unit, extend beyond the corresponding leading edge of the innerliner.

12. The machine of claim 11, which includes:

(n) a cutter mounted on the table and movable transversely across the third bed, for cutting the innerliner and chafer along an aligned pathway after the material has been moved a predetermined distance on to the bed.

13. The machine of claim 12, which includes:

(o) a pair of bed portions movably mounted on the table for stretching the cut sheet of innerliner positioned on the third bed, to a length sufficient for wrapping around the drum in overlapped splicing relation.

14. The machine of claim 13, wherein the positioning means includes:

(p) an applicator for placing the cut strips of chafer in side-by-side, partially overlapped relation on the cut sheet of innerliner, prior to wrapping engagement with the drum.

15. The machine of claim 14, wherein the drum transporting means (i) includes a drum carrier mounted on the table for reciprocating movement along the longitudinal axis of the third bed, and a drum head mounted on the drum carrier for vertical movement relative thereto for lowering the drum into rolling engagement with the innerliner and chafer.

16. The machine of claim 15, which includes (q) means associated with the third bed for increasing adhesion between the drum and the leading edge of innerliner, first engaged by the drum.

17. The machine of claim 16, wherein the means for increasing adhesion includes:

(1) a number of rolls of tape rotatably mounted on the transfer unit, the tape including adhesive material transferable to the innerliner;

(2) a similar number of rollers mounted in aligned, spaced relation from the rolls of tape, for receiving used tape therefrom; and (3) a plunger disposed between each roll of tape and an aligned roller, for engaging a strip of tape reeved therebetween and pressing it against the innerliner to transfer a spot of adhesive material to the innerliner.

18. The machine of claim 17, wherein vacuum manifolds are used to pick-up and hold the innerliner and chafer on the third bed.

19. The machine of claim 18, which includes means for adjusting the axial length of the third bed.

20. The machine of claim 19, wherein the first and second beds include stationary tables for supporting the beds in spaced relation from the third bed.

21. The machine of claim 20, which includes:

(r) means mounted on the tables of the first and second beds, for bringing continuous sheets of first and second ply oriented material to the first and second beds, respectively.

22. The machine of claim 21, wherein the positioning means (b) and (c) include:

(s) units mounted on the tables of the first and second beds and reciprocable along the longitudinal axes thereof, for taking the sheets of first and second ply oriented material and transferring them on to the first and second beds, respectively.

23. The machine of claim 22, which includes:

(t) cutters mounted on the tables of the first and second beds and movable transversely across the beds, for cutting the first and second ply oriented material, after it has been moved a predetermined distance on to the first and second beds, respectively.

24. The machine of claim 23, wherein the cutters (t) each comprise:

(1) a movable clamp for engaging and holding an adjacent marginal edge of the ply material at two spaced points;

(2) means for slicing the edge of the ply material between the two points, to form a cut therebetween;

(3) means movable into the cut, for engaging and tearing the ply material along a pathway between two adjacently disposed reinforcing chords of the ply material; and (4) means for lifting the ply material along the pathway as the tearing means moves therealong.

25. The machine of claim 24, wherein the slicing means (2) includes a rotatable blade with a knife edge for shearing engagement with the ply material.

26. The machine of claim 25, wherein the tearing means (3) includes a blunted edge carried by the blade.

27. The machine of claim 26, which includes means for heating the blade to a temperature sufficient to cause the rubberized composition of the ply material to flow.

28. The machine of claim 24, which includes:

(u) a pair of bed sections movably mounted on the tables of the first and second beds, for stretching the cut ply material to a length sufficient for wrapping around the drum in overlapped splicing relation.

29. The machine of claim 28, wherein the drum transporting means (e) includes a drum carrier mounted on the tables of the first and second beds for reciprocating movement along the longitudinal axes of the beds, and a drum head mounted on each carrier for vertical movement relative thereto, for lowering the drum into rolling engagement with the ply material.

30. The machine of claim 29, wherein vacuum manifolds are used to pick up and hold ply material on the first and second beds.

31. The machine of claim 30, which includes:

(v) means for angularly adjusting the movable bed sections (u) relative to the longitudinal axes of the first and second beds to accommodate different bias cut ply material.

32. The machine of claim 31, which includes means for adjusting the axial length of the first and second beds.

33. The machine of claim 32, wherein the positioning means (b) and (c) each include:
   (w) a pair of vertical abutments positionable against the parallel sides of the movable bed sections;
   (x) another pair of horizontal abutments carried by the vertical abutments, for positioning adjacent the parallel sides of the movable bed sections; and
   (y) means for lifting the adjacent ends of the ply material from the first and second beds for striking engagement with the abutments to position the ply material within the parallel sides of the movable bed sections.

34. The machine of claim 33, wherein the assemblies include:
   (aa) a pair of aligned, spaced turret frames disposed in drum conveying relation to the second bed;
   (bb) a pair of drum movers rotatably mounted between the turret frames, each of the drum movers including a plurality of arcuately spaced turret arms for engaging the building drum and sequentially moving it to a number of arcuate stations;
   (cc) means associated with the turret frames for applying a strip of tread cushion in wrapping relation around the drum, when it is positioned at the first of the stations;
   (dd) means associated with the turret frames for setting a pair of beads on the ply material adjacent the ends of the drum, when it is positioned at the second of the stations; and
   (ee) means associated with the turret frames for stitching the plies wrapped on the drum prior to setting the beads.

35. The machine of claim 34, wherein the means for applying a strip of tread cushion, comprises in combination:
   (1) an applicator drum rotatably mounted parallel to an adjacent building drum at the first station;
   (2) means for feeding a continuous strip of tread cushion to the applicator drum for wrapping thereon, as the drum rotates through a predetermined arc;
   (3) means for cutting the strip of tread cushion when a predetermined length thereof is wrapped on the applicator drum; and
   (4) means for moving the applicator drum into rolling engagement with a rotating building drum to transfer the strip of tread cushion on to the drum.

36. The machine of claim 35, wherein the applicator drum includes:
   (5) a cylindrical section with a vacuum manifold along its leading edge first to engage tread cushion from the feed means (2);
   (6) a cylindrical segment with a vacuum manifold along its trailing edge last to engage tread cushion from the feed means (2); the segment being rotatable relative to the section to arcuately adjust the position of the trailing manifold relative to the leading manifold, to accommodate different lengths of tread cushion; and
   (7) means for locking the segment in a plurality of arcuate positions relative to the section.

37. The machine of claim 36, wherein the bead setting means comprises in combination:
   (1) a pair of bead working units mounted on the turret frames in aligned relation for working on opposing ends of the carcass;
   (2) means for moving the bead working units into carcass working relation adjacent the ends of the building drum;
   (3) a set of plydown fingers carried by each bead work unit for engaging and turning down ply material extending beyond the ends of the drum;
   (4) an expansible iris surrounding each set of plydown fingers for placing the beads in position over the plydown;
   (5) an inflatable bladder carried by each bead work unit for engaging the plydown and folding it back over the beads to set the beads in position at opposing ends of the carcass;
   (6) a pair of portable bead racks for storing beads, positioned adjacent the turret frames; and
   (7) a pair of rotatable transfer arms positioned adjacent the turret frames for taking beads from the portable bead racks, and transferring them to the expansible iris of each bead working unit.

38. The machine of claim 37, wherein the portable bead racks each include:
   (8) a platform mounted on casters;
   (9) a number of arcuately spaced bead magazines extending from the platform;
   (10) means carried by each magazine for supporting a vertical stack of horizontally disposed beads; and
   (11) means for moving the beads of each stack towards the top of the stack, when the top bead of the stack is removed by a transfer arm.

39. The machine of claim 38, wherein the transfer arms each include:
   (12) a hand rotatably mounted on the free end of the arm;
   (13) a pluraiity of fingers rotatably mounted on the hand and extending therefrom for engaging and picking up beads stacked on the bead magazines; and
   (14) means carried by the hand for rotating the fingers, in unison, into and out of holding engagement with beads.

40. The machine of claim 39, wherein the assemblies include:
   (ff) a second pair of aligned turret frames disposed in drum conveying relation from the first pair of turret frames;
   (gg) a pair of drum movers, rotatably mounted between the second pair of turret frames, each drum mover including a plurality of arcuately spaced turret arms for engaging the building drum and sequentially moving it to a number of arcuate stations;
   (hh) means associated with the second pair of turret frames for stitching the plydown material against the carcass on a drum at a first station; and
   (ii) means associated with the second pair of turret frames for discharging the carcass from the building drum at a second station.

41. The machine of claim 40, which includes:
   (jj) means associated with a second pair of turret frames for applying a strip of white sidewall on the carcass, prior to its discharge from the building drum.

42. The machine of claim 41, wherein the white sidewall applying means includes:
   (1) means for feeding a continuous strip of white sidewall for wrapping on the drum;
   (2) means for placing the continuous strip of white sidewall in rolling engagement with the carcass on the drum; and
   (3) means for cutting the continuous strip of white sidewall after a predetermined length of white sidewall has wrapped on the drum, to form an abutting angular splice.

43. The machine of claim 42, wherein the white sidewall cutting means includes:
   (4) a pair of spaced knives, one knife being movable relative to the other;
   (5) means for guiding the strip of white sidewall between the knives;
   (6) a cam follower for rolling engagement on the carcass in predetermined spaced relation, ahead of white sidewall wrapping thereon;
   (7) means for sensing movement of the cam follower when it engages the strip of white sidewall wrapping on the carcass;

(8) means responsive to the sensing means (7) for actuating the movable knife to cut the strip of white sidewall, when the cam follower engages the white sidewall wrapped on the carcass.

44. The machine of claim 43, wherein the carcass discharging means includes:
(9) a discharge ring with an opening;
(10) a plurality of ring segments carried by the discharge ring for engaging an adjacent bead and supporting it in surrounding relation to the drum, as the carass is removed;
(11) means for collapsing the drum after the bead is engaged by the ring segments; and
(12) means for moving the discharge ring axially in surrounding relation over the collapsed drum, to push the carcass from the drum.

45. The machine of claim 44, which includes:
(kk) means for expanding the drum for removal to the third bed.

46. The machine of claim 45, which includes:
(ll) a discharge conveyor mounted on the second pair of turret frames in aligned opposed relation to the carcass discharge means; and
(mm) means for moving the discharge conveyor into carcass receiving relation to the building drum, prior to its collapse for supporting the adjacent end of the carcass as it is removed from the collapsed drum.

47. The machine of claim 46 which includes:
(nn) means for conveying the drum between the assemblies.

48. The machine of claim 47, which includes:
(oo) a pair of parallel floor conveyors for moving ply material to the first and second beds, in first and second ply oriented relation;
(pp) means for storing at least one roll of ply material;
(qq) an overhead conveyor, angularly disposed in surmounted relation to the pair of floor conveyors, for moving ply material from the storage means (pp);
(rr) a pair of chutes diverging downwards form the overhead conveyor to the floor conveyors;
(ss) means for cutting predetermined lengths of ply material moving on the overhead conveyor; and
(tt) means for deflecting the lengths of ply material alternately down the chutes, such that the ply material is properly ply oriented for splicing with other spliced lengths of ply material on each of the floor conveyors.

49. The machine of claim 48, which includes:
(uu) means for blowing air along the chute surfaces to maintain the ply material, moving down the chutes.

References Cited
UNITED STATES PATENTS

| | | | |
|---|---|---|---|
| 1,670,870 | 5/1928 | Textorivs | 156—396 |
| 1,961,725 | 6/1934 | Abbott | 156—405 |
| 1,713,927 | 5/1929 | Sheldon | 156—396 |
| 1,626,412 | 4/1927 | James | 156—450 |
| 1,502,027 | 7/1924 | Fowler | 156—218 |
| 2,997,095 | 8/1961 | Travaskis | 156—405 |

STEPHEN C. BENTLEY, Primary Examiner

UNITED STATES PATENT OFFICE
CERTIFICATE OF CORRECTION

Patent No. 3,700,526                    Dated October 24, 1972

Inventor(s) Wilhelm Brey et al.

It is certified that error appears in the above-identified patent and that said Letters Patent are hereby corrected as shown below:

Column 6, line 74, "stategically" should read -- strategically --. Column 9, line 40, "267" should read -- 266 --; same line 40, "positiont he" should read -- position the --. Col. 12, line 56,"mounted on the drive screw 447" should read -- driven by the drive screw 477 through brackets 456-457 --; line 71, cancel "and drive screw 447". Column 13, line 8, "Figs. 24-24)" should read -- (Figs. 23-24) --. Column 28, line 58, after "move.", cancel the remainder of the line and substitute the following:
    -- An air cyclinder 1178 is connected by a link --. Column 31, line 68, "1340" should read -- 1304 --; same line, "bushing" should read -- bushings --. Column 32, line 55, "cylindres" should read -- cylinders --. Column 33, line 28, "socket 1001" should read -- socket assembly 1001 --. Column 34, line 29, "and" should read -- an --. Column 38, line 14, "rciprocated" should read -- reciprocated --. Column 40, line 10, "or", first occurrence, should read -- of --. Column 42, lines 65-66, "tension the first ply to wrap it around the innerliner and chafer al-" should read -- tension the first ply in position on the bed 633. Electric eyes indicate --. Column 43, line 47, "is" should read -- in --; line 61, "BAP" should read BPA --.

Signed and sealed this 25th day of June 1974.

(SEAL)
Attest:

EDWARD M. FLETCHER, JR.
Attesting Officer

C. MARSHALL DANN
Commissioner of Patents